(12) United States Patent
Layman, Jr. et al.

(10) Patent No.: US 8,933,159 B2
(45) Date of Patent: Jan. 13, 2015

(54) BROMINATED FLAME RETARDANTS AND PRECURSORS THEREFOR

(75) Inventors: William J. Layman, Jr., Baton Rouge, LA (US); Charles H. Kolich, Baton Rouge, LA (US); Arthur G. Mack, Prairieville, LA (US); Jonathan P. McCarney, Baton Rouge, LA (US); Govindarajulu Kumar, Baton Rouge, LA (US); Jorge Morice, Baton Rouge, LA (US); Zhongxin Ge, Baton Rouge, LA (US); Bo Liu, Nanjing (CN); Douglas W. Luther, Walker, LA (US); Kimberly M. White, Baton Rouge, LA (US); Bruce C. Berris, Baton Rouge, LA (US); Junzuo Wang, Little Rock, AR (US)

(73) Assignee: Albemarle Corporation, Richmond, VA (US)

( * ) Notice: Subject to any disclaimer, the term of this patent is extended or adjusted under 35 U.S.C. 154(b) by 895 days.

(21) Appl. No.: 13/130,110

(22) PCT Filed: Nov. 30, 2009

(86) PCT No.: PCT/US2009/066134
§ 371 (c)(1),
(2), (4) Date: May 19, 2011

(87) PCT Pub. No.: WO2010/065468
PCT Pub. Date: Jun. 10, 2010

(65) Prior Publication Data
US 2011/0224353 A1 Sep. 15, 2011

Related U.S. Application Data

(60) Provisional application No. 61/119,289, filed on Dec. 2, 2008.

(51) Int. Cl.
| | | |
|---|---|---|
| C08K 5/03 | (2006.01) |
| C08L 25/06 | (2006.01) |
| C08L 61/10 | (2006.01) |
| C07C 17/02 | (2006.01) |
| C07C 22/04 | (2006.01) |
| C07C 25/18 | (2006.01) |
| C07C 15/12 | (2006.01) |
| C08K 5/00 | (2006.01) |
| C08F 8/22 | (2006.01) |
| C08F 12/08 | (2006.01) |
| C08F 112/08 | (2006.01) |
| C08F 4/48 | (2006.01) |

(52) U.S. Cl.
CPC .............. C08K 5/0066 (2013.01); C08F 8/22 (2013.01); C08F 12/08 (2013.01); C08F 112/08 (2013.01)
USPC ........... 524/469; 252/609; 525/355; 525/357; 526/180; 570/185; 570/206; 585/25; 585/428

(58) Field of Classification Search
USPC ............. 570/206, 185; 585/25, 428; 524/469; 525/357, 355; 252/609; 526/180
See application file for complete search history.

(56) References Cited

U.S. PATENT DOCUMENTS

| | | | |
|---|---|---|---|
| 2,243,543 A | 5/1941 | ter Horst |
| 2,757,146 A | 7/1956 | Fawcett |
| 2,914,489 A | 11/1959 | Hall |
| 2,954,412 A | 9/1960 | Wulf et al. |
| 3,221,068 A | 11/1965 | Gorham |
| 3,372,880 A | 3/1968 | O'Hara |
| 3,373,135 A | 3/1968 | Jenkner et al. |
| 3,451,988 A | 6/1969 | Langer, Jr. |
| 3,458,586 A | 7/1969 | Langer, Jr. |
| 3,536,679 A | 10/1970 | Langer, Jr. |
| 3,541,149 A | 11/1970 | Langer, Jr. |
| 3,594,396 A | 7/1971 | Langer, Jr. |
| 3,634,548 A | 1/1972 | Harwell et al. |
| 3,668,263 A | 6/1972 | Morrison et al. |
| 3,725,368 A | 4/1973 | Morrison et al. |
| 3,742,077 A | 6/1973 | Kamienski et al. |
| 3,751,384 A | 8/1973 | Langer, Jr. |
| 3,751,501 A | 8/1973 | Kamienski et al. |
| 3,850,882 A | 11/1974 | Underwood et al. |
| 3,943,195 A | 3/1976 | Naarmann et al. |
| 4,041,088 A | 8/1977 | Bach et al. |
| 4,074,032 A | 2/1978 | Naarmann et al. |

(Continued)

FOREIGN PATENT DOCUMENTS

| | | |
|---|---|---|
| CN | 100369941 C | 2/2008 |
| DE | 1570376 | 7/1969 |
| DE | 1589700 | 7/1970 |
| DE | 2050009 | 5/1971 |
| DE | 2758781 | 7/1979 |
| DE | 19516563 A1 | 11/1996 |
| EP | 0000141 A1 | 1/1979 |
| EP | 0002514 B2 | 6/1979 |
| EP | 0277429 B1 | 8/1988 |
| EP | 0334715 B1 | 9/1989 |
| EP | 0741147 A1 | 11/1996 |
| EP | 0775719 A2 | 5/1997 |
| EP | 0806437 A1 | 11/1997 |
| GB | 1107898 | 3/1968 |

(Continued)

OTHER PUBLICATIONS

DIC Corporation, Epoxy Resins, Brominated Flame Retardant Pratherm, from website http://www.dic.co.jp/en/products/epoxy/pratherm.html, 1 page.

(Continued)

Primary Examiner — Fred M Teskin
(74) Attorney, Agent, or Firm — James A. Jubinsky

(57) ABSTRACT

Described are a particular group of novel aromatic hydrocarbon telomers that, on bromination, result in the formation of novel flame retardants having a uniquely beneficial combination of properties. The resultant flame retardants and uses thereof are also described. The disclosure includes descriptions of methods for preparing both the aromatic hydrocarbon telomers and the brominated flame retardant polymers.

26 Claims, 9 Drawing Sheets

(56) References Cited

U.S. PATENT DOCUMENTS

| | | | |
|---|---|---|---|
| 4,078,019 A | 3/1978 | Langer, Jr. |
| 4,107,231 A | 8/1978 | Wurmb et al. |
| 4,108,921 A | 8/1978 | Langer, Jr. |
| 4,129,551 A | 12/1978 | Rueter et al. |
| 4,129,705 A | 12/1978 | de Zarauz |
| 4,134,938 A | 1/1979 | Langer, Jr. |
| 4,137,212 A | 1/1979 | Theysohn et al. |
| 4,143,221 A | 3/1979 | Naarmann et al. |
| 4,151,223 A | 4/1979 | Neuberg et al. |
| 4,200,702 A | 4/1980 | Gausepohl et al. |
| 4,268,705 A | 5/1981 | Palmer |
| 4,311,818 A | 1/1982 | Sigwalt et al. |
| 4,360,455 A | 11/1982 | Lindenschmidt et al. |
| 4,435,312 A | 3/1984 | Lecolier et al. |
| 4,450,259 A | 5/1984 | Roggero et al. |
| 4,463,135 A | 7/1984 | Maly |
| 4,482,677 A | 11/1984 | Teranaka et al. |
| 4,535,135 A | 8/1985 | Lecolier et al. |
| 4,636,540 A | 1/1987 | Warfel |
| 4,701,498 A | 10/1987 | Roggero et al. |
| 4,734,461 A | 3/1988 | Roggero et al. |
| 4,753,745 A | 6/1988 | Kostusyk et al. |
| 4,755,573 A | 7/1988 | Aycock |
| 4,829,135 A | 5/1989 | Gunesin et al. |
| 4,853,440 A | 8/1989 | Roggero et al. |
| 4,883,846 A | 11/1989 | Moore et al. |
| 4,950,721 A | 8/1990 | Dias et al. |
| 4,975,496 A | 12/1990 | Tigner et al. |
| 5,112,897 A | 5/1992 | Dever et al. |
| 5,112,898 A | 5/1992 | Dever et al. |
| 5,196,622 A | 3/1993 | Pettijohn et al. |
| 5,198,594 A | 3/1993 | Lillwitz et al. |
| 5,302,768 A | 4/1994 | Hussain |
| 5,310,858 A | 5/1994 | Greiner et al. |
| 5,326,836 A | 7/1994 | Hwang et al. |
| 5,457,248 A | 10/1995 | Mack et al. |
| 5,625,017 A | 4/1997 | Morita et al. |
| 5,637,650 A | 6/1997 | Gill et al. |
| 5,654,384 A | 8/1997 | Halasa et al. |
| 5,677,390 A | 10/1997 | Dadgar et al. |
| 5,686,538 A | 11/1997 | Balhoff et al. |
| 5,687,090 A | 11/1997 | Chen et al. |
| 5,728,782 A | 3/1998 | Brady et al. |
| 5,741,949 A | 4/1998 | Mack |
| 5,767,203 A | 6/1998 | Ao et al. |
| 5,852,131 A | 12/1998 | Balhoff et al. |
| 5,852,132 A | 12/1998 | Dadgar et al. |
| 5,902,865 A | 5/1999 | Gausepohl et al. |
| 5,916,978 A | 6/1999 | Ao et al. |
| 6,008,283 A | 12/1999 | Rose et al. |
| 6,025,450 A | 2/2000 | Lawson et al. |
| 6,093,211 A | 7/2000 | Hamielec et al. |
| 6,133,381 A | 10/2000 | Reed et al. |
| 6,207,765 B1 | 3/2001 | Ao et al. |
| 6,232,393 B1 | 5/2001 | Dadgar et al. |
| 6,232,408 B1 | 5/2001 | Dadgar et al. |
| 6,235,831 B1 | 5/2001 | Reed et al. |
| 6,235,844 B1 | 5/2001 | Dadgar et al. |
| 6,313,230 B1 | 11/2001 | Tsai et al. |
| 6,326,439 B1 | 12/2001 | Dadgar et al. |
| 6,348,166 B1 | 2/2002 | Knoll et al. |
| 6,355,194 B1 | 3/2002 | Agur et al. |
| 6,362,293 B1 | 3/2002 | Newman et al. |
| 6,521,714 B2 | 2/2003 | Kolich et al. |
| 6,657,028 B1 | 12/2003 | Aplin et al. |
| 6,759,498 B2 | 7/2004 | Ikematsu et al. |
| 6,767,960 B2 | 7/2004 | Bae et al. |
| 6,933,343 B2 | 8/2005 | Ikematsu et al. |
| 7,288,612 B2 | 10/2007 | Desbois et al. |
| 7,351,777 B2 | 4/2008 | Moore et al. |
| 7,425,290 B2 | 9/2008 | Semen |
| 7,632,893 B2 | 12/2009 | Kolich et al. |
| 2002/0035214 A1 | 3/2002 | Gill et al. |
| 2002/0183465 A1 | 12/2002 | Babcock et al. |
| 2005/0143526 A1 | 6/2005 | Faust et al. |
| 2005/0209408 A1 | 9/2005 | Lee et al. |
| 2006/0079644 A1 | 4/2006 | Meyer et al. |
| 2007/0004870 A1 | 1/2007 | Kolich et al. |
| 2007/0142566 A1 | 6/2007 | Kolich et al. |
| 2007/0185280 A1 | 8/2007 | Luther |
| 2007/0232759 A1 | 10/2007 | Chun et al. |
| 2010/0184941 A1 | 7/2010 | Layman, Jr. et al. |

FOREIGN PATENT DOCUMENTS

| | | |
|---|---|---|
| GB | 1174845 | 12/1969 |
| GB | 1270318 | 4/1972 |
| GB | 1342101 | 12/1973 |
| GB | 1536762 | 12/1978 |
| GB | 1589700 | 5/1981 |
| GB | 2164051 A1 | 3/1986 |
| JP | 58-201809 A | 11/1983 |
| JP | 59-155454 | 9/1984 |
| JP | 62-042938 A | 2/1987 |
| JP | 08-188622 | 7/1996 |
| JP | 09-249705 A1 | 9/1997 |
| JP | 09-249706 A1 | 9/1997 |
| JP | 10-182730 A1 | 7/1998 |
| JP | 11-043511 A1 | 2/1999 |
| JP | 11-080220 A1 | 3/1999 |
| JP | 11-116613 A1 | 4/1999 |
| JP | 2001-341246 A1 | 12/2001 |
| WO | 90/15095 A1 | 12/1990 |
| WO | 99/25746 A1 | 5/1999 |
| WO | 99/55770 A1 | 11/1999 |
| WO | 00/15678 A1 | 3/2000 |
| WO | 02/072645 A1 | 9/2002 |
| WO | 03/020826 A1 | 3/2003 |
| WO | 2005/118245 A1 | 12/2005 |
| WO | 2007/005233 A1 | 1/2007 |
| WO | 2007/076369 A1 | 7/2007 |
| WO | 2008/011477 A1 | 1/2008 |
| WO | 2008/066970 A1 | 6/2008 |
| WO | 2008/154453 A1 | 12/2008 |
| WO | 2008/154454 A1 | 12/2008 |
| WO | 2009/148464 A1 | 12/2009 |
| WO | 2010/065462 A1 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |
| WO | 2010/127087 A1 | 11/2010 |
| WO | 2010/127091 A1 | 11/2010 |

OTHER PUBLICATIONS

Eberhardt, G. G., et al., "A Catalytic Telomerization Reaction of Ethylene with Aromatic Hydrocarbons", J. Org. Chem., vol. 29, 1964, pp. 2928-2932.

Eberhardt, G. G., et al., "Telomerization Reactions Involving a N-Chelated Organo Lithium Catalyst", Polymer Preprints, 1972, vol. 13, pp. 667-671.

Feil, F., et al., "Benzyl Complexes of the Heavier Alkaline-Earth Metals: The First Crystal Structure of a Dibenzylstrontium Complex", Organometallics, 2001, vol. 20, pp. 4616-4622.

CAPLUS Abstract of Fujimoto, T., et al., "Preparation of monodisperse polystyrenes with high molecular weights", Polymer Journal, 1975, 7(3), pp. 397-401. 1 page.

Gatzke, A.L., "Chain Transfer in Anionic Polymerization. Determination of Chain-Transfer Constants by Using Carbon-14-Labeled Chain Transfer Agents", Journal of Polymer Science, Part A-1, 1969, vol. 7, pp. 2281-2292.

Science Direct Abstract of Helary, G., et al., "Etude de la polymerisation anionique du styrene en milieu non polaire, en presence de N,N,N',N' tetramethyl ethylene diamine", European Polymer Journal, 1978, vol. 14, issue 5, pp. 345-348. 1 page.

Hennion, G. F., et al., "The Polybromination of Alkylbenzenes", J. Am. Chem. Soc., 1946, vol. 68, issue 3, pp. 424-426.

ICL Industrial Products, F-3014-End Capped Brominated Epoxy, from website http://www.icl-ip.com/Brome/Brome.nsf/viewGetMain/Product350-40/$file/F-3014.pdf, 1 page.

(56) References Cited

OTHER PUBLICATIONS

CAPLUS Abstract of Ito, M., et al., "Synthesis of well-defined block copolymers containing poly(N-isopropylacrylamide) segment by anionic block copolymerization of N-methoxymethyl-N-isopropylacrylamide", Designed Monomers and Polymers, 2004, 7(1-2), pp. 11-24. 1 page.
Junkui, C., "Synthesis of Narrow Distribution Polystyrene in RLi-Ligand Complex Systems", Chemical Journal of Chinese Universities, 1989, vol. 10, No. 12, pp. 1246-1250. Abstract only translated.
CAPLUS Abstract of Kalnins, K., et al., "Electronic structure of complexes of benzyl anion and ion pairs with styrene", Vysokimolekulyarnye Soedineniya, Seriya A (1990), 32(2), 316-21. 1 page.
Lamneck, Jr., J. H., "Bromination of the Two Propylbenzenes and Three Butylbenzenes", J. Am. Chem. Soc., 1954, vol. 76, issue 4, pp. 1106-1107.
CAPLUS Abstract of Langer, A. W., Jr., "Reactions of Chelated Organolithium Compounds", Transactions of the New York Academy of Sciences, 1965, 27(7), pp. 741-747. 1 page.
Marechal, Jean-Marc, et al., "Stereoregulation in the anionic polymerization of styrene initiated by superbases", Polymer, 2003, vol. 44, pp. 7601-7607.
Marechal, Jean-Marc, et al., "Stereospecific anionic polymerization of styrene initiated by R2Mg/ROMt 'ate' complexes", Polymer, 2004, 45, pp. 4641-4646.
Maruoka, K., et al., "Novel Anionic Oligomerization by a New, Sequential Generation of Organolithium Compounds", Macromolecules, 1996, 29, pp. 3328-3329.
Milner, R., et al., "Anionic telomerization of butadiene with toluene and diphenylmethane: microstructure and molecular weight", Polymer, vol. 26, 1985, pp. 1265-1267.
Mizuno, T., et al., "Second and Third Virial Coefficients of Polystyrene with Benzyl Ends near the Theta Point", Macromolecules, 2005, 38, pp. 4432-4437.
Advanced Organic Chemistry, Reactions, Mechanisms, and Structure, 4th Ed., Jerry Mar., J. Wiley & Sons, 1992, pp. 743-744.
Atkins, Physical Chemistry, P. W., 4th Ed., W. H. Freeman and Co., 1990, p. 800.
Baskaran, D., et al., "Effect of Chelation of the Lithium Cation on the Anionic Polymerization of Methyl Methacrylate Using Organolithium Initiators", Macromolecules, 1995, 28, pp. 7315-7317.
Bildmann, U. J., et al., "Synthesis and Structure of the Tmeda Adduct of a Dibenzyl Lithiate Anion Containing Four-Coordinate Lithium", Organometallics, 2001, 20, pp. 1689-1691.
CAPLUS Abstract of Chakrapani, S., et al., "Strategies for the controlled, living anionic polymerization of acrylic and methacrylic monomers and novel star polymers", Polymer Science, 1994, vol. 1, pp. 112-117. 1 page.
Concise, Polymeric Materials Encyclopedia, Editor-in-Chief, Joseph C. Salamone, CRC Press, 1999, pp. 1305-1307.
CAPLUS Abstract of Morton, M., "Homogeneous anionic polymerization. II. Molecular weight of polystyrene initiated by lithium alkyls", Journal of Polymer Science, 1963, Part A-1, pp. 461-474. 1 page.
CAPLUS Abstract of Narita, T., et al., "Reactivity of butyllithium-MeOCH2CH2OLi System as catalyst for copolymerization of styrene with 1,3-butadiene", Journal of Macromolecular Science, Chemistry, 1970, 4(2), pp. 277-294. 1 page.
Patterman, S. P., et al., "Pi Complexation in Ion Pair Bonding. The Structure of Benzyllithium Triethylenediamine", J. Am. Chem. Soc., 1970, 92:5, pp. 1150-1157.
Pines, H., et al., "Sodium-catalyzed side chain aralkylation of alkylbenzenes with Styrene", J. Am. Chem. Soc, 1958, vol. 80(22), pp. 6001-6004.
Pines, H., et al., "Sodium Catalyzed Reactions. II. Side-chain Ethylation of Alkyl Aromatic Hydrocarbons Catalyzed by Sodium", J. Am. Chem. Soc., 1955, vol. 77(3), pp. 554-559.
Reed, J. N., "Product Subclass 13: Benzyllithium Compounds and (Lithiomethyl)Hetarenes", Science of Synthesis, 2006 (vol date 2005), vol. 8A, pp. 329-355.
Seki, A., et al., "Crossed aldol reaction using cross-linked polymer-bound lithium dialkylamide", Tetrahedron, 2004, vol. 60, pp. 5001-5011.
Sorenson, W. R., et al., Preparative Methods of Polymer Chemistry, Interscience Publishers, Inc., 1961, pp. 198-200.
Strohmann, C., et al., "A Highly Diastereomerically Enriched Benzyllithium Compound: The Molecular Structure and the Stereochemical Course of Its Transformations", Organometallics, 2002, vol. 21, pp. 3079-3081.
Tsukahara, Y., et al., "Preparation and Characterization of alpha-benzyl-omega-vinylbenzyl Polystyrene Macromonomer", Polymer Journal, 1994, vol. 26, No. 9, pp. 1013-1018.
CAPLUS Abstract of Waack, R., et al., "Effects of lithium halides on the reactivity of organolithium compounds (in polymerization)", Chemistry & Industry, 1964, vol. 12, pp. 496-497. 1 page.
Waack, R., et al., "Reactivities of Organolithium Compounds in Tetrahydrofuran. I. As Vinyl Polymerization Initiators", J. Org. Chem., 1967, 32(11), pp. 3395-3399.
Wilhelm, D., et al., "Reactions of Polyanions Derived from Alkylbenzenes", J. Am. Chem. Soc., 1984, 106, pp. 361-367.

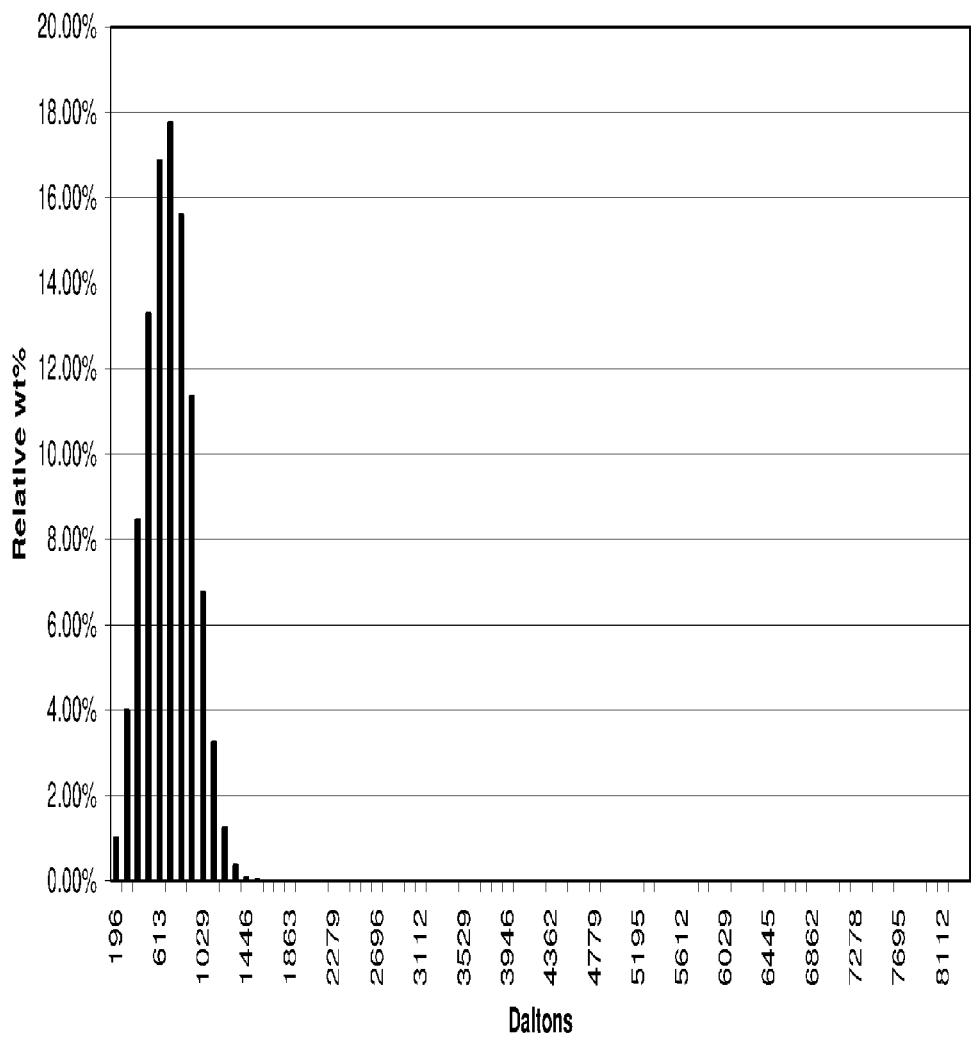

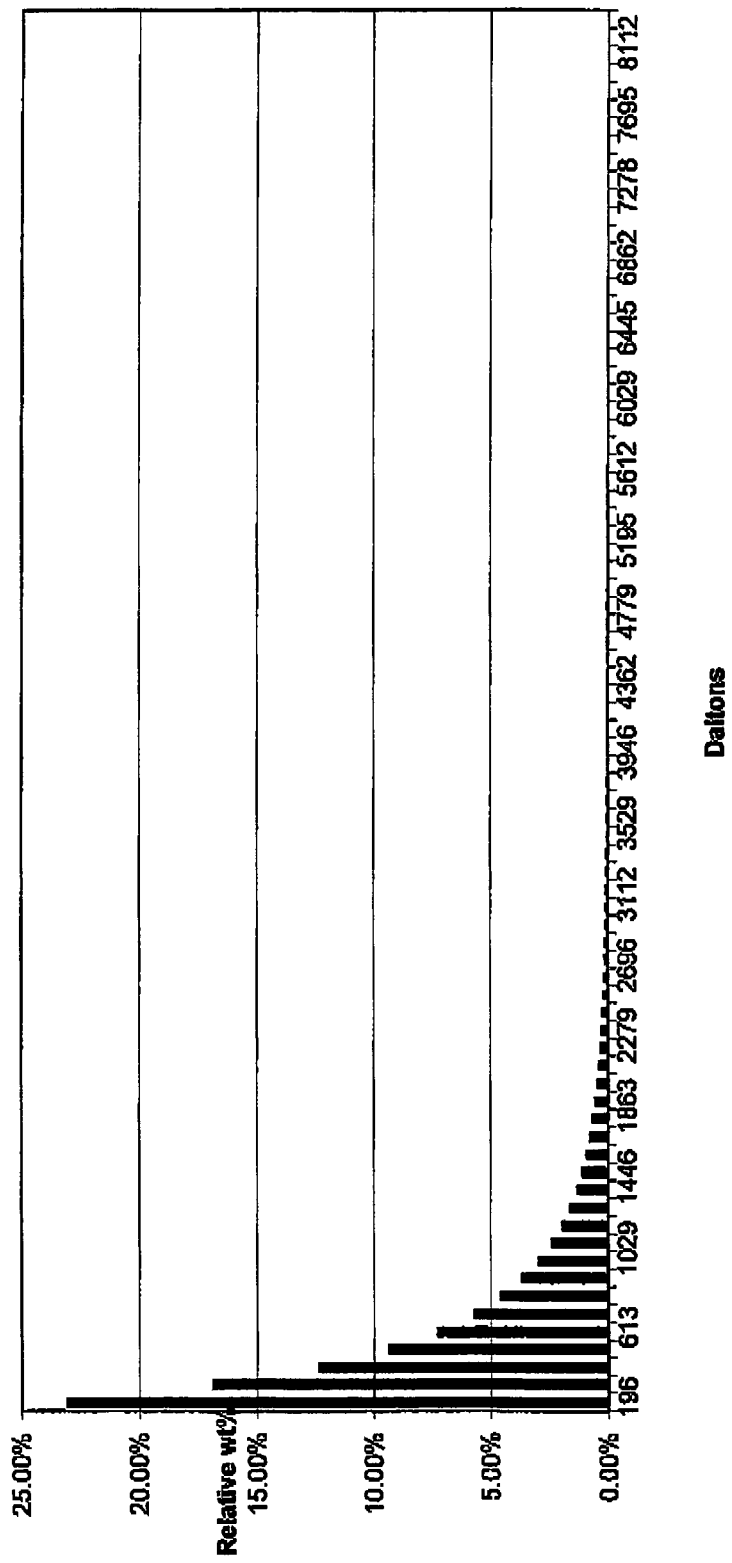
Fig. 2 - Weibull Model of a Toluene Styrenic Telomer Distribution Not of This Invention
$M_n = 379$, $M_w = 623$, $M_z = 1110$, $\sigma_n = 304$, $n\alpha_3 = 3.6367$

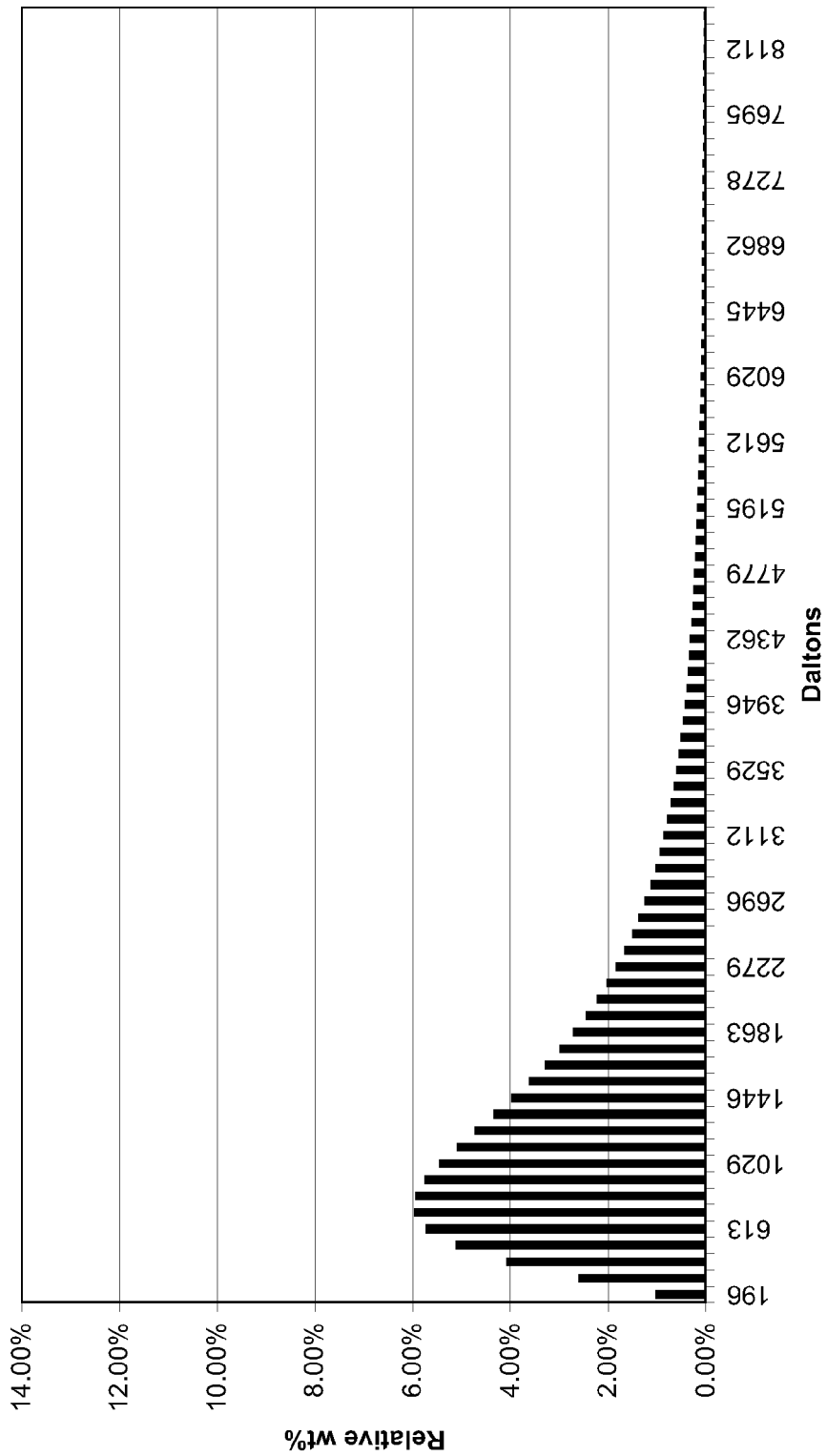
Fig. 3 - Lognormal Distribution of EP 0 741 147 A1
$M_n = 961$, $M_w = 1616$, $M_z = 2612$, $\sigma_n = 789$, $_n\alpha_3 = 2.74$

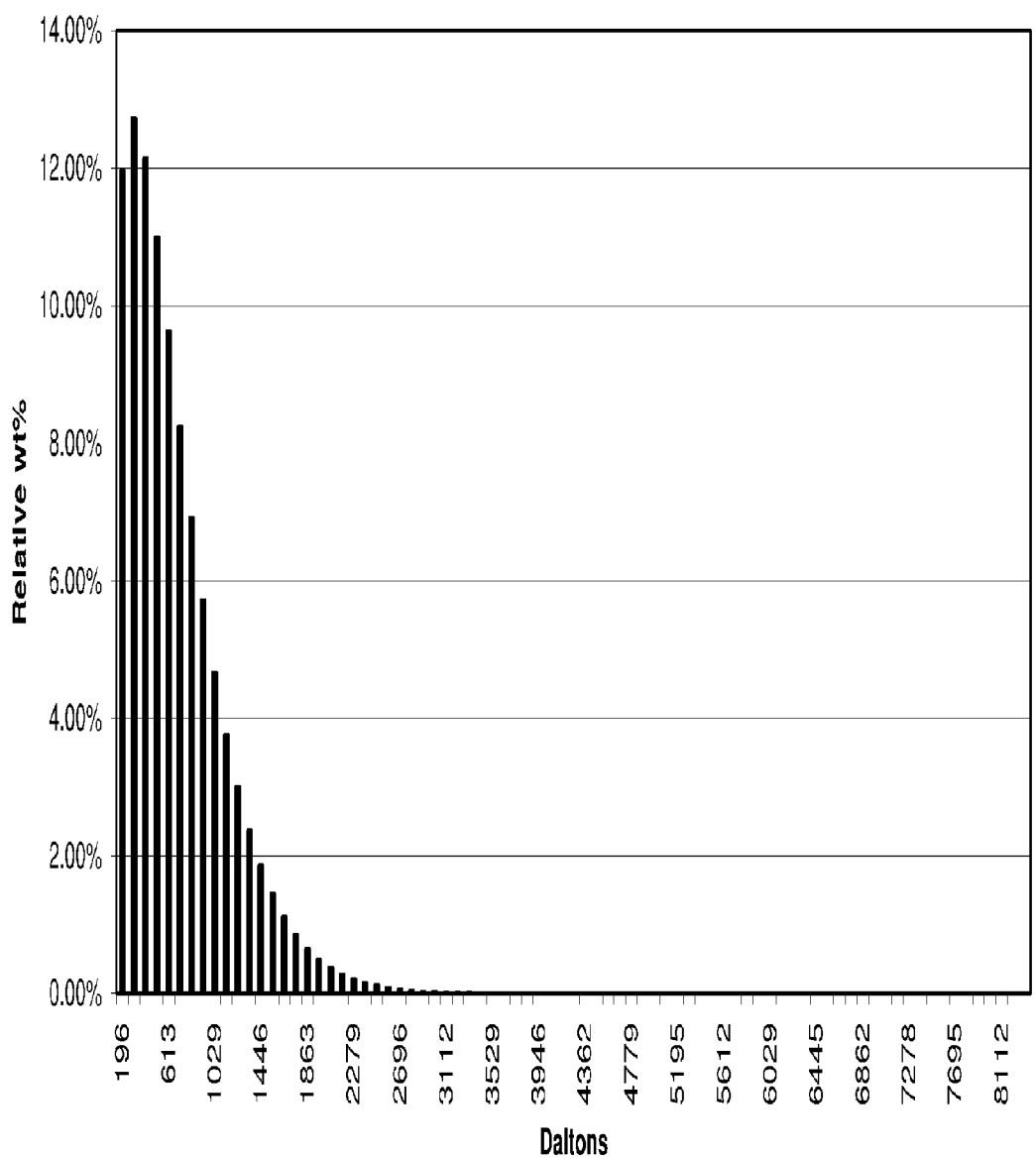
Fig. 4 - Weibull Distribution:
$M_n = 469$, $M_w = 693$, $M_z = 979$, $\sigma_n = 324$, $_n\alpha_3 = 1.977$

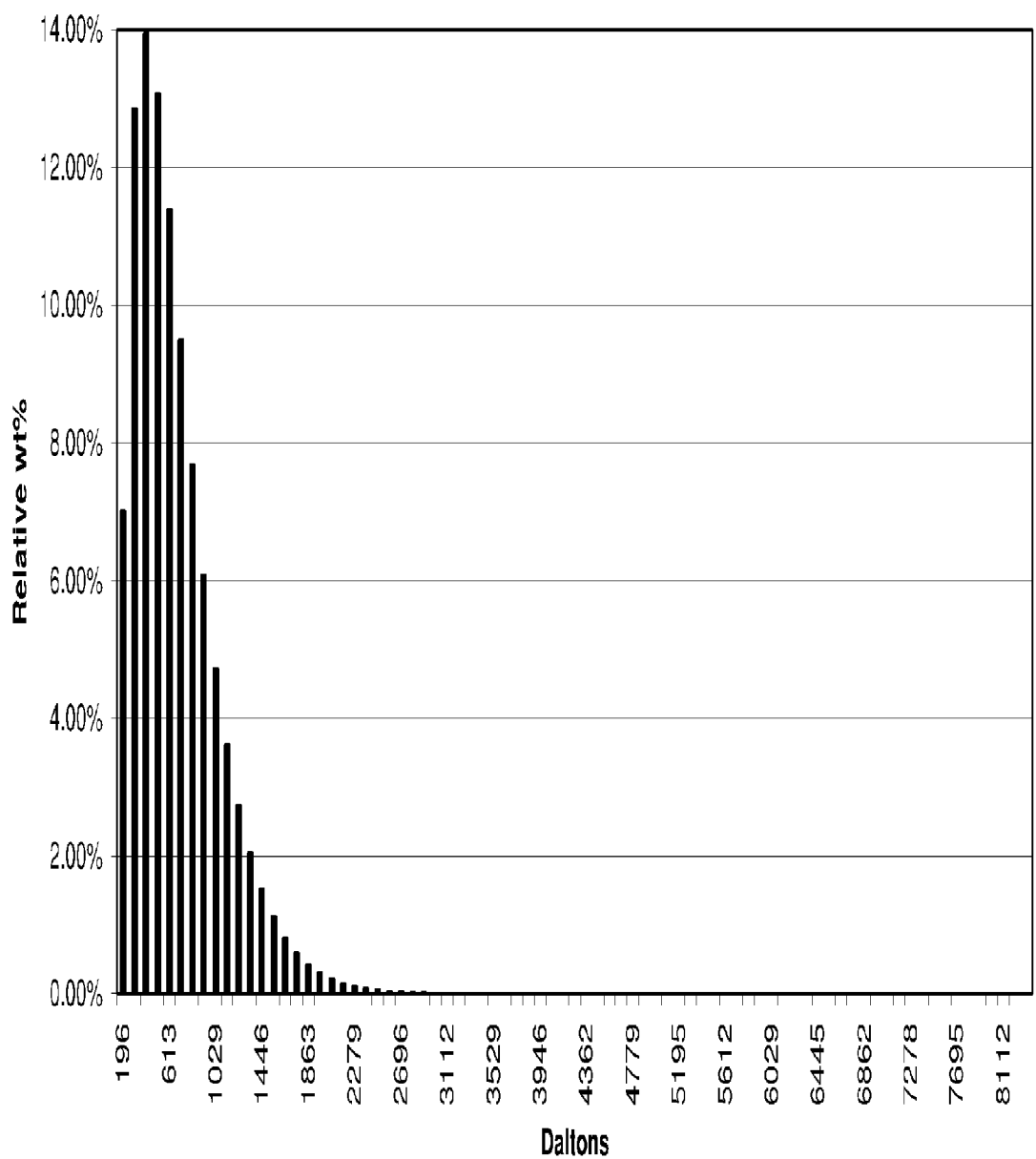

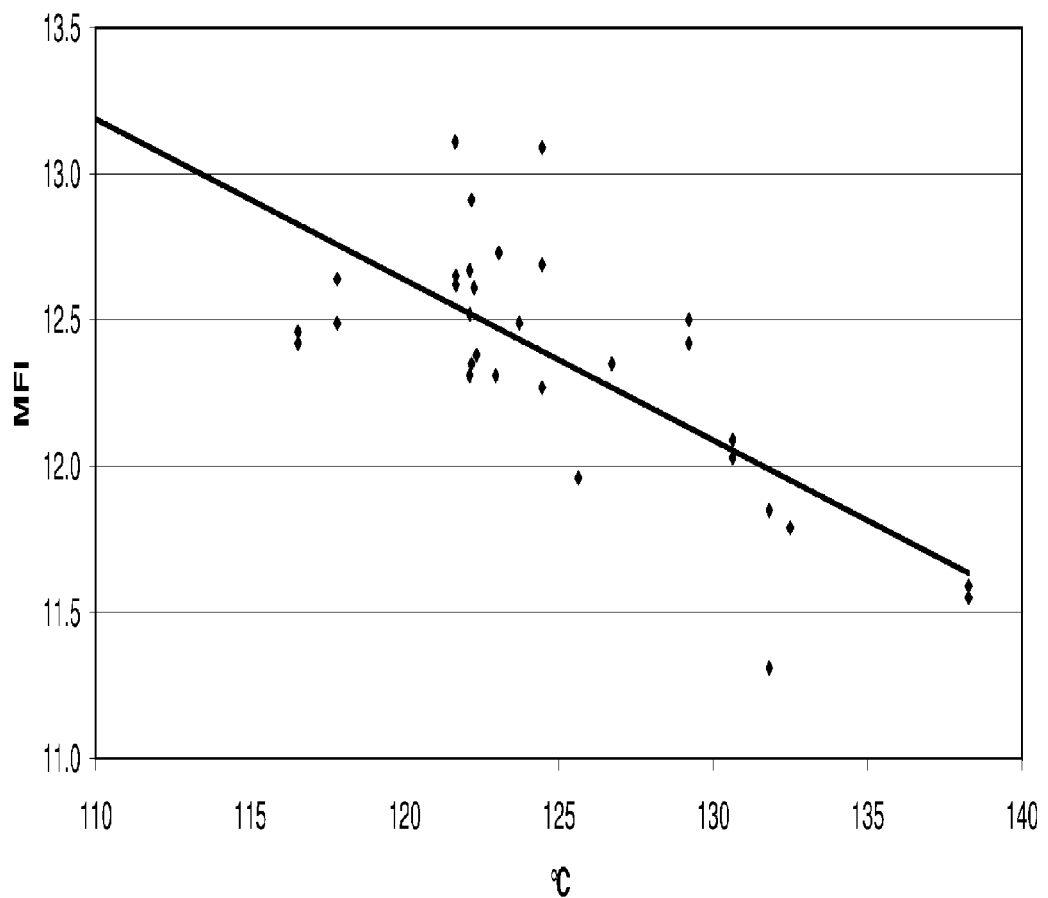
Fig. 6 - Melt Flow Index of Flame Retarded HIPS Resin as a Function of $T_g$ of Brominated STSTD of this Invention.

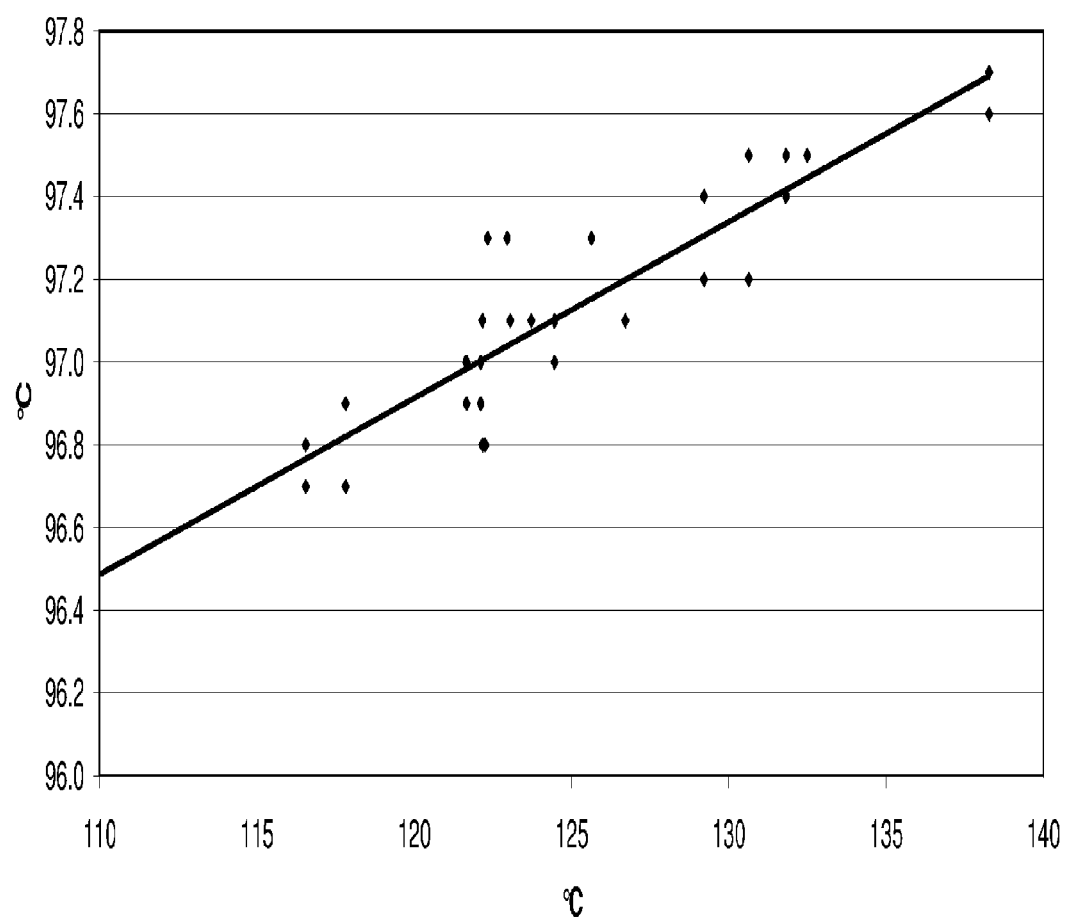
Fig. 7 - VICAT of Flame Retarded HIPS Resin as a Function of $T_g$ of Brominated STSTD of this Invention

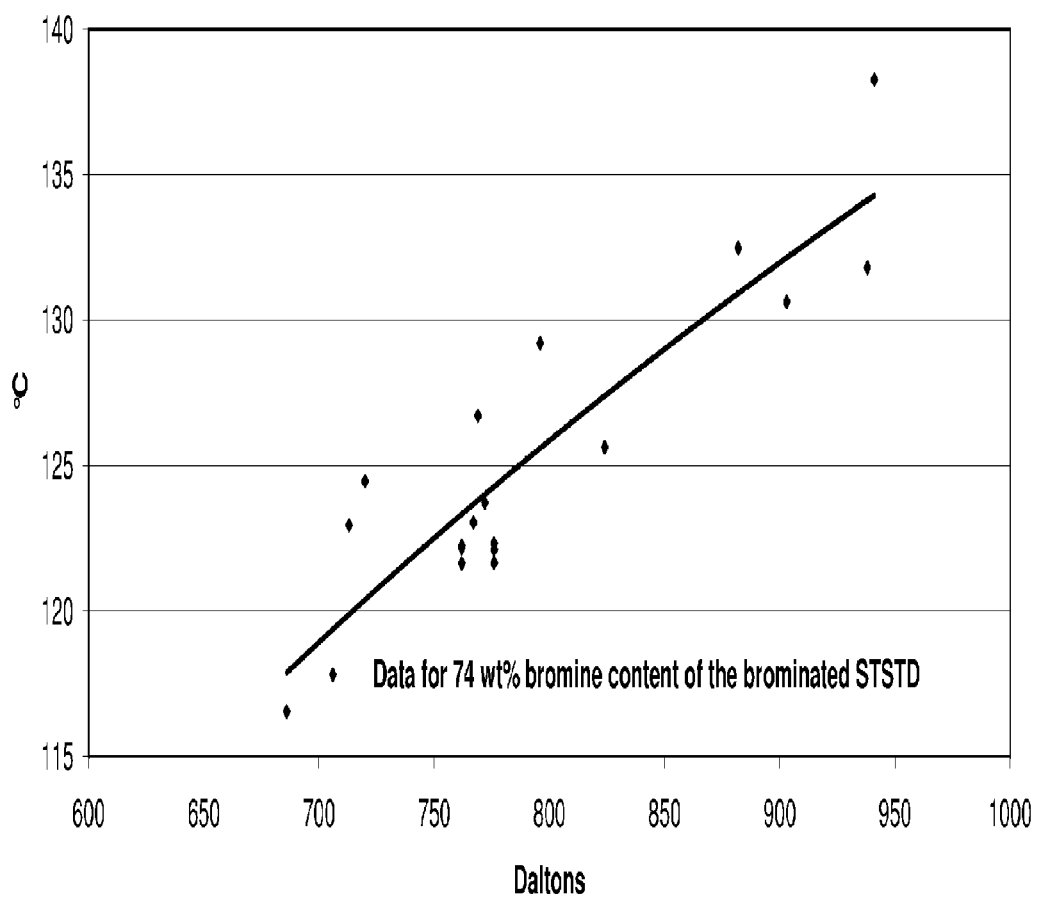
Fig. 8 - $T_g$ Brominated STSTDs as a Function of the $M_w$ of Unbrominated STSTDs of this Invention from which the Brominated STSTDS were Formed

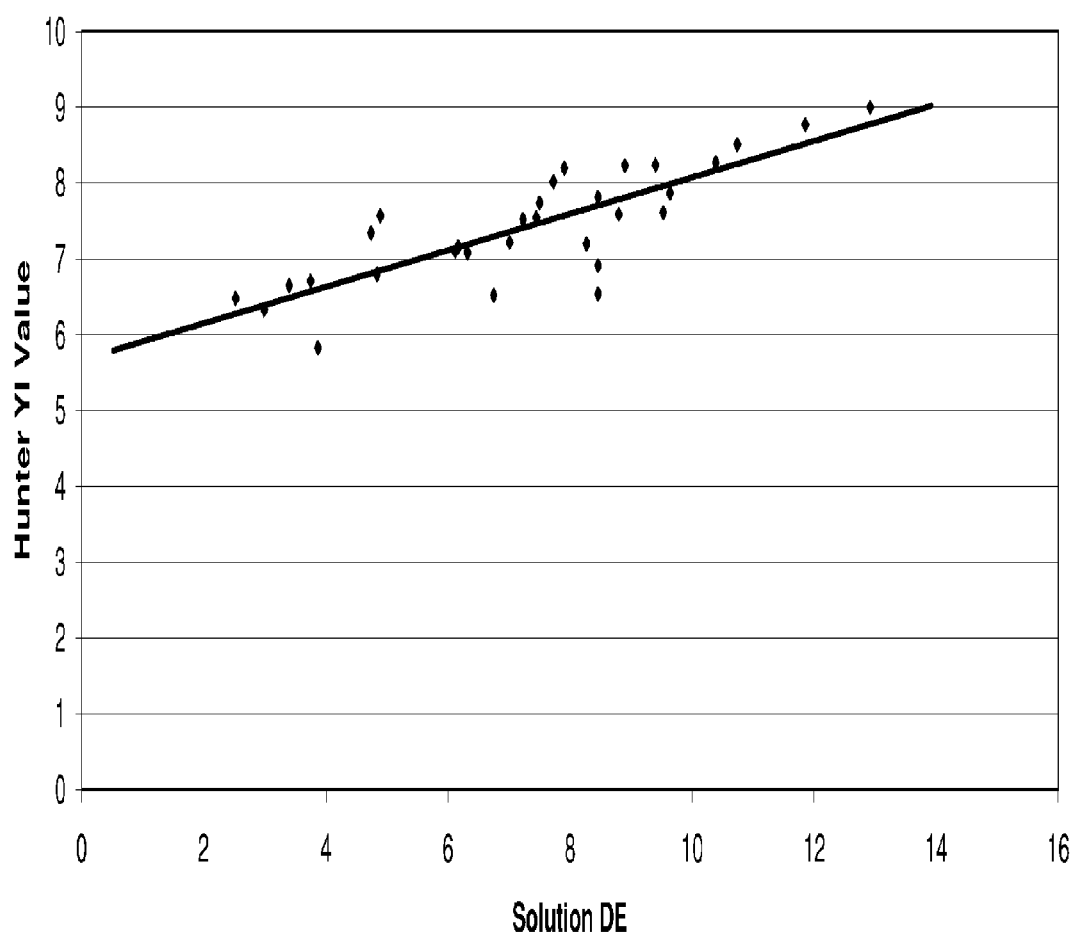
Fig - 9 Hunter Color YI Value of Flame Retardant HIPS Resins as a Function of Thermal Color Values (250°C 15 min) of Brominated STSTDs of this Invention

US 8,933,159 B2

BROMINATED FLAME RETARDANTS AND PRECURSORS THEREFOR

REFERENCE TO RELATED APPLICATIONS

This application is the National Stage of International Patent Appl. No. PCT/US2009/066134 filed on Nov. 30, 2009, which in turn claims the benefit of U.S. Provisional Patent Appl. No. 61/119,289, filed on Dec. 2, 2008, the disclosures of which are incorporated herein by reference.

TECHNICAL FIELD

This invention relates to certain novel and especially useful brominated flame retardants and novel hydrocarbon precursors of such flame retardants, the preparation of all such materials and the use of the brominated materials as flame retardants.

BACKGROUND

Oligostyrenes have long caught the attention of researchers in this field. Styrene is a readily available starting material and can be polymerized to form telomeric, oligomeric and low molecular weight polymeric distributions of polystyrene chains. Such polymerization reactions include radical, cationic and anionic mechanisms with and without chain transfer. However despite the attention and effort given this broad class of low molecular weight aromatic substrates, no commercially successful brominated ultra-low molecular weight oligostyrene or styrene based telomer having a bromine content above 71 wt % and a desirable combination of properties such as (i) initial color as measured by total solution color and Hunter color yellowness index; (ii) high thermal stability as measured by thermogravimetric analysis (TGA), thermal HBr, and thermal color; and (iii) optimal glass transition temperatures ($T_g$) has found success in the market place. This is surprising in that the potential of a useful low molecular weight brominated oligostyrene has been known since at least 1992 (see U.S. Pat. No. 5,112,898).

It is clear from the patent literature that low molecular weight oligostyrenes can be brominated either with bromine of bromine chloride to provide brominated oligostyrenes with bromine content of less than about 71 wt % bromine. Beyond that, the details provided are quite limited, hence the quality and utility of such brominated oligostyrene compositions as broad spectrum flame retardants is left to inference only, and have never been proven in a marketable product. Given that the key properties that delineate a useful flame retardant were omitted in the referenced patents, it may be reasonable to infer that the compositions thus produced were lacking key performance characteristics or economic advantages to warrant a commercial venture. For example, the low molecular weight oligostyrenes known heretofore are typically too expensive to be of commercial interest, or are in need of additional processing to gain some improvement in their properties. Moreover, brominated low molecular weight oligostyrenes known heretofore require additives to improve their thermal stability and/or require isolation from commercially unattractive processes.

Particularly lacking are the experimental details regarding the formation of the oligostyrene substrates. The few details that are provided point to oligostyrene distribution produce either neat or in solution using radical initiators at moderately high temperature or no initiator at extremely elevated temperatures. In addition to lacking the experimental details of their formation, none of the patents or any of the patents referenced with in those patents adequately describes the molecular weight distribution of the oligostyrene substrates that were brominated. Generally speaking all that is reported is one and only one of the following molecular weight parameters: $DP_n$; $M_p$; $M_n$; or $M_w$. It can be accepted, as an axiom that the performance characteristics of any polymeric and or oligomeric distribution are highly dependent upon many features among these is molecular architecture, microstructure, and molecular weight distribution. Each of these parameters is dependent upon the chemistries and conditions used to form such distributions. To liken one oligostyrene to another oligostyrene based on a similarity of any one or even the equivalency of all four aforementioned molecular weight distribution parameters is a fallacy. As is written in U.S. Pat. No. 5,687,090: "A polymer component is an ensemble of molecules whose properties are represented not as single values, but instead as property distributions. The properties of interest include the polymer molecular weight or chain length, copolymer composition, type and number of branches, type and number of end-groups, etc"

Heretofore, suggestions have been made to utilize various ultra low molecular weight oligostyrenes formed from anionic polystyrene (APS) mechanisms. However, the cost of an analogous (APS) oligostyrenes having a $DP_n$ in the range of interest for use in forming polymeric brominated flame retardants for high impact polystyrene is prohibitive. The high cost is necessitated by the use of a stoichiometric amount of an organolithium polymerization initiator.

Setting aside for but a moment the unfavorable economic factors associated with an APS based oligostyrene having a $DP_n$ in the range of 3 to about 20, there have been two literature reports of the synthesis of benzyl oligostyrene, ("benzyl-OS") via living anionic oligomerization using stoichiometric benzyl lithium formed from the reaction of butyllithium with toluene using N,N,N'N'-tetramethylethylenediamine, TMEDA: (1) Tsukahara, Y. et. al. *Polymer Journal* 1994 26 1013; and (2) Nakamura, Y. et. al. *Macromolecules* 2005, 38, 4432. The structure of these benzyl oligostyrenes is represented by the formula:

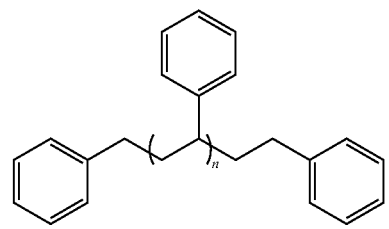

Between the two papers ten different benzyl-OS products were reported with $M_w$ and PD as follows: Benzyl-OS #1 1670, 1.15; #2 6710, 1.18; #3 15550, 1.13; #4 13400, 1.10; #5 16800, 10.7; #6 710, 1.13; #7 1870, 1.06; #8 3320, 1.03; #9 3440, 1.01; #10 7650, 1.08. $M_n$ can be calculated from polydispersity but unfortunately the value of $M_z$ was not reported in either paper for any of the distributions; in as much as APS chemistry is well known to produce near Gaussian shaped distributions. Hence $M_n$ and $M_z$ are symmetrically displaced about the central tendency or mean $M_w$ and $M_z$ does not deviate significantly from $M_w$.

Of these 10 structures, benzyl-OS #6 would appear to have a number average degree of polymerization ($DP_n$) in the range of interest for forming polymeric brominated flame retardants for use in high impact polystyrene applications. This product having a normal molecular weight distribution is represented by FIG. 1. However, as noted above, achieving this normal weight distribution is prohibitively expensive for flame retardant applications. The 710 $M_w$ APS benzyl-OS #6 referred to above requires 1 mole of a costly organolithium reagent for every 6 moles of styrene charged, and hence is not economically feasible as a suitable low molecular weight styrenic distribution substrate for formation of flame retardants and in turn use in flame retardant applications. Moreover, use of this 1:6 ratio of organolithium reagent to styrene necessitates use of a highly diluted reaction medium to maintain the solubility of the growing living polymer chains throughout the course formation of 710 $M_w$, APS benzyl-OS #6. Hence, the process efficiency is very low and incurs very high capital and operating costs, in addition to the very high raw material costs.

A feature of this invention is that it is now possible to produce on a commercially attractive economical basis, similarly populated molecular weight distributions with molecular weight parameters that approximate but are different from the normal molecular weight distribution of benzyl-OS #6.

It is important at this point to make further distinction between anionic oligostyrene distributions and other anionic styrenic distributions. For the purpose of clarification of this invention we utilize three different kinetic classifications as follows:
1. Oligomerization (No Chain Transfer, $M_n \approx M_{calc}$), $k_{tr}=0$.
2. Effective Chain Transfer (Reduction in Molecular Weight, $M_n < M_{calc}$) $k_i \approx k_p > k_{tr}$
3. Telomerization (Large Reduction in Molecular Weight, $M_n << M_{calc}$) $k_i \approx k_p < k_{tr}$, where $M_n$ is the number average molecular weight, $M_{calc}$ is the calculated molecular weight in the absence of chain transfer and is given by the expression: $M_{calc} \approx$(moles monomer/moles initiator)·(molecular weight of monomer), $k_i$ is the rate of initiation, $k_{tr}$ is the rate constant for chain transfer from the chain transfer agent to a growing chain and $k_p$ is the polymerization rate constant. An APS based oligostyrene distribution is one that formed under kinetic condition 1 above. In contrast, for a styrenic distribution formed from an anionic chain transfer process the kinetic condition described by either 2 or 3 above exists during its formation. Such a reaction will be referred to as anionic chain transfer styrenic reaction (sometimes designated hereinafter as "ACTSR"). A styrenic distribution formed from such a process will be referred to as an anionic chain transfer styrenic reaction (sometimes designated hereinafter as "ACTSR distribution"). These definitions are adapted from Rudin's (A. Rudin, *The Elements of Polymer Science and Engineering*, Academic Press, Orlando, 1982, pp. 3 and 212) definition of an oligomer and regarding chain transfer radical polymerizations. An ACTSR distribution formed under kinetic condition 3 is an anionic chain transfer styrenic telomer (sometimes referred to hereinafter as "ACTST distribution"). A telomer distribution of this invention is formed via anionic chain transfer using toluene as the chain transfer agent, hence such a distribution will be referred to as a toluene styrenic telomer distribution, (sometimes referred to hereinafter as "TSTD"). Reference is made to analogous ethylbenzene distributions; such a distribution formed from ethylbenzene will sometimes be referred to hereinafter as an "EBSTD".

The Nakamura and Tsukahara processes clearly yield oligostyrene distributions in that the process is run under such conditions (condition 1 above) in which no chain transfer can occur. Examples of ACTSR distributions formed under effective chain transfer conditions (condition 2 above) can be found in both Gatzke's report (A. L. Gatzke, *J. Polymer Science*, Part A-1, volume 7, pages 2281-2292, (1969) and in published European patent application EP 0 741 147 A1. Additionally, ethylbenzene styrenic telomer distributions (kinetic condition 3), EBSTD, have been reported in EP 0 741 147 A1.

EP 0 741 147 A1 is of interest in that it contains a discussion of some of the important reaction parameters relevant to the formation of the ACTSR distributions of that published application. Unfortunately, the disclosure of that document does not provide values for $M_z$, so the shape in terms of skewness and asymmetry cannot be determined for the distributions reported. A summary of the experimental disclosure in that document is basically as follows:
1. Use of a large volume of an inert medium (cyclohexane)
2. Use of a metal-alkoxide co-catalyst
3. Balancing rate of polymerization and rate of chain transfer such that they are of same order of magnitude via:
   a. Rate of addition of styrene
   b. Very limiting amount of ethylbenzene relative to styrene
   c. Moles of butyllithium initiator relative to ethylbenzene
   d. Temperature (60-80° C. preferred)
   e. Use of a Promoter, TMEDA
4. Relatively Long Monomer Feed, controlled gradual addition of styrene, "starve feeding".
5. Reactivation of "dead" polymer chains in a thermodynamic equilibrium to control shape of distribution.
6. Equilibration of chain transfer between dead and living polymer chains.

EP 0 741 147 A1 contains 7 examples setting forth experimental details. Of these, only Example 1 entails an anionic chain transfer styrenic telomerization reaction (sometimes referred to hereinafter as "ACTST reaction") in which a styrenic telomer distribution was formed without added diluent. That EBSTD had a $DP_n$ of 0.56, likely best described using an exponential probability density function, $f(x_i)=1/\beta \exp{-M_i/\beta}$ where $\beta$ is a scaling parameter of that probability density function. The telomerization process of Example 1 was conducted in ethylbenzene as both the solvent and chain transfer agent. And in Example 1, the styrene was fed in a continuous controlled operation lasting 18 hours.

In the course of our investigation of bromination of toluene styrenic telomer distributions (TSTDs) formed from chemistry analogous to Example 1, in the absence of potassium t-butoxide cocatalyst using much faster feed rates as comparative Example 1 of EP 0 741 147 A1, but slower than the feed rates of this invention, these TSTD materials once brominated, did not provide the superior thermal color performance of the brominated flame retardants of this invention, nor did they provide the enhanced melt flow properties when used as flame retardants in high-impact polystyrene (HIPS) as compared to the brominated flame retardants of this invention. Such TSTD materials suffered from increased asymmetry reflected by broader distributions and significant skewness. A typical distribution is represented in FIG. 2. Note, the sequentially decreasing relative weight percent with increasing molecular weight of each individual telomer chain in the distribution shown in FIG. 2.

The other six Examples of EP 0 741 147 A1 entail using limiting quantities of the chain transfer agent ethylbenzene and a large volume of a diluent, cyclohexane. The process was designed to yield styrenic distributions having less than 10 wt % of components with molecular weight <350 g/mole. From an English translation of EP 0 741 147 A1, it was noted that the document makes several kinetic and thermodynamic arguments as to why the process could be made to approximate a Poisson distribution. These arguments are as follows:

"... Counterion, activators, inflow rates and temperature should be chosen to ensure that the establishment of equilibria ... takes place as rapidly as the chain growth .... If this condition is met, relative molar mass distributions are obtained that correspond approximately to the Poisson distribution with $PDI=M_w/M_n=1+1/P_n$ where $P_n$ is obtained from the quotient from the number of moles of monomer and the transfer agent after the complete and irreversible course of reaction. Otherwise, $P_n$=moles(monomer)/(number of moles transfer agent+number moles organic base) ..."

In the Detailed Description section presented hereinafter, three comparative examples based on Example 4 of EP 0 741 147 A1 are presented. We have found that this process yields ethylbenzene styrenic telomer distributions (EBSTD) best modeled by a Lognormal probability density function, written as $f(x_i)=(M_i\sigma\sqrt{2\pi})^{-1}\exp-(\ln(M_i)-\mu)^2/2\sigma^2)$. Such a model is only in part contrary to the teachings of that document regarding formation of certain equilibria. Using that model and the values $M_n$=932, $M_w$=1500 reported for Example 4 of EP 0 741 147 A1, we predict a value for $M_z$ of 2376 Daltons. Table 1 hereof presents reaction parameters reported or derived from experimental details reported in EP 0 741 147 A1.

lated high molecular weight tail. Thus, though the material has a degree of polymerization of about 8, it has very significant levels (e.g., greater than about 25 wt %) of component telomer chains with molecular weights in excess of 2,000 molecular weight and still significant levels (e.g., greater than about 2.5 wt %) of component telomer chains with molecular weights in excess of 5,000 molecular weight, hence such a distribution loses the advantages gained from having short chain lengths and the ability to be brominated at levels in excess of 71 wt % bromine, cleanly and free of chain cleavage side reactions. What's more, the long chains contribute significantly to increases in the glass transition temperature, $T_g$, of the brominated distribution providing significantly reduced flow and impact properties when used as a flame retardant in high impact polystyrene resin applications (HIPS).

Much research has been conducted over the years in the search for new brominated flame retardants having superior properties, and such research has included a variety of very low molecular weight (number average DP<21) oligostyrene materials, none of which has achieved commercial success.

TABLE 1

| Example # | 1 | 2 | 3 | 4 | 5 | 6 | 7 |
|---|---|---|---|---|---|---|---|
| Cyclohexane Diluent (ml) | 0 | 1558 | 1558 | 1558 | 1558 | 1558 | 1558 |
| g Cyclohexane/g Styrene | 0 | 0.36 | 0.36 | 0.96 | 0.96 | 0.96 | 0.36 |
| Mole Styrene/mole Ethylbenzene | 0.44 | 7.03 | 7.03 | 7.09 | 14.18 | 14.18 | 18.86 |
| Mole Styrene/mole Ethylbenzene/hr | 0.02 | 0.39 | 1.17 | 1.18 | 2.36 | 2.36 | 1.05 |
| Mole Styrene/mole Lithium/hr | 10.67 | 10.66 | 31.98 | 32.06 | 64.12 | 32.06 | 21.30 |
| $DP_n$ | 0.56 | 7.40 | 10.63 | 7.94 | 19.53 | 15.67 | 4.70 |
| $M_n$ | 164 | 876 | 1212 | 932 | 2137 | 1736 | 596 |
| $M_w$ | 262 | 19700 | 41800 | 1500 | 4830 | 3750 | 33300 |
| $M_z$ | NR | NR | NR | NR | NR | NR | NR |
| PD | 1.60 | 22.50 | 34.50 | 1.61 | 2.26 | 2.16 | 55.90 |
| Standard Deviation $\sigma_n = (M_w M_n - M_n^2)^{1/2}$ | 127 | 4060 | 7013 | 728 | 2399 | 1870 | 4414 |

From the experimental details of EP 0 741 147 A1, as presented in Table 1 above, it can be seen by comparison of Examples 2-7, that only Example 4 produced an anionic chain transfer styrenic reaction distribution (ACTSR distribution) having limited breadth (standard deviation) and small polydispersity. Minor changes in the relative feed rates or charges as reported, or both simultaneously, resulted in ACTSR distributions having very large standard deviations and having polydispersity that increase significantly, and in some Examples, astronomically. Thus, it can be seen that from such experimental details, a very narrow and limited process window for producing distributions with narrow breath, i.e., small standard deviation $\sigma_n$ is provided.

Of the six Examples of EP 0 741 147 A1, only Example 4 has some molecular weight parameters or values that might indicate it would be useful for forming a brominated flame retardant. However, after preparing an analogous distribution formed from toluene instead of ethylbenzene, we have found that the high value for $M_z$ characteristic of the process chemistry of EP 0 741 147 A1 renders the distributions of low utility and little interest. The impact of having the high $M_z$, and what it reflects, is best represented in FIG. 3. Characteristic of the product distributions of the process chemistry of EP 0 741 147 A1, is a very highly skewed and highly popu- Indeed, so far as is known, no one has ever produced brominated flame retardants having broad spectrum application with the combination of superior properties of the brominated flame retardants provided by this invention. As will be seen from the ensuing description, this invention provides novel robust toluene styrenic telomer distributions having a number average DP<6.5 with molecular weight distributions that are narrowly distributed with limited skewness and low asymmetry which distributions afford on bromination, the unique superior brominated flame retardants of this invention. Moreover, these novel styrenic telomer distributions and the brominated polymeric flame retardants can be produced on an economically attractive and industrially feasible commercial scale.

DEFINITION OF TERMS

A brief resume of parameters used to describe molecular weight distributions and the equations that define them are presented in Table 2. (A. Rudin, *The Elements of Polymer Science and Engineering*, Academic Press, Orlando, 1982, pp. 54-58). The number average DP ($DP_n$) is calculated using $M_n$ and the molecular weight of the chain transfer agent ($MW_{CTA}$).

TABLE 2

| Parameter | Equation |
|---|---|
| $DP_n$, Number average degree of polymerization | $DP_n = (M_n - MW_{CTA})/104$ |
| $M_n$, Number average molecular weight | $M_n = (\Sigma M_i n_i)$ |
| $M_w$, Weight average molecular weight | $M_w = [(\Sigma M_i^2 n_i)/M_n]$ |
| $M_z$, z-Average molecular weight | $M_z = (\Sigma M_i^3 n_i)/\Sigma M_i^2 n_i$ |
| PD, Polydispersity Index (also PDI) | $PD = (\Sigma M_i n_i)/[(\Sigma M_i^2 n_i)/M_n]$ |
| Variance | $V = (M_w M_n - M_n^2)$ |
| Standard Deviation, $\sigma_n$ | $\sigma_n = \sqrt{(M_w M_n - M_n^2)}$ |
| Skewness, $_nU_3$ | $_nU_3 = M_z M_w M_n - 3M_n^2 M_w + 2M_n^3$ |
| Asymmetry, $_n\alpha_3$ | $_n\alpha_3 = (M_z M_w M_n - 3M_n^2 M_w + 2M_n^3)/\sigma_n^3$ |

BRIEF NON-LIMITING SUMMARY OF THIS INVENTION

In contrast and contrary to the general consensus of the prior art teachings, it has been found that when a normally liquid vinyl aromatic monomer (styrene) is fed to a reaction mixture formed from an organolithium reagent, a promoter, e.g., (N,N,N',N'-tetramethylethylenediamine, TMEDA), optionally a group IA or IIA cocatalyst, a chain transfer agent (toluene) in an essentially diluent free system, that is, without adding a separate diluent apart from that present with the organolithium catalyst, such that:
1) the feed rate of moles of styrene to moles of toluene per hour is from about 0.3 to about 1.5;
2) the feed rate of moles of styrene to moles of lithium used to form the catalyst per hour is about 40 to about 110;
3) the process is conducted such that the molar ratio of total amount of styrene fed to toluene charged is from about 0.5 to about 4:
4) the ratio of the total amount of styrene fed to alkyllithium used to form the catalyst is 100 to about 350;
5) the ratio of TMEDA to total alkyllithium charged is 2.2 to about 8;
6) the reaction temperature is in the range of 70° to 95°; and
7) where highly dispersive mixing is used such that neither a discrete polymerization nor a discrete chain transfer zone exists, then this unique process technology provides heretofore unknown toluene styrenic telomer distributions TSTDs that obey certain statistical functions and reaction kinetics.

These TSTDs are unique in their shape (molecular weight distribution as measured by variance, standard deviation, skewness and asymmetry) and their quality as measured by their suitability for bromination to form exceptionally pure and thermally stable broad spectrum flame retardant compositions.

Without desiring to be bound by theory, a tenable working hypothesis advanced in the development of this invention is that the toluene styrenic telomer distributions of this invention obey certain statistical laws as modeled by certain statistical probability density functions. In particular, it has been discovered that these TSTDs obey either the Weibull PDF or the Beta PDF over certain values of the scaling and shaping parameters of those PDFs. In contrast, it is generally understood by those skilled in the art that anionic polystyrene processes generally form Poisson distributions and Gaussian-shaped distributions. In the course of developing this invention and in contrast to the prior art teaching of EP 0 741 147 A1 with regard to Poisson distributions, it was also discovered that distributions formed by process technology of that disclosure and not of this invention obey statistical laws governed by the lognormal probability density function.

Thus this invention involves, among other things, the discovery of particular ensembles or groups of aromatic hydrocarbon polymer distributions (the TSTDs of this invention) that, on bromination, result in the formation of flame retardants having a uniquely beneficial combination of properties. This invention also involves, among other things, the group of novel and superior flame retardants producible from such aromatic hydrocarbon distributions.

For example, when a stripped TSTD of this invention was brominated to a level in the range of 73.5 to 74 wt %, the preferred resultant novel brominated aromatic flame retardants were characterized by having a glass transition temperature ($T_g$) in the range of 111° C. to 122° C., a thermogravimetric analysis (TGA) weight loss of 5% occurring at a temperature of greater than 350° C., thermal HBr evolution below 200 ppm at 300° C. and less than 900 ppm at 320° C. (e.g., in the range of 186 to 853 ppm at 320° C.), a solids Yellowness Index (YI) of less than 3.5, a solution color ΔE in the range of 0 to 1, and a desirably low thermal color ΔE as measured at 180° C. to 220° C. Additionally, experimental results obtained to date indicate that the novel brominated aromatic hydrocarbon polymers of this invention have broad spectrum flame retardant characteristics in that they are effective in a variety of host polymers to be flame retarded and the resultant polymer blends exhibit desirable thermal, impact, rheological, and color properties.

This invention also provides novel toluene styrenic telomer distributions uniquely suited for formation of brominated styrenic polymers having high bromine content and a unique combination of advantageous properties. Such properties are the result of the unique shape, breadth, limited skewness, and low asymmetry values characteristic of the unbrominated toluene styrenic telomers of this invention. Commercially feasible and economically attractive process technology for the preparation of the novel toluene styrenic telomer distributions and for the preparation of the novel brominated styrenic polymers of this invention are provided by this invention. Additionally, this invention provides new polymer compositions in which the flame retardant compositions of this invention have been blended.

The above and other features, embodiments, and advantages of this invention will become still further apparent from the ensuing description, comparative examples and appended claims.

BRIEF DESCRIPTION OF THE DRAWINGS

FIG. 1 is a bar graph representing the relative distribution of weight fractions as a function of the molecular weight of the discrete component chains of a prior art anionic polystyrene benzyl oligostyrene distribution having a molecular weight of 710 Daltons.

FIG. 2 is a bar graph representing the relative distribution of weight fractions as a function of the molecular weight of the discrete component chains of a Weibull distribution formed from an anionic chain transfer styrene telomer reaction akin to the EP 0 741 147 A1, Example 1.

FIG. 3 is a bar graph representing the relative distribution of weight fractions as a function of the molecular weight of the discrete component chains of a Lognormal distribution formed from an anionic chain transfer styrene telomer reaction akin to EP 0 741 147 A1, Example 4.

FIG. 4 is a bar graph representing the relative distribution of weight fractions as a function of the molecular weight of the discrete component chains of a toluene styrenic telomer distribution described by a Weibull distribution and formed by process technology of this invention.

FIG. 5 is a bar graph representing the relative distribution of weight fractions as a function of the molecular weight of the discrete component chains of a toluene styrenic telomer distribution described by Beta distribution and formed by process technology of this invention.

FIG. 6 is a graphical depiction of the relationship of the melt flow index of high impact polystyrene resin compositions formed from brominated styrenic polymers of this invention and the glass transition temperatures of said brominated styrenic polymers used.

FIG. 7 is a graphical depiction of the relationship of the Vicat of high impact polystyrene resin compositions formed from brominated styrenic polymers of this invention and the glass transition temperatures of said brominated styrenic polymers used.

FIG. 8 is a graphical depiction of the relationship of the dependency of glass transition temperature of brominated styrenic polymers of this invention on molecular weight as specified as $M_w$ of unbrominated STSTDs of this invention from which the brominated styrenic polymers were formed.

FIG. 9 is a graphical depiction of the relationship of the Hunter Color Yellowness Index (YI) values of high impact polystyrene resin compositions formed from brominated styrenic polymers of this invention and the thermal color values of said brominated styrenic polymers used.

FURTHER DETAILED DESCRIPTION OF THIS INVENTION

Distributions of Styrenic Telomers of the Invention

Provided by this invention, among other things, are a number of compositions which comprise telomer distributions in which styrene is the taxogen (polymerizable reagent) and toluene is the telogen (chain transfer agent) which is telomerized in the anionic chain transfer styrene reaction. Four such compositions are as follows:

i) A composition is provided, which comprises a distribution of toluene styrenic telomers of the formula:

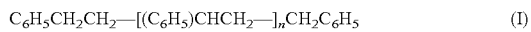

wherein each $C_6H_5$ is a phenyl group and for each molecule of said formula, n is an average number in the range of about 1.5 to about 5.5 with the proviso that 1,3-diphenylpropane, a compound of the above formula in which n is 0, optionally is present in said distribution in an amount of not more than 25 GPC area %, and wherein said distribution is further characterized by having an $M_w$ in the range of about 430 to about 1000, an $M_n$ in the range of about 350 to about 770, an $M_z$ in the range of about 550 to about 1700, a polydispersity in the range of about 1.2 to about 1.65, a standard deviation in the range of about 160 to about 500, and an asymmetry in the range of about 1.3 to about 3.2.

ii) A composition is provided, which comprises a distribution of toluene styrenic telomers of the formula:

$$C_6H_5CH_2CH_2—[(C_6H_5)CHCH_2—]_nCH_2C_6H_5 \quad (I)$$

wherein each $C_6H_5$ is a phenyl group and for each molecule of said formula, n is an average number in the range of about 2.6 to about 5.5 with the proviso that 1,3-diphenylpropane, a compound of the above formula in which n is 0, optionally is present in said distribution in an amount of not more than 5 GPC area %, and with the further proviso that said distribution optionally further contains toluene in an amount of not more than 0.1 wt %, and wherein said distribution is further characterized by having an $M_w$ in the range of about 630 to about 1060, an $M_n$ in the range of about 460 to about 770, an $M_z$ in the range of about 770 to about 1700, a polydispersity in the range of about 1.2 to about 1.65, a standard deviation in the range of about 250 to about 520, and an asymmetry in the range of about 1.3 to about 2.9.

iii) A composition is provided, which comprises a distribution of toluene styrenic telomers of the formula:

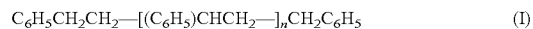

wherein each $C_6H_5$ is a phenyl group and for each molecule of said formula, n is an average number in the range of about 2.8 to about 5.5 with the proviso that 1,3-diphenylpropane, a compound of the above formula in which n is 0, optionally is present in said distribution in an amount of not more than 1 GPC area %, and with the further proviso that said distribution optionally further contains toluene in an amount of not more than 0.1 wt %, and wherein said distribution is further characterized by having an $M_w$ in the range of about 645 to about 1100, an $M_n$ in the range of about 490 to about 770, an $M_z$ in the range of about 780 to about 1760, a polydispersity in the range of about 1.2 to about 1.65, a standard deviation in the range of about 250 to about 530, and an asymmetry in the range of about 1.3 to about 2.8.

iv) A composition is provided, which comprises a distribution of toluene styrenic telomers of the formula:

$$C_6H_5CH_2CH_2—[(C_6H_5)CHCH_2—]_nCH_2C_6H_5 \quad (I)$$

wherein each $C_6H_5$ is a phenyl group and for each molecule of said formula, n is an average number in the range of about 2.9 to about 3.9 with the proviso that 1,3-diphenylpropane, a compound of the above formula in which n is 0, optionally is present in said distribution in an amount of not more than 1 GPC area %, and with the further proviso that said distribution optionally further contains toluene in an amount of not more than 0.1 wt %, and wherein said distribution is further characterized by having an $M_w$ in the range of about 650 to about 750, an $M_n$ in the range of about 500 to about 600, an $M_z$ in the range of about 830 to about 1120, and a polydispersity in the range of about 1.2 to about 1.35. Desirably, the distributions of the compositions described in this paragraph are further characterized by having an $M_w$ in the range of about 690 to about 730, an $M_n$ in the range of about 520 to about 560, an $M_z$ in the range of about 910 to about 960, and a polydispersity in the range of about 1.25 to about 1.32.

Particularly preferred embodiments of this invention are ACTSRs that yield TSTDs which can be reasonably described (modeled) by both equation (1) below. Equation (1) is known as the Weibull probability density function (PDF). Equation (1) is evaluated for discrete values of $x_i$. Such a typical Weibull distribution is represented by FIG. 4. Such calculations for the Weibull PDF are conveniently made through the use of modern spreadsheet software programs that contain the Weibull PDF among their built in ensemble of statistical functions. Equation (2) provides the normalized weight fraction $X_i$ for telomer component chain $x_i$. From equations (2) and (3) the mole fraction, $n_i$, is calculated over the range $x_i$ from $x_i=1$ to at least $x_i=(M_w+6\sigma)/104$. From $n_i$ and $M_i$ (the molecular weight of polymer component chain $x_i$), values for $M_n$, $M_w$ and $M_z$ are calculated from the Weibull distribution, according to the equations for those parameters presented in Table 2 above. The model "fit" or accuracy is in turn evaluated based on comparison of values generated for PDI, standard deviation $(\sigma_n)$, skewness $_nU_3$ and asymmetry $(_n\alpha_3)$ with those generated from the experimentally determined values (GPC analytical results).

$$f(x_i)=\gamma/\alpha(x_i/\alpha)^{(\gamma-1)}\exp(-(x_i/\alpha)^\gamma) x_i \geq 0; \gamma, \alpha > 0 \quad (1)$$

and $$X_i = f(x_i)/\Sigma f(x_i), \quad (2)$$

and $$n_i = X_i/M_i \quad (3)$$

We have found that such TSTDs if produced under the process conditions of this invention are uniquely suitable for formation of polymeric brominated flame retardant distributions. As formed without further processing, Weibull toluene styrenic telomer distributions where γ is in the range of about 0.9 to about 1.8 and α is in the range of about 3.5 to about 9.5 are particularly useful in forming TSTDs suitable for bromination and manufacture of polymeric flame retardants. Such TSTDs have $M_n$ in the range of about 350 to about 700, $M_w$ in the range of about 550 to about 1000, $M_z$ in the range of 780 to about 1700, with PDI in the range of about 1.2 to about 1.9, $\sigma_n$ in the range of about 160 to about 500 and $_n\alpha_3$ in the range of 1.3 to about 3.2. Preferred TSTDs for forming polymeric brominated flame retardants have $M_n$ in the range of about 425 to about 600, $M_w$ in the range of about 580 to about 960, $M_z$ in the range of 760 to about 1430, and have a PDI in the range of about 1.3 to about 1.6, a $\sigma_n$ in the range of about 260 to about 390 and an $_n\alpha_3$ in the range of 1.6 to about 2.1. More preferred TSTDs for forming polymeric brominated flame retardants have $M_n$ in the range of about 430 to about 550, $M_w$ in the range of about 600 to about 820, $M_z$ in the range of 790 to about 1140, and have a PDI in the range of about 1.3 to about 1.5, a $\sigma_n$ in the range of about 250 to about 475 and an $_n\alpha_3$ in the range of 1.6 to about 1.9.

Particularly preferred embodiments of this invention are ACTSR compositions that yield toluene styrenic telomer distributions, TSTDs which have relatively low 1,3-diphenylpropane content. Such TSTDs can be reasonably described (modeled) by both equation (4) below. Similar to the discussion above regarding Weibull distributions, equation (4) below is known as the Beta probability density function. Equation (4) below can be evaluated for discrete values of polymer component chain $x_i$. However it is more convenient to use the cumulative Beta distribution equation (5) below which, like the Weibull PDF, is generally provided as a function of modern spread sheet software programs. Such a typical Beta distribution is represented by FIG. 5. For a Beta probability density function $f(x_i) = X_i$, because the values are already normalized. The mole fraction $n_i$ is calculated according to equation (3) above over the range $x_i$ from $x_i=1$ to at least $x_i = (M_w + 6\sigma)/104$. And as before, from both $n_i$ and $M_i$, values for $M_n$, $M_w$ and $M_z$ are calculated but now from the difference in the cumulative Beta probability density function evaluated at discrete values of $x_i$ and $x_{i-1}$ according to equation (6) below. The model "fit" or accuracy is in turn evaluated based on comparison of values generated for PDI, standard deviation ($\sigma_n$), skewness $_nU_3$ and asymmetry ($_n\alpha_3$) with those generated from the experimentally determined (GPC analytical results) values.

$$f(x_i) = x^{\alpha-1}(1-x)^{\beta-1}/B(\alpha,\beta) \quad (4)$$

Where $0 \leq t \leq 1; \alpha, \beta > 0$ $$F(x_i) = I_x(\alpha,\beta) = \int t^{\alpha-1}(1-t)^{\beta-1} dt/B(\alpha,\beta) \quad (5)$$

Evaluated from $t=0$ to $t=x_i$ $$f(x_i) \approx F(x_i) - F(x_{i-1}) \quad (6)$$

We have found that such TSTDs if produced under the process conditions of this invention in which a metal alkoxide co-catalyst is introduced, then such compositions are surprisingly quite suitable for formation of polymeric brominated flame retardant distributions for use in higher temperature applications. Such materials tend to give rise to brominated flame retardant distributions with significantly increased thermal color stability when aged at 300° C. for 20 minutes and higher TGA 5% wt loss values. Moreover, these materials are not susceptible to a reduction in product quality when prepared in a 316 stainless steel reactor. These toluene styrenic telomer distributions fit the Beta PDF where α is in the range of about 1 to about 2.6 and β is in the range of about 15 to about 32, where α and β are scaling and shaping parameters characteristic of a Beta PDF. Such TSTDs have $M_n$ in the range of about 370 to about 770, $M_w$ in the range of about 550 to about 1000, $M_z$ in the range of 790 to about 1500, and have PDI in the range of about 1.2 to about 1.65, $\sigma_n$ in the range of about 260 to about 500 and $_n\alpha_3$ in the range of 1.3 to about 2.2.

The asymmetry value with regard to the preferred TSTD distributions of this invention is of considerable importance. This is a consequence of the desire to reduce the formation of the lowest molecular weight component chain fraction $x_i$, 1,3-diphenylpropane (where i=1). The presence of significant quantities of 1,3-diphenylpropane in a TSTD results in reduced performance of the brominated polymeric flame retardant distributions derived therefrom. Therefore 1,3-diphenylpropane is optionally (and preferably) removed from the distribution prior to bromination, usually by distillation using a wiped film evaporator (WFE). Though the 1,3-diphenylpropane has value in and of itself, its formation represents a yield loss and reduces process efficiencies. It is desirable therefore to reduce the formation of 1,3-diphenylpropane in a TSTD reaction mixture while simultaneously not increasing the $M_w$ of the TSTD. Generally speaking, a reduction in formation of 1,3-diphenylpropane results in a higher $M_n$ at a constant $M_w$ and thus also generally requires a reduction in $M_z$. It is deemed important to produce distributions with reduced $M_z$ at constant $M_w$ in order to provide the benefit of forming brominated polymeric flame retardant distributions that yield superior melt flow and impact properties once incorporated into flame retardant HIPS compositions. It is also believed that the longer component chains $x_i$ having styrene repeat units of more than 20 (i>20) brominate less efficiently and hence less cleanly. Therefore it is desirable to minimize the total weight fraction of such higher molecular weight components in the product distribution (e.g., the total is typically less than about 1.0 wt % to a maximum total wt % of less than about 4 wt %); this is reflected in a general reduction in $M_z$, skewness and asymmetry. The ability to actually shape and form TSTDs with very low asymmetry values is a major advantage and feature of the process technology of this invention.

Under most process conditions of this invention Weibull distributions result for the crude reaction mixture. A Weibull distribution is characterized by the fact that it is a distribution of population densities of the random variable x, said population densities being generated by one and only one random event. For Weibull distributions of this invention the random variable is the discrete telomer component chain $x_i$ and the random event is chain transfer from the chain transfer agent toluene. Thus the probability density distribution of $x_i$ is $X_i$ (weight fraction of $x_i$) and is dictated by the probability $P_{tr\,t,i}$. Where $P_{tr\,t,i}$ is the probability that chain transfer from toluene to living telomer component chain $x_i$ will occur to form dead telomer component chain $x_i$. For the Weibull distributions of this invention $P_{tr\,t,i}$ is not equal for all and is dependent upon i, $P_{tr\,t,1} \neq P_{tr\,t,2} \neq P_{tr\,t,3} \neq \ldots P_{tr\,t,i}$ (i is the number of styrene rings comprising telomer component chain $x_i$).

In a limited number of process conditions of this invention Beta distributions are formed. Beta distributions result from process conditions of this invention that entail the presence of a co-catalyst such as a metal alkoxide. A Beta distribution is characterized by the fact that it is a probability density of the random variable x, where the population of x is dictated by a second random event enacted upon the population established by the first random event. Like the Weibull distributions of this invention, the first random event is chain transfer from the chain transfer agent toluene. The probability of chain transfer from the chain transfer agent toluene is denoted as $P_{tr\ t,i}$ and $P_{tr\ t,1} \neq P_{tr\ t,2} \neq P_{tr\ t,3} \neq \ldots P_{tr\ t,i}$ (i is the number of styrene rings comprising chain $x_i$). For the Beta distributions of this invention the second random event is the probability of regeneration $P_{ri}$ and is associated with a dead telomer component chain $x_i$'s propensity to be regenerated. Regeneration of a telomer chain component $x_i$ is the reverse reaction of chain transfer involving toluene. The shape and asymmetry of such Beta toluene styrenic telomer distributions of this invention would indicate that $P_{r1} >> P_{r2} >> P_{r3} > \ldots P_{ri}$. One skilled in the art would recognize that the trend is easily rationalized based on size, steric interactions (chain entanglements) and rates of diffusion of smaller size component chains.

One surprising attribute of the Beta distributions formed using a metal alkoxide cocatalyst is that these distributions when formed in a metal reactor, such as a 316 stainless steel reactor, do not exhibit reduced thermal color stability at 300° C. when brominated as compared to Weibull distributions formed without the cocatalyst in such metal reactor. Weibull distributions formed in a glass lined reactor when brominated exhibit markedly better thermal color stability at 300° C. when compared to analogous brominated distributions formed in a 316 stainless steel reactor. In the case of the Weibull distributions formed in the absence of the co-catalyst, the reduced thermal stability at 300° C. when the reaction is conducted in a 316 stainless steel reactor appears to be a surface chemistry phenomenon. This reduced performance may be ameliorated upon scale-up to significantly larger volumes (e.g., from 2 gallons to 2000 gallons).

It has not escaped our attention that process conditions and process options can be modified such that distributions other than Weibull and Beta can be formed. Such operations can result in other distributions with multiplicative probabilities such as a lognormal distribution. There exist a continuum of process options between the processes that yield distributions most closely modeled using the Weibull PDF and those which yield distributions most accurately modeled by a Beta PDF. Further it also has not escaped our attention that a second, third and even a fourth chain transfer agent can be employed in addition to toluene. Such chain transfer agents include ethyl and other n-alkyl benzenes, as well as the various isomers of xylenes and other polymethylated benzenes. The use of alkyl benzenes other than methyl benzenes is not preferred under some process conditions due to a tendency for the formation of quaternary carbon atoms in the alkylaromatic styrenic telomer backbone. Such structural features are prone to dealkylation during the bromination process and lead to high levels of undesired impurities in the brominated polymeric compositions.

Accordingly, still another aspect of this invention is the provision of compositions which comprise in the range of about 0.1 to about 99.9 wt % of a composition of i), ii), iii), or iv) and in the range of about 99.9 to about 0.1 wt % of one or more styrene based telomer distribution(s) formed from one or more aromatic hydrocarbon compounds having in the range of about 1 to about 4 aromatic rings in the molecule (which may be condensed or non-condensed or a combination of condensed and non-condensed), and which compounds are further characterized in that (a) when the compound has 1 to about 4 aromatic rings in the molecule the substituent or the substituents on the ring(s) consist(s) of two or more methyl group(s) per molecule, or (b) when the compound has 2 to about 4 aromatic rings in the molecule the sole substituent on the ring(s) of the compound is a single methyl group. Non-limiting examples of aromatic hydrocarbon compounds of type (a) include one or more xylene isomers, isomers of trimethylbenzene (e.g., mesitylene, 1,2,4-benzene, etc.), isomers of tetramethylbenzene (e.g., durene, 1,2,3,4-benzene, etc.). Non-limiting examples of aromatic hydrocarbon compounds of type (b) include one or more condensed polycyclic aromatic hydrocarbons (e.g., 1- or 2-methylnaphthalene, or a mixture of both), and one or more non-condensed polycyclic aromatic hydrocarbons (e.g., one or more isomers of monomethylbiphenyl, one or more isomers of polymethylated biphenyl (e.g., isomers of dimethylbiphenyl, mixtures of monomethylbiphenyl and one or more isomers of dimethylbiphenyl, and/or one or more isomers of trimethylbiphenyl, etc.)

Processes of this Invention for Forming Distributions of Styrenic Telomers of this Invention Also provided by this invention, among other things, is a process for producing a composition as above, which process comprises:

I) feeding styrene through a small orifice with a feed velocity greater than 10 feet/second into an agitated reaction mixture formed from components comprising toluene, alkyllithium, and optionally Group IA or IIA co-catalyst and TMEDA, at rates of (i) moles of styrene/moles of toluene/hour in the range of about 0.3 to about 1.5 and (ii) moles of styrene/moles of alkyllithium/hour in the range of about 40 to about 110; with a molar ratio of styrene:toluene in the range of about 0.75 to about 4, a molar ratio of styrene:alkyllithium in the range of about 150 to about 350, and a molar ratio of TMEDA:alkyllithium in the range of about 2.2 to about 8; and maintaining the temperature of the reaction mixture in the range of about 70° C. to about 95° C.; the agitation being at least sufficient to maintain a substantially homogeneous concentration profile in the reaction mixture;

II) quenching the reaction mixture to destroy the catalyst species formed in (I)

A) water washing the quenched reaction mixture to remove metal-containing component(s) formed as a result of the quenching or water washing and making at least one phase cut to remove aqueous phase, separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %; or B) stripping anhydrous toluene and TMEDA thereby separating and recovering dry TMEDA and unreacted toluene from the reaction mixture, adding back at least an equal volume of toluene as was stripped and then adding wash water and making at least one phase cut to remove aqueous phase; (a) separating and recovering toluene used for washing, whereby water is also removed from the reaction mixture and continuing the separation such that the toluene content of the resultant product mixture is less than 0.1 wt % and the content of 1,3-diphenylpropane in the product mixture is less than 25 wt %.

Also provided by this invention, among other things, is a process for producing a composition as above, which process comprises:

I) feeding styrene into an agitated reaction mixture formed from components comprising toluene, alkyllithium, and TMEDA, at rates of (i) moles of styrene/moles of toluene/ hour in the range of about 0.3 to about 1.5 and (ii) moles of styrene/moles of alkyllithium/hour in the range of about 40 to about 110; with a molar ratio of styrene:toluene in the range of about 0.75 to about 4, a molar ratio of styrene:alkyllithium in the range of about 150 to about 350, and a molar ratio of TMEDA:alkyllithium in the range of about 2.2 to about 8; and maintaining the temperature of the reaction mixture in the range of about 70° C. to about 90° C.; the agitation being at least sufficient to maintain a substantially homogeneous concentration profile in the reaction mixture;

II) quenching the reaction mixture while at a temperature of below about 80° C. with a protic solvent which, (i) if water is the quenching solvent, making at least one phase cut, and (ii) if a quenching solvent other than water is used, adding wash water and making a phase cut; and III) separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %, preferably less than 5 wt %, and more preferably less than 1 wt %.

Brominated Styrenic Polymers of this Invention

This invention still further provides, among other things, a brominated flame retardant composition which comprises a brominated aromatic polymer of the formula:

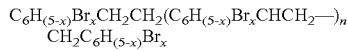

wherein:

n is an average number in the range of about 2.6 to about 5.5;

each x is the same or different and is a whole number in the range principally of 2 to 5 (it is conceivable that very small fractions of rings exist where x is 0 or 1);

the average number of all of the x's in the composition is in the range of about 3.00 to about 3.80;

a glass transition temperature in the range of about 90° C. to about 140° C.

the weight percent of bromine as determined by XRF in the polymer is in the range of about 71 to about 75; and the values of $M_n$, $M_w$ and $M_z$ of the brominated polymer distribution are such that the standard deviation is in the range of $\sigma_n \approx 250/(1-\text{wt \% Br})$ to about $\sigma_n \approx 530/(1-\text{wt \% Br})$ and that the asymmetry ($_n\alpha_3$) is in the range of about 1.3 to about 4.5, and desirably is in the range of about 1.3 to about 3.2.

This invention still further provides, among other things, a brominated flame retardant composition which comprises a brominated aromatic polymer of the formula:

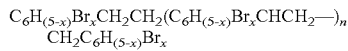

wherein n is an average number in the range of about 2.9 to about 3.9, wherein each x is the same or different and is a whole number in the range of 3 to 5, the average number of all of the x's in the composition being in the range of about 3.50 to about 3.80 and the weight percent of bromine as determined by XRF in the polymer is in the range of about 73.4 to about 74.5.

Preferred brominated flame retardant compositions are those which contain one or more of the following distinguishing characteristics:

a TGA weight loss of 5% occurring at a temperature greater than 350° C., a thermal HBr value at 300° C. below the detection limit of 50 ppm and no more than about 200 ppm, a thermal HBr value at 320° C. in the range of about 100 ppm to about 900 ppm, an ASTM D 1925 Yellowness Index in the range of about 1 to about 6.5, a ΔE value in the Hunter Solution Color Value Test in the range of 0 to about 4, and a glass transition temperature in the range of about 90° C. to about 140° C.

Additionally, preferred brominated flame retarded compositions of this invention feature an enhanced thermal color stability as determined by the Hunter Solution Color Value Test ΔE before and ΔE after thermal ageing under an inert atmosphere at 250° C. for 15 minutes in the less than about 15 and at 300° C. for 20 minutes of less than 25.

More preferred brominated flame retardant compositions are those which contain one or more of the following distinguishing characteristics:

a TGA weight loss of 5% occurring at a temperature greater than 360° C., a thermal HBr value at 300° C. below the detection limit of 50 ppm and no more than about 200 ppm, a thermal HBr value at 320° C. in the range of about 100 ppm to about 900 ppm, an ASTM D 1925 Yellowness Index in the range of about 1 to about 3.5, a ΔE value in the Hunter Solution Color Value Test in the range of 0 to about 2, and a glass transition temperature in the range of about 115° C. to about 130° C.

Additionally, more desirable brominated flame retarded compositions of this invention feature an enhanced thermal color stability as determined by the Hunter Solution Color Value Test ΔE before and ΔE after thermal aging under an inert atmosphere at 250° C. for 15 minutes in the less than about 10 and at 300° C. for 20 minutes of less than 15.

Processes of the Invention for Forming Distributions of Styrenic Telomers of the Invention Formula (I), which for convenience is again presented here depicts the composition of the novel anionic chain transfer produced toluene styrenic telomer distributions, TSTDs of this invention:

$$C_6H_5CH_2CH_2—[(C_6H_5)CHCH_2—]_nCH_2C_6H_5 \qquad (I)$$

wherein n is an average number in the range of about 1.5 to about 5.5 (preferably 2.6 to about 5.5, more preferably about 2.8 to about 5.5 and still more preferably about 2.9 to about 3.9) with the proviso that 1,3-diphenylpropane, a compound of the above formula in which n is 0, optionally is present in said distribution in an amount of not more than 25 GPC area %, (preferably not more than 5 GPC area %, still more preferably not more than 1 GPC area %) and wherein said distribution is further characterized by having an $M_w$ in the range of about 430 to about 1000 (preferably about 630 to about 1060, more preferably about 645 to about 1100, and still more preferably about 650 to about 750), an $M_n$ in the range of about 350 to about 770 (preferably about 460 to about 770, more preferably about 490 to about 770, and still more preferably about 500 to about 600), an $M_z$ in the range of about 550 to about 1700 (preferably about 770 to about 1700, more preferably about 780 to about 1760, and still more preferably about 830 to about 1120), a polydispersity in the range of about 1.2 to about 1.65 (preferably about 1.25 to about 1.32), a standard deviation in the range of about 160 to about 500 (preferably about 250 to about 520, more preferably about 250 to about 530), and an asymmetry in the range of about 1.3 to about 3.2 (preferably about 1.3 to about 2.9, more preferably about 1.3 to about 2.8). These are unbrominated compositions of the invention. It is again to be noted that formula (I) is not intended to limit or otherwise specify the spatial configuration with regard to stereoregularity of the TSTDs of this invention. For example, the formula does not limit such telomers to any degree of tacticity such as primarily isotactic, primarily syndiotactic, or primarily atactic polystyrenes.

It is also to be understood and appreciated that the term "brominated styrenic polymer distribution" (whether in the singular or the plural) as used anywhere herein, including the claims, refers to the brominated toluene styrenic telomer distributions of this invention in that they have higher molecular weights than the unbrominated toluene styrenic telomers of this invention.

In a preferred process of this invention for preparing the distribution of styrenic telomers of this invention, styrene is fed into an agitated reaction mixture formed from components comprising toluene, alkyllithium, N,N,N',N'-tetramethylethylenediamine (TMEDA) and optionally a Group IA (e.g., Na, K, Cs, and alloys thereof) or Group IIA (e.g., Mg) co-catalyst (a number of known Groups IA and IIA compounds can be used in forming the catalyst, see for example U.S. Pat. No. 3,742,077), at rates of (i) moles of styrene/moles of toluene/hour in the range of about 0.3 to about 1.5 and (ii) moles of styrene/moles of alkyllithium/hour in the range of about 40 to about 110. The molar ratio of styrene:toluene is in the range of about 0.75 to about 4, the molar ratio of styrene:alkyllithium is in the range of about 150 to about 350, and the molar ratio of TMEDA:alkyllithium is in the range of about 2.2 to about 8. The temperature of the reaction mixture is maintained in the range of about 70° C. to about 90° C. (though a brief ramp to about 95° C. or more though not recommended can be tolerated with out significant loss in product quality), and preferably in the range of about 78° C. to about 81° C.; the agitation being at least sufficient to maintain a substantially homogeneous concentration profile in the reaction mixture. Upon completion of the reaction, as indicated, for example, by rapid reduction in the process temperature at constant heat flux, the reaction mixture is quenched, typically at a temperature of below about 80° C. The quenching is effected using a protic solvent which, (i) if water is the quenching solvent, at least one phase cut is made to separate the organic and aqueous phases, and (ii) if a quenching solvent other than water is used, wash water is added to extract the quenching solvent and form an organic phase and an aqueous phase which are then separated by a phase cut. The TMEDA and unreacted toluene are separated and recovered from the reaction mixture, whereby the last traces of water are also removed azeotropically from the reaction mixture. This separation operation is continued until the toluene content of the resultant product mixture is less than 0.1 wt % and the content of 1,3-diphenylpropane in the product mixture is less than 1 wt %. Preferably, the TMEDA-toluene mixture is recovered and recycled to the reaction after drying by conventional means, which include passing through molecular sieves or by refluxing under a sparge of dry nitrogen, or any other method which preferably does not remove the TMEDA from the toluene. If the method happens to remove the TMEDA, it is desirable from a process economics standpoint to recover and recycle the TMEDA as well as the toluene. In the quenching operation and washings thereafter, use of deoxygenated water is especially desirable because it suppresses formation of color bodies in the toluene styrenic telomer distribution. Formation of such color bodies is very undesirable in as much as the amount of such color bodies can continuously increase as the commercial production unit reaches steady-state production. A commercial plant facility can be operated either on a batch, semi-batch, or continuous mode using balanced feeds as described above.

A feature of the process for preparing the TSTDs of this invention is the extent to which the reagents in the reaction mixture are uniformly dispersed. Thus, the combination of significant agitation and dispersive mixing of the reagents in the reaction mixture is utilized in order to provide the toluene styrenic telomer distributions of this invention. More specifically, the agitation and mixing used should be at least sufficient to maintain a substantially homogeneous concentration profile in the reaction mixture. That is to say, that concentration gradients of all reagents in the total volume of the reaction mixture should be at a minimum such that there is no one discrete propagation reaction zone (i.e., locally high concentrations of any such reagent are at a minimum) or discrete chain transfer zone (i.e., locally low concentrations of any such reagent are at a minimum). As a consequence of this, the complementary reaction probabilities and hence kinetics of chain transfer and chain propagation occur uniformly throughout the entire volume of the reaction mixture, thereby providing the uniform and narrow molecular weight distributions achieved in the practice of the processes of this invention. In doing so, competing undesirable side reactions which would lead to catalyst inefficiencies and formation of impurities are essentially eliminated.

As will be seen from the results of the Experiments reported in Tables 15-19, hereinafter, the polystyrene compositions with which had been blended brominated styrenic polymer distributions of this invention have an exceptionally desirable combination of properties, especially as regards the thermal properties of heat deflection temperature (HDT), Vicat performance, and melt flow index (MFI). Without desiring to be bound by theory, from the experimental results and other observations made at our laboratories, it is believed that this unique combination of beneficial thermal properties may be due to the stereoregularity and type of tacticity of the TSTDs of this invention. In other words, it is believed that the stereochemistry of the starting materials beneficially influences the performance of the brominated products of this invention produced from such starting materials. More specifically, it is theorized that the $T_g$ of the brominated styrenic polymer distributions of this invention is in part a function of the form and degree of tacticity of the unbrominated distributions of styrenic polymer of this invention. It is postulated that the $T_g$ of the brominated anionic chain transfer styrenic polymer distributions of this invention enables prediction of the melt flow index (MFI) of resins in which they are compounded. As seen from the results in Tables 16-20, it is desirable that the $T_g$ of the brominated polystyrene resin be in the range of about 110° C. to about 140° C., and preferably in the range of 115° C. to 125° C. Accordingly, it has been discovered in our laboratories that as can be seen in FIG. 6 there is a general correlation between $T_g$ of a brominated chain transfer styrenic polymer and the MFI of a finished polymer composition with which the brominated chain transfer styrenic polymer has been blended (in particular in high impact polystyrene (HIPS) applications), irrespective of the mode by which the chain transfer styrenic polymer was prepared. This allows one to predict the performance with respect to the MFI of a finished polymer composition formed by blending the brominated flame retardant with a suitable host polymer such as HIPS simply by measuring its $T_g$. As can be seen in FIG. 7, a similar but inverse relationship exist between $T_g$ of a brominated chain transfer styrenic polymer the Vicat of a finished polymer composition with which the brominated chain transfer styrenic polymer has been blended. As can be seen from FIG. 8, $T_g$ of a brominated polystyrene polymer is influenced by its molecular weight, which is a product of its unbrominated molecular weight and the weight percent bromine in the brominated polymer. Additionally, it is influenced by the stereochemistry, stereoregularity, and tacticity of the brominated polystyrene distribution. It is further believed that stereochemistry, stereoregularity, and tacticity does not change during the bromination procedure. Therefore, this invention has led to the discovery of the importance of being able to beneficially influence the stereochemistry, stereoregularity, and tacticity of the unbrominated polymer, which in turn enables formation of the brominated flame retardants of this invention having the exceptional combination of properties such as shown in Tables 3-5. In FIG. 9 the direct and close relationship of thermal color stability of the brominated chain transfer styrenic polymer to the color of a finished polymer composition with which the brominated chain transfer styrenic polymer has been blended is demonstrated.

General Results and Discussion of Experimental Details Given in the Examples Hereinafter General descriptions of anionic chain transfer styrenic telomerization procedures used in the practice of this invention are described below. The principal reaction conditions used in Examples 1-6 and the analyses obtained on the crude product distributions formed in Examples 1-6 are set forth in Table 3. The relative reaction conditions regarding feed profiles used in Examples 10-18, the analyses obtained on the crude product distributions formed in Examples 10-18 and the results for the statistical model for each are set forth in Table 4. The relative reaction conditions regarding feed profiles used in Examples 19-27, the analyses obtained on the crude product distributions formed in Examples 19-27 and the results for the statistical model for each are set forth in Table 5. Table 6 contains material balance calculated yield data for stripped toluene styrenic telomer distribution (STSTD) Examples 29-35 prepared from TSTD Examples 10A, 10B, 12, 13A, 13B, 14 and 16 respectively. Table 7 contains material balance calculated yield data for stripped toluene styrenic telomer distribution (STSTD) Examples 39-44 prepared from TSTD Examples 19, 20, 22, 24, 25, and 27 respectively.

The Examples set forth in Table 3 represent commercial pilot scale (100 gallon) development reactions designed to produce a particular distribution. The Examples set forth in Table 4 are for analogous reactions (analogous to those in Table 3) conducted on 2 gallon scale and demonstrate the breadth and interdependence of the process chemistry and process conditions.

The following Examples illustrate preferred methods of producing the toluene styrenic telomer distributions pursuant to this invention. These Examples are not intended to limit the invention to only the procedures described therein.

Examples 1-9

Large Scale Preparation of Toluene Styrenic Telomer Distributions

General Apparatus Used

A glass-lined, 100-gallon jacketed reactor equipped with an overhead condenser, submerged thermal well/thermal couple and a bottom drain valve. Temperature was maintained at a set point by controlling the temperature of the water flowing through the jacket using a steam control valve. Vigorous agitation was accomplished by means of a three-blade, retreat-curve agitator on a variable speed drive. The reactor is essentially free of all wetted PTFE parts or other polymeric fluorinated materials or elastomers. The reactor was maintained under an inert dry $N_2$ atmosphere during all operations. The reactor was charged with the chain transfer agent(s) through a dip leg by means of pressure transfer from a portable tank. Alkyl lithium, additional solvents and the amine promoter (TMEDA) were all fed subsurface to the stirred chain transfer agent(s) through the same dip leg. Styrene was pressure transferred from a portable, pressure vessel by means of a metering valve through a 24" cylindrical column (3" dia.≈6 lbs.) of 3 Å mol sieves (Zeochem) and delivered as a fine stream or spray above the surface of the reaction mixture through a slit feed nozzle.

Example 1

Part A

Toluene Styrenic Telomer Distribution 1(TSTD1)

Toluene 140 pounds, (689 mol) was charged to the reactor; Karl Fischer moisture analysis indicated 7 ppm residual $H_2O$. Agitation began. The solvent was heated to 78° C. by applying tempered water to the vessel jacket. Upon reaching the set point temperature, 4.07 pounds of N,N,N',N'-Tetramethylethylenediamine (TMEDA, 15.9 mol) in 10 pounds of toluene (49.24 mol) was charged to the reactor through the dip leg below the surface of the agitated toluene reaction mixture. The feed line was then flushed with 21 pounds (103 mol) of anhydrous toluene. Next, 3.9 lb n-BuLi solution (23.5 wt % in cyclohexane) (6.53 mol n-BuLi) was charged through the subsurface feed line forming the characteristic bright red-orange color of TMEDA complexed benzyl lithium anion with concomitant off gassing of butane. The feed line was then flushed with 21 pounds (103 mol) of anhydrous toluene. Styrene (374.4 lb, 99+%, 1629 mol, American Styrenics) was fed over 162 minutes. The styrene was added by means of pressure transfer from a nitrogen regulated portable tank through a metering valve at a constant feed rate of 2.31 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight by sparging with nitrogen gas. The reaction mixture was washed with a second 10 gallons of deoxygenated water. Phase cuts were rapid and required little settling time. Water and any rag or emulsion was removed through the bottom drain valve. A sample of the washed crude reaction mixture was analyzed by GPC. Results of the GPC analysis of this unstripped reaction mixture excluding toluene are reported in Table 3.

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135° C. was observed. An aliquot was removed from the reactor for analysis via GPC ($M_p$: 301, $M_n$: 433, $M_w$: 626, $M_z$: 883, polydispersity (PD): 1.45). The reaction mass (443 lbs) was collected in a 350-gallon tote bin.

Example 1

Part B

Forming Stripped Toluene Styrenic Telomer Distribution 1(STSTD1)

A 3893 g sample of the crude plant-stripped reaction mixture (TSPD1, prepared in Example 1—Part A) was stripped using a wiped film evaporator (WFE) manufactured by Pope Scientific Inc to remove residual toluene and 1,3-diphenylpropane (to 1.0 GPC area % max specification) to yield 3111 g of SSPD1 that had the following GPC analysis: $M_p$: 409, $M_n$: 543, $M_w$: 698, $M_z$: 907, PD: 1.29. WFE operating conditions were as follows: feed rate=1.33 L/hr, oil jacket temperature=155° C., Pressure=<0.1 mmHg and condenser temperature=0° C. Additionally the cold finger condensed 784 g of a mixture of toluene, 1,3-diphenylpropane and 1,3,5-triphenylpentane.

Example 2

Toluene Styrenic Telomer Distribution 2(TSTD2)

The procedure as in Example 1—Part A was repeated except that 361 lbs of styrene (3.5 lb-moles) was fed to a reaction mixture comprised of 192 lbs of toluene (2.1 lb-mole), 3.63 lbs TMEDA (0.0351 lb-mole), and 3.5 lbs of 23.63 wt % butyllithium in cyclohexane (0.083 lbs contained butyllithium, 0.0129 lb moles) over a period of 158 minutes. GPC results of the unstripped reaction mixture excluding toluene are reported in Table 3. The reaction mass (465 lbs) was collected in a 350-gallon tote bin.

Example 3

Toluene Styrenic Telomer Distribution 3(TSTD3)

The procedure as in Example 1—Part A was repeated except that 361 lbs of styrene (3.5 lb-moles) was fed to a reaction mixture comprised of 192 lbs of toluene (2.1 lb-mole), 3.63 lbs TMEDA (0.0351 lb-mole), and 3.5 lbs of 23.63 wt % butyllithium in cyclohexane (0.083 lbs contained butyllithium, 0.0129 lb moles) over a period of 129 minutes. GPC results of the unstripped reaction mixture excluding toluene are reported in Table 3. The reaction mass (523 lbs) was collected in a 350-gallon tote bin.

Example 4

Toluene Styrenic Telomer Distribution 4(TSTD4)

The procedure as in Example 1—Part A was repeated except that 440 lbs of styrene (4.2 lb-moles) was fed to a reaction mixture comprised of 193 lbs of toluene (2.1 lb-mole), 4.65 lbs TMEDA (0.0401 lb-mole), and 4.4 lbs of 23.63 wt % butyllithium in cyclohexane (1.04 lbs contained butyllithium, 0.0162 lb moles) over a period of 146 minutes. GPC results of the unstripped reaction mixture excluding toluene are reported in Table 3. The reaction mass (442 lbs) was collected in a 350-gallon tote bin.

Example 5

Toluene Styrenic Telomer Distribution 5(TSTD5)

The procedure as in Example 1—Part A was repeated except that 437 lbs of styrene (4.2 lb-moles) was fed to a reaction mixture comprised of 191 lbs of toluene (2.1 lb-mole), 4.23 lbs TMEDA (0.0365 lb-mole), and 4.1 lbs of 23.63 wt % butyllithium in cyclohexane (0.97 lbs contained butyllithium, 0.0151 lb moles) over a period of 162 minutes. GPC results of the unstripped reaction mixture excluding toluene are reported in Table 3. The reaction mass (491 lbs) was collected in a 350-gallon tote bin.

Example 6

Part A

Toluene Styrenic Telomer Distribution 6(TSTD6)

In this Example, a portion of a composite composed predominately of toluene, TMEDA, cyclohexane, and 1,3-diphenylpropane recovered from prior runs, including Examples 1 through 5, was used. Thus, this Example demonstrates use of recycled components.

Fresh toluene 40 pounds, (197 mol) and 97.3 lb of recycled toluene (containing 97.1%, 94.5 lb, 465 mol toluene; 1.7%, 1.6 lb, 6.2 mol TMEDA; 0.3%, 0.3 lb, 0.7 mol, 1,3-diphenylpropane; 0.9%, 0.9 lb, 4.9 mol cyclohexane) was charged to the reactor; Karl Fischer moisture analysis indicated 7 ppm residual $H_2O$. Agitation began. The solvent was heated to 79° C. by applying tempered water to the vessel jacket. Upon reaching the set point temperature, 4.04 pounds of fresh make-up N,N,N',N'-Tetramethylethylenediamine (TMEDA, 15.8 mol) in 10 pounds of toluene (49.24 mol) was charged to the reactor through the dip leg below the surface of the agitated toluene reaction mixture. The feed line was then flushed with 20 pounds (99 mol) of anhydrous toluene. Next, 4.4 lb n-BuLi solution (23.6 wt % in cyclohexane) (7.4 mol n-BuLi) was charged through the subsurface feed line forming the characteristic bright red-orange color of TMEDA complexed benzyl lithium anion with concomitant off gassing of butane. The feed line was then flushed with 22 pounds (108 mol) of anhydrous toluene. Styrene (450 lb, 99+%, 1629 mol, American Styrenics) was fed over 152 minutes. The styrene was added by means of pressure transfer from a nitrogen regulated portable tank through a metering valve at a constant feed rate of 2.96 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight. The reaction mixture was washed with a second 10 gallons of deoxygenated water. Phase cuts were rapid and required little settling time. Water and any rag or emulsion was removed through the bottom drain valve. A sample of the washed crude reaction mixture was analyzed by GPC. Results of the GPC analysis of this unstripped reaction mixture excluding toluene are reported in Table 3.

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135° C. was observed. An aliquot was removed from the reactor for analysis via GPC ($M_p$: 299, $M_n$: 428, $M_w$: 612, $M_z$: 859, PD: 1.43). The reaction mass (565 lbs) was collected in a 350-gallon tote bin.

Example 6

Part B

Forming Stripped Toluene Styrenic Telomer Distribution 6(STSTD6)

Before loading the material into the tote, a five-gallon can of the material was set aside for lab tests.

A 2000 g sample of the crude plant-stripped reaction mixture (SPD1, prepared in Example 6—Part A) was stripped using a wiped film evaporator (WFE) manufactured by Pope Scientific Inc to remove residual toluene and 1,3-diphenylpropane (to 1.0 GPC area % max specification) to yield 1540 g of SSPD6 that had the following GPC analysis: $M_p$: 404, $M_n$: 545, $M_w$: 697, $M_z$: 911, PD: 1.28. WFE operating conditions were as follows: feed rate=1.33 L/hr, oil jacket temperature=220° C., Pressure=10 mmHg and condenser temperature=0° C. Additionally the cold finger condensed 365 g of a mixture of toluene, 1,3-diphenylpropane and 1,3,5-triphenylpentane.

Example 7

Forming Stripped Toluene Styrenic Telomer Distribution 7(STSTD7)

A five-gallon sample of a composite of Toluene Styrenic Telomer Distributions 1-5 was stripped under two WFE conditions. This Example relates to use of a high vacuum, lower temperature stripping procedure. Other stripping operations are described in Examples 8 and 9.

A 1700 g sample of a composite of the crude plant-stripped reaction mixture (SPD1 through STSTD5 prepared in Examples 1 through 5) was stripped using a wiped film evaporator (WFE) manufactured by Pope Scientific Inc to remove residual toluene and 1,3-diphenylpropane (to 1.0 GPC area % max specification) which yielded 1418 g of SSPD7 (that had the following GPC analysis: $M_p$: 399, $M_n$: 543, $M_w$: 707, $M_z$: 940, PD: 1.30). WFE operating conditions were as follows: feed rate=1.33 L/hr, oil jacket temperature=158° C., Pressure=<0.1 mmHg and condenser temperature=0° C. Additionally the cold finger condensed 266 g of a mixture of toluene, 1,3-diphenylpropane ($\approx$85 GPC area %) and 1,3,5-triphenylpentane ($\approx$15 GPC area %).

Example 8

Forming Stripped Toluene Styrenic Telomer Distribution 8(STSTD8)

In this Example, the WFE stripping condition used involved a modest vacuum and higher temperature.

A 2044 g sample of a composite of the crude plant-stripped reaction mixture (SPD1 through STSTD5 prepared in Examples 1 through 5) was stripped using a wiped film evaporator (WFE) manufactured by Pope Scientific Inc to remove residual toluene and 1,3-diphenylpropane (to 1.0 GPC area % max specification) which yielded 1418 g of SSPD8 (that had the following GPC analysis: $M_p$: 399, $M_n$: 545, $M_w$: 706, $M_z$: 925, PD: 1.30). WFE operating conditions were as follows: feed rate=1.33 L/hr, oil jacket temperature=220° C., Pressure=10.0 mmHg and condenser temperature=0° C. Additionally the cold finger condensed 316 g of a mixture of toluene, 1,3-diphenylpropane ($\approx$85 GPC area %) and 1,3,5-triphenylpentane ($\approx$15 GPC area %).

Example 9

Forming Stripped Toluene Styrenic Telomer Distribution 9 (STSTD9)

In this Example, the WFE stripping condition used involved a deeper strip to make a higher $M_w$ TSTD using intermediate vacuum and intermediate temperature.

A 7217 g sample of a composite of the crude plant-stripped reaction mixture (SPD1 through STSTD5 prepared in Examples 1 through 5) was stripped using a wiped film evaporator (WFE) manufactured by Pope Scientific Inc to remove residual toluene and 1,3-diphenylpropane (to 1.0 GPC area % max specification) which yielded 5970 g of a SSPD8 (that had the following GPC analysis: $M_p$: 418, $M_n$: 588, $M_w$: 762, $M_z$: 998, PD: 1.29, $\sigma_n$=320 and $_n\alpha_3$=1.94). WFE operating conditions were as follows: feed rate=1.33 L/hr, oil jacket temperature=200° C., Pressure=5.0 mmHg and condenser temperature=0° C. Additionally the cold finger condensed 1246 g of a mixture of toluene, 1,3-diphenylpropane ($\approx$78 GPC area %), 1,3,5-triphenylpentane ($\approx$20 GPC area %) and 1,3,5,7-tetraphenylheptane ($\approx$2 GPC area %).

Examples 10-18

Two Gallon Scale Preparation of Toluene Styrenic Telomer Distributions Formed Using Catalyst Formed Solely From Butyllithium as the Metal Component General Apparatus Used A 316 stainless steel 2-gallon Parr autoclave having thermal couple, bottom drain valve, cooling coils, heating mantle and twin pitch-blade turbine impellers was further equipped with a diaphragm pump, nitrogen purged 250 ml stainless charge vessel, a well calibrated metering pump and a $\frac{1}{16}^{th}$ inch OD subsurface feed line. The reactor was vented to a 3-liter water-jacketed flask with condenser. The bottom drain valve was plumbed to a 6-liter oil jacketed creased wash vessel having a bottom drain and outfitted for overhead stirring and distillation. Bulk solvent (usually one and the same as the chain transfer agent) was charged to the reactor via diaphragm pump, TMEDA, butyllithium and any additional co catalyst if used were charged to the reactor separately through the charging vessels. Each charge was flushed with a 100 ml aliquot of the solvent. Styrene is fed via metering pump at predetermined constant rate through the $\frac{1}{16}^{th}$ inch OD feed line. The tip was modified such that the styrene was fed with a velocity of 18-22 ft/s and delivered in close proximity to the bottom turbine impeller. Reaction temperature was tightly maintain at a predetermined set point using the Parr 4841 controller which balanced the out put to the heating mantle with that of a solenoid valve to the cooling coils. The reactor was prepared by charging 4 liters of the reaction solvent (in most cases one and the same as the chain transfer agent) and heating to 120° C. under super atmospheric conditions. Super heated solvent ($\approx$200 ml) was then flashed overhead to the 3-liter reactor. The bulk of the solvent was then cooled, removed from the reactor and analyzed for moisture (Karl Fischer). All transfers of catalyst components were made via syringe under inert atmosphere. Styrene (99%, Across), TMEDA (Aldrich), Butyllithium (Aldrich) were each used as received from the vendor. The reaction mixture is quenched by the charge of 100 ml the solvent containing a stoichiometric amount of a protic quenching agent.

Example 10

Forming Toluene Styrenic Telomer Distribution (TSTD10)

Toluene 1386 g, (≈1.6 liters, 15.07 mole) was charged to the reactor (23 ppm residual $H_2O$), which was further made anhydrous by the addition of 0.26 g (4.0 mmole) n-butyllithium. The anhydrous toluene was heated to 78° C., upon reaching the set point temperature, 52.22 g n-butyllithium solution (2.0 M, 16.5 wt % in cyclohexane, 0.135 mole) was charged through the charge vessel and delivered subsurface to the gently agitated (300 rpm) toluene solution. The vessel and line were flushed with a 100 ml aliquot of toluene before charging with 38.9 g of N,N,N',N'-tetramethylethylenediamine (TMEDA, 0.335 mole). Agitation was increased to 850 RPM and the TMEDA was pressured into the reactor subsurface. The charging system was flushed with a second 100 ml aliquot of toluene. All total (initial charge and that which was used to flush charge lines) 1559 g (16.9 mole) of toluene was charged to the reactor prior to initiating the styrene feed. Styrene, 3698 g (35.51 mole) was fed through the $1/16^{th}$ inch OD feed line over 157 minutes such that the feed velocity was ≈20 ft/s with a feed rate of 23.55 g/min. Typically at upon completion of 80% of the feed, an overload of the stirring drive would occur resulting in a brief interruption of mixing. Consequently as a practice for this set up only, to avoid loss in mixing the agitation rate was reduced to 715 rpm once 80% of styrene feed was completed. Upon near completion of the styrene feed, 100 ml of toluene was charged to the styrene feed system and the lines thereby fully flushed of the reactive styrene monomer. The styrene feed to the reactor was deemed complete when no further heat of reaction was observed generally signified by the closing of the automated control valve on the coiling coils. The catalyst is then quenched with a 100 ml charge of toluene and containing 4.5 g of methanol (0.135 mole).

Example 10

Part A

Standard Procedure with Water Washing of Quenched Unstripped Reaction Mixture

Approximately ½ (49.5% by material balance) of the reaction mixture was transferred to the wash vessel previously heated to 85° C. and then washed with deoxygenated water (3×300 ml). Phase cuts were made at 80° C., and were rapid requiring little settling time. Water and any rag or emulsion was removed through the bottom drain valve. An aliquot was removed for analysis via GPC ($M_p$: 408, $M_n$: 562, $M_w$: 866, $M_z$: 1216, PD: 1.54, $\sigma_n$=413, $_n\alpha_3$=1.788). The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle (2422 g).

Example 10

Part B

Anhydrous Toluene TMEDA Stripped Before Aqueous Washes

Approximately ½ (50.5% by material balance) of the reaction mixture was transferred to the wash vessel heated to 85° C. Upon completion of the transfer the mixture was gradually heated to 161° C. (oil jacket temperature of 175° C.) to recover an essentially anhydrous mixture of toluene and TMEDA. The reactor was cooled to 110° C. and 1.5 liters of toluene was then charged further dropping the temperature to ≈80° C. The TMEDA stripped product mixture was washed (3×300 ml) with deoxygenated water. Phase cuts were made at 80° C., and were rapid requiring little settling time. Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle (2184 g).

Example 11

Forming Toluene Styrenic Telomer Distribution (TSTD11)

The procedure of Example 10 was repeated except that: 1128 g (≈1.3 liters, 12.21 mole) of toluene, was charged to the reactor (52 ppm residual $H_2O$), which was further made anhydrous by the addition of 0.48 g (7.5 mmole) n-butyllithium. The anhydrous toluene was heated to 80° C., upon reaching the set point temperature, 59.79 g n-butyllithium solution (2.0 M, 16.5 wt % in cyclohexane, 0.154 mole) was charged through the charge vessel and delivered subsurface to the gently agitated (300 rpm) toluene solution. The vessel and line were flushed with a 100 ml aliquot of toluene before charging with 47.10 g of N,N,N',N'-tetramethylethylenediamine (TMEDA, 0.405 mole). All total (initial charge and that which was used to flush charge lines) 1298 g (14.1 mole) of toluene was charged to the reactor prior to initiating the styrene feed. Styrene, 4388 g (42.13 mole) was fed through the $1/16^{th}$ inch OD feed line over 184 minutes such that the feed velocity was ≈20 ft/s with a feed rate of 23.85 g/min. The reaction mixture was quenched with 4.93 g (0.15 mole) methanol in 100 ml of toluene. An aliquot of the reaction mixture gave the following GPC analysis: $M_p$: 416, $M_n$: 540, $M_w$: 820, $M_z$: 1147, PD: 1.52, $\sigma_n$=389, $_n\alpha_3$=1.794.

Example 12

Forming Toluene Styrenic Telomer Distribution (TSTD12)

The procedure of Example 10 was repeated except that: 1437 g (≈1.7 liters, 15.60 mole) of toluene was charged to the reactor (49 ppm residual $H_2O$), which was further made anhydrous by the addition of 0.36 g (5.6 mmole) n-butyllithium. The anhydrous toluene was heated to 80° C., upon reaching the set point temperature, 52.60 g n-butyllithium solution (2.0 M, 16.5 wt % in cyclohexane, 0.135 mole) was charged through the charge vessel and delivered subsurface to the gently agitated (300 rpm) toluene solution. The vessel and line were flushed with a 100 ml aliquot of toluene before charging with 40.60 g of N,N,N',N'-tetramethylethylenediamine (TMEDA, 0.349 mole). All total (initial charge and that which was used to flush charge lines) 1607 g (17.4 mole) of toluene was charged to the reactor prior to initiating the styrene feed. Styrene, 3719 g (55.71 mole) was fed through the $1/16^{th}$ inch OD feed line over 175 minutes such that the feed velocity was ≈18 ft/s with a feed rate of 21.25 g/min. The reaction mixture was quenched with 4.34 g (0.135 mole) methanol in 100 ml of toluene. An aliquot of the reaction mixture gave the following GPC analysis: $M_p$: 308, $M_n$: 469, $M_w$: 696, $M_z$: 985, PD: 1.48, $\sigma_n$=326, $_n\alpha_3$=1.974. The workup procedure followed the general workup procedure as in Example 10—Part B, with the following conditions:

Upon quenching, the reaction mixture was gradually stripped at elevated temperature and reduced pressure in the stainless steel reactor of unreacted toluene and TMEDA (ending conditions pot temperature 160° C. and 75 mmHg vacuum). The mixture was cooled to 100° C. and a portion (56.8% of the total by material balance) was transferred to the wash vessel previously heated to 85° C. and charged with 1667 g of fresh toluene. The TMEDA stripped product mixture was washed (3×300 ml) with deoxygenated water. Phase cuts were made at 80° C., and were rapid requiring little settling time. Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle (2578 g).

Example 13

Forming Toluene Styrenic Telomer Distribution (TSTD13)

The procedure of Example 10 was repeated except that: 1578 g (≈0.8 liters, 17.06 mole) of toluene was charged to the reactor (81 ppm residual $H_2O$), which was further made anhydrous by the addition of 1.0 g (15.7 mmole) n-butyllithium. The anhydrous toluene was heated to 80° C., upon reaching the set point temperature, 50.91 g n-butyllithium solution (2.0 M, 16.5 wt % in cyclohexane, 0.131 mole) was charged through the charge vessel and delivered subsurface to the gently agitated (300 rpm) toluene solution. The vessel and line were flushed with a 100 ml aliquot of toluene before charging with 40.80 g of N,N,N',N'-tetramethylethylenediamine (TMEDA, 0.351 mole). All total (initial charge and that which was used to flush charge lines) 1742 g (18.91 mole) of toluene was charged to the reactor prior to initiating the styrene feed. Styrene, 3563 g (34.21 mole) was fed through the 1/16$^{th}$ inch OD feed line over 168 minutes such that the feed velocity was ≈18 ft/s with a feed rate of 21.21 g/min. The reaction mixture was quenched with 4.2 g (0.131 mole) methanol in 100 ml of toluene. An aliquot of the reaction mixture gave the following GPC analysis: $M_p$: 308, $M_n$: 471, $M_w$: 702, $M_z$: 996, PD: 1.49, $\sigma_n$=330, $_n\alpha_3$=1.981.

Example 13

Part A

Standard Procedure with Water Washing of Quenched Unstripped Reaction Mixture

Approximately ½ (42.6% by material balance) of the reaction mixture was transferred to the wash vessel previously heated to 85° C. and then washed with deoxygenated water (3×300 ml). Phase cuts were made at 80° C., and were rapid requiring little settling time. Water and any rag or emulsion was removed through the bottom drain valve. The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle (2496 g).

Example 13

Part B

NaBH$_4$ Present in First Wash

Approximately ½ (57.4% by material balance) of the reaction mixture was transferred to the wash vessel previously heated to 95° C. and then washed. The first wash (500 ml) contained 6.22 g (0.164 mole) NaBH$_4$ and was formed from 51.8 g of a 12-wt % NaBH$_4$ in 14M NaOH solution and 463 g of water. The wash was conducted at 90° C. for 30 minutes, the solution was cooled to 85° C. and the phases separated. The bottom aqueous layer was then removed. A second wash (500 ml deoxygenated water) was conducted for 10 minutes and the subsequent phase cut made at 80° C. Water and any rag or emulsion was removed through the bottom drain valve. The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle (3366 g).

Example 14

Forming Toluene Styrenic Telomer Distribution (TSTD14)

The procedure of Example 10 was repeated except that: 1444 g (≈1.7 liters, 15.68 mole) of toluene, was charged to the reactor (25 ppm residual $H_2O$), which was further made anhydrous by the addition of 0.29 g (4.5 mmole) n-butyllithium. The anhydrous toluene was heated to 80° C., upon reaching the set point temperature, 52.76 g n-butyllithium solution (2.0 M in cyclohexane, 0.136 mole) was charged through the charge vessel and delivered subsurface to the gently agitated (300 rpm) toluene solution. The vessel and line were flushed with a 100 ml aliquot of toluene before charging with 39.90 g of N,N,N',N'-tetramethylethylenediamine (TMEDA, 0.343 mole). All total (initial charge and that which was used to flush charge lines) 1614 g (17.5 mole) of toluene was charged to the reactor prior to initiating the styrene feed. Styrene, 3705 g (35.57 mole) was fed through the 1/16$^{th}$ inch OD feed line over 173 minutes such that the feed velocity was ≈18 ft/s with a feed rate of 21.35 g/min. The reaction mixture was quenched with 4.35 g (0.136 mole) methanol in 100 ml of toluene. An aliquot of the reaction mixture gave the following GPC analysis: $M_p$: 418, $M_n$: 475, $M_w$: 704, $M_z$: 992, PD: 1.48, $\sigma_n$=330, $_n\alpha_3$=1.939. The workup procedure followed the general workup procedure as in Example 10—Part B, with the following conditions:

Upon quenching the reaction mixture was gradually stripped at elevated temperature and reduced pressure in the stainless steel reactor of unreacted toluene and TMEDA (ending conditions pot temperature 160° C. and 50 mmHg vacuum). The mixture was cooled to 100° C. and a portion (about 50%) of the reactor's content was transferred to the wash vessel previously heated to 85° C. and charged with 1700 g of fresh toluene. The TMEDA stripped product mixture was washed (2×500 ml) with deoxygenated water. Phase cuts were made at 80° C., and were rapid requiring little settling time. Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated for the 2$^{nd}$ half of the reactor's content. All total 4483 g of stripped crude reaction product was obtained.

Example 15

Forming Toluene Styrenic Telomer Distribution (TSTD15)

The procedure of Example 10 was repeated except that: 1445 g (≈1.7 liters, 15.68 mole) of toluene was charged to the reactor (37 ppm residual H$_2$O), which was further made anhydrous by the addition of 0.42 g (6.6 mmole) n-butyllithium. The anhydrous toluene was heated to 85° C., upon reaching the set point temperature, 43.05 g n-butyllithium solution (2.0 M, 16.5 wt % in cyclohexane, 0.111 mole) was charged through the charge vessel and delivered subsurface to the gently agitated (300 rpm) toluene solution. The vessel and line were flushed with a 100 ml aliquot of toluene before charging with 33.47 g of N,N,N',N'-tetramethylethylenediamine (TMEDA, 0.288 mole). All total (initial charge and that which was used to flush charge lines) 1615 g (17.53 mole) of toluene was charged to the reactor prior to initiating the styrene feed. Styrene, 102 g (0.98 mole) was fed through the $\frac{1}{16}^{th}$ inch OD feed line over 6 minutes such that the feed velocity was ≈14 ft/s with a feed rate of 17.4 g/min. The reaction mixture was quenched with 3.55 g (0.111 mole) methanol in 100 ml of toluene. An aliquot of the reaction mixture gave the following GPC analysis: $M_p$: 307, $M_n$: 406, $M_w$: 551, $M_z$: 734, PD: 1.36, $\sigma_n$=243, $_n\alpha_3$=1.790.

Example 16

Forming Toluene Styrenic Telomer Distribution (TSTD16) with Temperature Ramp at End to Model Refluxive Cooling Temperature Profile The procedure of Example 10 was repeated except that: 1447 g (≈1.7 liters, 15.70 mole) of toluene was charged to the reactor (19 ppm residual H$_2$O), which was further made anhydrous by the addition of 0.22 g (3.4 mmole) n-butyllithium. The anhydrous toluene was heated to 80° C., upon reaching the set point temperature, 48.67 g n-butyllithium solution (2.0 M, 16.5 wt % in cyclohexane, 0.125 mole) was charged through the charge vessel and delivered subsurface to the gently agitated (300 rpm) toluene solution. The vessel and line were flushed with a 100 ml aliquot of toluene before charging with 35.80 g of N,N,N',N'-tetramethylethylenediamine (TMEDA, 0.308 mole). All total (initial charge and that which was used to flush charge lines) 1617 g (17.6 mole) of toluene was charged to the reactor prior to initiating the styrene feed. Styrene, 3640 g (34.95 mole) was fed through the $\frac{1}{16}^{th}$ inch OD feed line over 172 minutes such that the feed velocity was ≈18 ft/s with a feed rate of 31.16 g/min. During the last 20% of the styrene feed the temperature was allowed to rise from 80° C. to 92° C. at rate of about 0.33° C./min. The reaction mixture at 92° C. was quenched with 4.01 g (0.125 mole) methanol in 100 ml of toluene. An aliquot of the reaction mixture gave the following GPC analysis: $M_p$: 308, $M_n$: 465, $M_w$: 696, $M_z$: 1000, PD: 1.50, $\sigma_n$=328, $_n\alpha_3$=2.081. The workup procedure followed the general workup procedure as in Example 10—Part B, with the following conditions:

Upon quenching the reaction mixture was gradually stripped at elevated temperature and reduced pressure in the stainless steel reactor of unreacted toluene and TMEDA (ending conditions pot temperature 160° C. and 50 mmHg vacuum). The mixture was cooled to 100° C. and a portion (about 50%) of the reactor's content was transferred to the wash vessel previously heated to 85° C. and charged with 1700 g of fresh toluene. The TMEDA stripped product mixture was washed (2×500 ml) with deoxygenated water. Phase cuts were made at 80° C., and were rapid requiring little settling time. Water and any rag or emulsion was removed through the bottom drain valve. The temperature of the oil jacket was increased to 170° C. Cyclohexane, residual moisture and toluene were distilled through a simple distillation head (1 atm.). When the pot temperature reached 161° C., the material was cooled and drained into a nitrogen-purged bottle. The above process was repeated for the 2$^{nd}$ half of the reactors content. All total 4494 g of stripped crude reaction product were obtained.

Example 17

Forming Toluene Styrenic Telomer Distribution (TSTD17) with higher initial Temperature and Temperature Ramp at End to Model Refluxive Cooling Temperature Profile The procedure of Example 10 was repeated except that: 1646 g (≈1.9 liters, 17.86 mole) of toluene was charged to the reactor (37 ppm residual H$_2$O), which was further made anhydrous by the addition of 0.48 g (7.5 mmole) n-butyllithium. The anhydrous toluene was heated to 85° C., upon reaching the set point temperature, 42.70 g n-butyllithium solution (2.0 M, 16.5 wt % in cyclohexane, 0.110 mole) was charged through the charge vessel and delivered subsurface to the gently agitated (300 rpm) toluene solution. The vessel and line were flushed with a 100 ml aliquot of toluene before charging with 32.60 g of N,N,N',N'-Tetramethylethylenediamine (TMEDA, 0.281 mole). All total (initial charge and that which was used to flush charge lines) 1816 g (19.7 mole) of toluene was charged to the reactor prior to initiating the styrene feed. Styrene, 3638 g (34.93 mole) was fed through the $\frac{1}{16}^{th}$ inch OD feed line over 154 minutes such that the feed velocity was ≈20 ft/s with a feed rate of 23.62 g/min. During the last 15% of the styrene feed the temperature was allowed to rise from 85° C. to 92° C. at rate of about 0.33° C./min. The reaction mixture at 92° C. was quenched with 3.52 g (0.110 mole) methanol in 100 ml of toluene. An aliquot of the reaction mixture gave the following GPC analysis: $M_p$: 1.92, $M_n$: 407, $M_w$: 582, $M_z$: 813, PD: 1.43, $\sigma_n$=267, $_n\alpha_3$=2.009.

Example 17

Part A

Standard Procedure with Water Washing of Quenched Unstripped Reaction Mixture Approximately ½ (47.0% by material balance) of the reaction mixture was transferred to the wash vessel previously heated to 85° C. and then washed with deoxygenated water (3×300 ml). Phase cuts were made at 80° C., and were rapid requiring little settling time. Water and any rag or emulsion was removed through the bottom drain valve. The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle (2371 g).

Example 17

Part B

Anhydrous Toluene TMEDA Stripped in Stainless Reactor before Aqueous Washes The balance of the reaction mixture (53.0%) was gradually stripped at elevated temperature and reduced pressure in the stainless steel reactor of unreacted toluene and TMEDA (ending conditions pot temperature 160° C. and 50 mmHg vacuum). The mixture was cooled to 100° C. and the reactor's content was transferred to the wash vessel previously heated to 85° C. and charged with 1700 g of fresh toluene. The TMEDA stripped product mixture was washed (3×300 ml) with deoxygenated water. Phase cuts were made at 80° C., and were rapid requiring little settling time. Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle (2669 g).

Example 18

Forming Toluene Styrenic Telomer Distribution (TSTD18) with Higher Initial Temperature and Temperature Ramp at End to Model Refluxive Cooling Temperature Profile The procedure of Example 10 was repeated except that: 1423 g (≈1.7 liters, 15.44 mole) of toluene, was charged to the reactor (23 ppm residual $H_2O$), which was further made anhydrous by the addition of 0.44 g (6.9 mmole) n-butyllithium. The anhydrous toluene was heated to 85° C., upon reaching the set point temperature, 40.52 g n-butyllithium solution (2.0 M, 16.5 wt % in cyclohexane, 0.104 mole) was charged through the charge vessel and delivered subsurface to the gently agitated (300 rpm) toluene solution. The vessel and line were flushed with a 100 ml aliquot of toluene before charging with 32.40 g of N,N,N',N'-tetramethylethylenediamine (TMEDA, 0.279 mole). All total (initial charge and that which was used to flush charge lines) 1593 g (17.3 mole) of toluene was charged to the reactor prior to initiating the styrene feed. Styrene, 3628 g (34.83 mole) was fed through the $1/16^{th}$ inch OD feed line over 159 minutes such that the feed velocity was ≈19 ft/s with a feed rate of 22.82 g/min. During the last 15% of the styrene feed the temperature was allowed to rise from 85° C. to 92° C. at rate of about 0.33° C./min. The reaction mixture at 92° C. was quenched with 3.34 g (0.104 mole) methanol in 100 ml of toluene. An aliquot of the reaction mixture gave the following GPC analysis: $M_p$: 315, $M_n$: 533, $M_w$: 798, $M_z$: 1138, PD: 1.50, $\sigma_n$=376, $_n\alpha_3$=2.011.

Example 18

Part A

Standard Procedure with Water Washing of Quenched Unstripped Reaction Mixture Approximately ⅓ (30.7% by material balance) of the reaction mixture was transferred to the wash vessel previously heated to 85° C. and then washed with deoxygenated water (3×300 ml). Phase cuts were made at 80° C., and were rapid requiring little settling time. Water and any rag or emulsion was removed through the bottom drain valve. The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle (1291 g).

Example 18

Part B

Anhydrous Toluene TMEDA Stripped in Stainless Reactor Before Aqueous Washes The remaining ⅔ of the reaction mixture (69.3%) was gradually stripped at elevated temperature and reduced pressure in the stainless steel reactor of unreacted toluene and TMEDA (ending conditions pot temperature 160° C. and 50 mmHg vacuum). The mixture was cooled to 100° C. and the reactor's content was transferred to the wash vessel previously heated to 85° C. and charged with 1700 g of fresh toluene. The TMEDA stripped product mixture was washed (3×300 ml) with deoxygenated water. Phase cuts were made at 80° C., and were rapid requiring little settling time. Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle (2918 g).

Examples 19-28

Two Gallon Scale Preparation of Toluene Styrenic Telomer Distributions Formed Using Catalyst Formed from Butyllithium and Potassium t-Butoxide as the Metal Components The general apparatus used in these Examples was that which was described in Examples 10-18.

Example 19

Forming Toluene Styrenic Telomer Distribution (TSTD19) with Potassium t-Butoxide Co-Catalyst The procedure of Example 10 was repeated except that: 1088 g (≈1.3 liters, 11.81 mole) of toluene was charged to the reactor (41 ppm residual $H_2O$), which was further made anhydrous by the addition of 0.48 g (7.6 mmole) n-butyllithium. The anhydrous toluene was heated to 80° C., upon reaching the set point temperature, a mixture comprised of 13.06 g (0.116 mole) potassium t-butoxide, 399 g (4.33 mole) toluene and 72.00 g N,N,N',N'-tetramethylethylenediamine (TMEDA, 0.620 mole) was charged through the charge vessel and delivered subsurface to the gently agitated (300 rpm) toluene solution. The vessel and line were flushed with a 100 ml aliquot of toluene before charging with 46.17 g n-butyllithium solution (2.0 M, 16.5 wt % in cyclohexane, 0.119 mole). All total (the initial charge, the amount used to form the potassium t-butoxide/TMEDA solution and the amount used to flush the charge lines) 1657 g (18.0 mole) of toluene was charged to the reactor prior to initiating the styrene feed. Styrene, 3718 g (35.70 mole) was fed through the $1/16^{th}$ inch OD feed line over 182 minutes such that the feed velocity was ≈18 ft/s with a feed rate of 20.43 g/min. The reaction mixture was quenched with 7.52 g (0.235 mole) methanol in 100 ml of toluene. An aliquot of the reaction mixture gave the following GPC analysis: $M_p$: 413, $M_n$: 620, $M_w$: 885, $M_z$: 1233, PD: 1.42, $\sigma_n$ 405, $_n\alpha$=1.991. The workup procedure followed the general workup procedure as in Example 10—Part B, with the following conditions:

Upon quenching the reaction mixture was gradually stripped at elevated temperature and reduced pressure in the stainless steel reactor of unreacted toluene and TMEDA (ending conditions pot temperature 160° C. and 19 mmHg vacuum). The mixture was cooled to 100° C. and a portion (about 33%) of the reactor's content was transferred to the wash vessel previously heated to 85° C. and charged with 1700 g of fresh toluene. The TMEDA stripped product mixture was washed (2×500 ml) with deoxygenated water. Phase cuts were made at 80° C., were slow and required much settling time (>45 minutes). Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated twice more for the remaining ⅔ of the reactor's content (washing ⅓ of the total stripped reaction mixture each time). All total 4459 g of stripped crude reaction product were obtained.

Example 20

Forming Toluene Styrenic Telomer Distribution (TSTD20) with Potassium t-Butoxide Co-Catalyst The procedure of Example 10 was repeated except that: 1215 g (≈1.4 liters, 13.19 mole) of toluene was charged to the reactor (59 ppm residual $H_2O$), which was further made anhydrous by the addition of 0.66 g (10.3 mmole) n-butyllithium. The anhydrous toluene was heated to 80° C., upon reaching the set point temperature, a mixture comprised of 16.29 g (0.145 mole) potassium t-butoxide, 186 g (2.02 mole) toluene and 90.45 g of N,N,N',N'-tetramethylethylenediamine (TMEDA, 0.778 mole) was charged through the charge vessel and delivered subsurface to the gently agitated (300 rpm) toluene solution. The vessel and line were flushed with a 100 ml aliquot of toluene before charging with 56.00 g n-butyllithium solution (2.0 M, 16.5 wt % in cyclohexane, 0.144 mole). All total (the initial charge, the amount used to form the potassium t-butoxide/TMEDA solution and the amount used to flush the charge lines) 1571 g (17.1 mole) of toluene was charged to the reactor prior to initiating the styrene feed. Styrene, 3604 g (34.60 mole) was fed through the $\frac{1}{16}^{th}$ inch OD feed line over 184 minutes such that the feed velocity was ≈17 ft/s with a feed rate of 19.59 g/min. The reaction mixture was quenched with 200 g (11.1 mole) of deoxygenated water pumped into the reactor. An aliquot of the reaction mixture gave the following GPC analysis: $M_p$: 517, $M_n$: 547, $M_w$: 795, $M_z$: 1092, PD: 1.45, $\sigma_n$=368, $_n\alpha_3$=1.773. The workup procedure followed the general workup procedure as in Example 10—Part B, with the following conditions Approximately ½ of the emulsified reaction mixture was transferred to the wash vessel previously heated to 85° C. and then washed with deoxygenated water (3×250 ml). The phase cuts were made at 80° C., and were slow and inefficient requiring the addition of 1500 ml of added toluene and very long settling times (>60 minutes). Water and much rag or emulsion was removed through the bottom drain valve. The temperature of the oil jacket was increased to 170° C. Cyclohexane, residual moisture, TMEDA and toluene were distilled through a simple distillation head (1 atm.). When the pot temperature reached 161° C., the material was cooled and drained into a nitrogen-purged bottle. The process was repeated for the second ½ of the reactor's content (5039 g).

Example 21

Forming Toluene Styrenic Telomer Distribution (TSTD21) with Potassium t-Butoxide Co-catalyst The procedure of Example 10 was repeated except that: 1220 g (≈1.4 liters, 13.24 mole) of toluene was charged to the reactor (12 ppm residual $H_2O$), which was further made anhydrous by the addition of 0.14 g (2.1 mmole) n-butyllithium. The anhydrous toluene was heated to 80° C., upon reaching the set point temperature, a mixture comprised of 16.34 g (0.146 mole) potassium t-butoxide, 188 g (2.04 mole) toluene and 85.53 g of N,N,N',N'-tetramethylethylenediamine (TMEDA, 0.736 mole) was charged through the charge vessel and delivered subsurface to the gently agitated (300 rpm) toluene solution. The vessel and line were flushed with a 100 ml aliquot of toluene before charging with 56.28 g n-butyllithium solution (2.0 M, 16.5 wt % in cyclohexane, 0.145 mole). All total (the initial charge, the amount used to form the potassium t-butoxide/TMEDA solution and the amount used to flush the charge lines) 1578 g (17.1 mole) of toluene was charged to the reactor prior to initiating the styrene feed. Styrene, 3647 g (35.02 mole) was fed through the $\frac{1}{16}^{th}$ inch OD feed line over 186 minutes such that the feed velocity was ≈17 ft/s with a feed rate of 19.61 g/min. The reaction mixture was quenched with 17.45 g (0.291 mole) acetic acid in 100 ml of toluene. An aliquot of the reaction mixture gave the following GPC analysis: $M_p$: 512, $M_n$: 539, $M_w$: 780, $M_z$: 1074, PD: 1.45, $\sigma_n$=360, $_n\alpha_3$=1.813.

Example 22

Forming Toluene Styrenic Telomer Distribution (TSTD22) with Potassium t-Butoxide Co-Catalyst The procedure of Example 10 was repeated except that: 1268 g (≈1.5 liters, 13.76 mole) of toluene was charged to the reactor (56 ppm residual $H_2O$), which was further made anhydrous by the addition of 0.64 g (10.0 mmole) n-butyllithium. The anhydrous toluene was heated to 80° C., upon reaching the set point temperature, a mixture comprised of 14.07 g (0.125 mole) potassium t-butoxide, 160 g (1.74 mole) toluene and 78.77 g of N,N,N',N'-tetramethylethylenediamine (TMEDA, 0.678 mole) was charged through the charge vessel and delivered subsurface to the gently agitated (300 rpm) toluene solution. The vessel and line were flushed with a 100 ml aliquot of toluene before charging with 47.74 g n-butyllithium solution (2.0 M, 16.5 wt % in cyclohexane, 0.123 mole). All total (the initial charge, the amount used to form the potassium t-butoxide/TMEDA solution and the amount used to flush the charge lines) 1598 g (17.3 mole) of toluene was charged to the reactor prior to initiating the styrene feed. Styrene, 3620 g (34.76 mole) was fed through the $\frac{1}{16}^{th}$ inch OD feed line over 180 minutes such that the feed velocity was ≈17 ft/s with a feed rate of 20.11 g/min. The reaction mixture was quenched with 14.91 g (0.248 mole) acetic acid in 100 ml of toluene. An aliquot of the reaction mixture gave the following GPC analysis: $M_p$: 520, $M_n$: 551, $M_w$: 747, $M_z$: 986, PD: 1.36, $\sigma_n$=329, $_n\alpha_3$=1.692. The workup procedure followed the general workup procedure as in Example 10—Part B, with the following conditions:

Upon quenching the reaction mixture was gradually stripped at elevated temperature and reduced pressure in the stainless steel reactor of unreacted toluene and TMEDA (ending conditions pot temperature 160° C. and 19 mmHg vacuum). The mixture was cooled to 100° C. and a portion (about 33%) of the reactor's content was transferred to the wash vessel previously heated to 85° C. and charged with 2600 g of fresh toluene. The TMEDA stripped product mixture was washed (2×400 ml) with deoxygenated water. Phase cuts were made at 80° C., were slow and required much settling time (≈30 minutes). Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated twice more for the remaining ⅔ of the reactor's content (washing ⅓ of the total stripped reaction mixture each time). All total 5355 g of stripped crude reaction product were obtained.

Example 23

Forming Toluene Styrenic Telomer Distribution (TSTD23) with Potassium t-Butoxide Co-Catalyst The procedure of Example 10 was repeated except that: 1250 g (≈4.4 liters, 13.57 mole) of toluene was charged to the reactor (25 ppm residual $H_2O$), which was further made anhydrous by the addition of 0.28 g (4.4 mmole) n-butyllithium. The anhydrous toluene was heated to 80° C., upon reaching the set point temperature, a mixture comprised of 14.01 g (0.125 mole) potassium t-butoxide, 150 g (1.63 mole toluene) and 75.70 g of N,N,N',N'-tetramethylethylenediamine (TMEDA, 0.651 mole) was charged through the charge vessel and delivered subsurface to the gently agitated (300 rpm) toluene solution. The vessel and line were flushed with a 100 ml aliquot of toluene before charging with 48.70 g n-butyllithium solution (2.0 M, 16.5 wt % in cyclohexane, 0.125 mole). All total (the initial charge, the amount used to form the potassium t-butoxide/TMEDA solution and the amount used to flush the charge lines) 1570 g (17.0 mole) of toluene was charged to the reactor prior to initiating the styrene feed. Styrene, 3678 g (35.31 mole) was fed through the $\frac{1}{16}^{th}$ inch OD feed line over 180 minutes such that the feed velocity was ≈17 ft/s with a feed rate of 20.43 g/min. The reaction mixture was quenched with 15.03 g (0.250 mole) acetic acid in 100 ml of toluene. An aliquot of the reaction mixture gave the following GPC analysis: $M_p$: 509, $M_n$: 514, $M_w$: 724, $M_z$: 1002, PD: 1.41, $\sigma_n$=329, $_n\alpha_3$=1.992.

Example 24

Forming Toluene Styrenic Telomer Distribution (TSTD24) with Potassium t-Butoxide Co-Catalyst, Styrene:Toluene Ratio 1:1 with Toluene added as a Diluent in the Styrene Feed The procedure of Example 10 was repeated except that: 1097 g (≈=13 liters, 11.91 mole) of toluene was charged to the reactor (30 ppm residual $H_2O$), which was further made anhydrous by the addition of 0.51 g (7.9 mmole) n-butyllithium. The anhydrous toluene was heated to 80° C., upon reaching the set point temperature, a mixture comprised of 12.80 g (0.114 mole) potassium t-butoxide, 480 g (5.21 mole) toluene and 70.30 g of N,N,N',N'-tetramethylethylenediamine (TMEDA, 0.605 mole) was charged through the charge vessel and delivered subsurface to the gently agitated (300 rpm) toluene solution. The vessel and line were flushed with a 100 ml aliquot of toluene before charging with 44.43 g n-butyllithium solution (2.0 M, 16.5 wt % in cyclohexane, 0.114 mole). The initial total toluene charge to the reactor is (the initial charge, the amount used to form the potassium t-butoxide/TMEDA solution and the amount used to flush the charge lines) 1747 g (16.8 mole) prior to initiating the styrene feed. Styrene, 3004 g (28.84 mole) was combined with 628 g (6.04 mole) of toluene and then fed through the $\frac{1}{16}^{th}$ inch OD feed line over 170 minutes such that the feed velocity was ≈18 ft/s with a styrene feed rate of 17.67 g/min (solution feed rate of 21.4 g/min). The reaction mixture was quenched with 13.72 g (0.229 mole) acetic acid in 100 ml of toluene. An aliquot of the reaction mixture gave the following GPC analysis: $M_p$: 404, $M_n$: 484, $M_w$: 714, $M_z$: 1004, PD: 1.47, $\sigma_n$= 334, $_n\alpha_3$=1.937. The workup procedure followed the general workup procedure as in Example 10—Part B, with the following conditions Upon quenching the reaction mixture was gradually stripped at elevated temperature and reduced pressure in the stainless steel reactor of unreacted toluene and TMEDA (ending conditions pot temperature 160° C. and 19 mmHg vacuum). The mixture was cooled to 100° C. and a portion (about 50%) of the reactor's content was transferred to the wash vessel previously heated to 85° C. and charged with 1700 g of fresh toluene. The TMEDA stripped product mixture was washed (2×500 ml) with deoxygenated water. Phase cuts were made at 80° C., were slow and required much settling time (≈30 minutes). Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated for the remaining ½ of the reactor's content; all total 3996 g of stripped crude reaction product were obtained.

Example 25

Forming Toluene Styrenic Telomer Distribution (TSTD25) with Potassium t-Butoxide Co-Catalyst The procedure of Example 10 was repeated except that: 1188 g (≈1.4 liters, 12.90 mole) of toluene was charged to the reactor (19 ppm residual $H_2O$), which was further made anhydrous by the addition of 0.21 g (3.2 mmole) n-butyllithium. The anhydrous toluene was heated to 80° C., upon reaching the set point temperature, a mixture comprised of 14.01 g (0.125 mole) potassium t-butoxide, 167 g (1.81 mole) toluene and 74.73 g of N,N,N',N'-tetramethylethylenediamine (TMEDA, 0.643 mole) was charged through the charge vessel and delivered subsurface to the gently agitated (300 rpm) toluene solution. The vessel and line were flushed with a 100 ml aliquot of toluene before charging with 47.35 g n-butyllithium solution (2.0 M, 16.5 wt % in cyclohexane, 0.122 mole). All total (the initial charge, the amount used to form the potassium t-butoxide/TMEDA solution and the amount used to flush the charge lines) 1526 g (16.6 mole) of toluene was charged to the reactor prior to initiating the styrene feed. Styrene, 3655 g (35.09 mole) was fed through the $\frac{1}{16}^{th}$ inch OD feed line over 176 minutes such that the feed velocity was ≈18 ft/s with a feed rate of 20.77 g/min. The reaction mixture was quenched with 14.82 g (0.247 mole) isopropyl alcohol in 100 ml of toluene. An aliquot of the reaction mixture gave the following GPC analysis: $M_p$: 508, $M_n$: 497, $M_w$: 675, $M_z$: 895, PD: 1.36, $\sigma_n$=297, $_n\alpha_3$=1.732. The workup procedure followed the general workup procedure as in Example 10—Part B, with the following conditions:

Upon quenching the reaction mixture ⅓ was transferred to the oil-jacketed washing reactor. Unreacted anhydrous toluene and TMEDA were removed and recovered by distillation until pot temperature reached 150° C. The remaining toluene and traces of TMEDA were removed azeotropically with steam until collection of toluene slows to almost nothing and the moisture builds in the reactor causing the pot temperature to drop below 140° C. Injection of steam was discontinued and the mixture cooled to 100° C. Upon cooling the mixture is gradually charged with 1700 g of fresh toluene. The TMEDA stripped product mixture was washed (2×500 ml, 85° C.) with deoxygenated water. Phase cuts were made at 80° C., were slow and required much settling time (≈30 minutes). Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated for the remaining ⅔ of the reactor's content (washing ⅓ of the total stripped reaction mixture each time). All total 4474 g of stripped crude reaction product were obtained.

Example 26

Forming Toluene Styrenic Telomer Distribution (TSTD26) with Potassium t-Butoxide Co-catalyst at Reduced Temperature The procedure of Example 10 was repeated except that: 1274 g (≈1.5 liters, 13.83 mole) of toluene was charged to the reactor (38 ppm residual $H_2O$), which was further made anhydrous by the addition of 0.43 g (6.8 mmole) n-butyllithium. The anhydrous toluene was heated to 76° C., upon reaching the set point temperature, a mixture comprised of 18.17 g (0.162 mole) potassium t-butoxide, 154 g (1.67 mole) toluene and 97.96 g of N,N,N',N'-tetramethylethylenediamine (TMEDA, 0.843 mole) was charged through the charge vessel and delivered subsurface to the gently agitated (300 rpm) toluene solution. The vessel and line were flushed with a 100 ml aliquot of toluene before charging with 62.98 g n-butyllithium solution (2.0 M, 16.5 wt % in cyclohexane, 0.162 mole). All total (the initial charge, the amount used to form the potassium t-butoxide/TMEDA solution and the amount used to flush the charge lines) 1598 g (17.3 mole) of toluene was charged to the reactor prior to initiating the styrene feed. Styrene, 3604 g (34.60 mole) was fed through the ¹⁄₁₆$^{th}$ inch OD feed line over 187 minutes such that the feed velocity was ≈16 ft/s with a feed rate of 19.27 g/min. The reaction mixture was quenched with 19.47 g (0.324 mole) acetic acid in 100 ml of toluene. An aliquot of the reaction mixture gave the following GPC analysis: $M_p$: 521, $M_n$: 546, $M_w$: 842, $M_z$: 1184, PD: 1.54, $\sigma_n$=402, $_n\alpha_3$=1.798. The workup procedure followed the general workup procedure as in Example 10—Part B, with the following conditions:

Upon quenching the reaction mixture was gradually stripped at elevated temperature and reduced pressure in the stainless steel reactor of unreacted toluene and TMEDA (ending conditions pot temperature 160° C. and 19 mmHg vacuum). The mixture was cooled to 100° C. and a portion (about 33%) of the reactor's content was transferred to the wash vessel previously heated to 85° C. and charged with 2600 g of fresh toluene. The TMEDA stripped product mixture was washed (2×400 ml) with deoxygenated water. Phase cuts were made at 80° C., were slow and required much settling time (≈30 minutes). Water and any rag or emulsion was removed through the bottom drain valve. The temperature of the oil jacket was increased to 170° C. Residual moisture and toluene were distilled through a simple distillation head (1 atm.). When the pot temperature reached 161° C., the material was cooled and drained into a nitrogen-purged bottle. The above process was repeated twice more for the remaining ⅔ of the reactor's content (washing ⅓ of the total stripped reaction mixture each time). All total 4312 g of stripped crude reaction product were obtained.

Example 27

Forming Toluene Styrenic Telomer Distribution (TSTD27) with Potassium t-Butoxide Co-catalyst at Reduced Temperature 70° C.

The procedure of Example 10 was repeated except that: 1281 g (≈1.5 liters, 13.90 mole) of toluene was charged to the reactor (33 ppm residual $H_2O$), which was further made anhydrous by the addition of 0.38 g (5.9 mmole) n-butyllithium. The anhydrous toluene was heated to 70° C., upon reaching the set point temperature, a mixture comprised of 18.19 g (0.162 mole) potassium t-butoxide, 164 g (1.78 mole toluene) and 99.00 g of N,N,N',N'-tetramethylethylenediamine (TMEDA, 0.852 mole) was charged through the charge vessel and delivered subsurface to the gently agitated (300 rpm) toluene solution. The vessel and line were flushed with a 100 ml aliquot of toluene before charging with 62.40 g n-butyllithium solution (2.0 M, 16.5 wt % in cyclohexane, 0.161 mole). All total (the initial charge, the amount used to form the potassium t-butoxide/TMEDA solution and the amount used to flush the charge lines) 1615 g (17.5 mole) of toluene was charged to the reactor prior to initiating the styrene feed. Styrene, 3722 g (35.74 mole) was fed through the ¹⁄₁₆$^{th}$ inch OD feed line over 188 minutes such that the feed velocity was ≈17 ft/s with a feed rate of 19.80 g/min. The reaction mixture was quenched with 19.39 g (0.323 mole) acetic acid in 100 ml of toluene. An aliquot of the reaction mixture gave the following GPC analysis: $M_p$: 415, $M_n$: 576, $M_w$: 845, $M_z$: 1155, PD: 1.47, $\sigma_n$=394, $_n\alpha_3$=1.694.

Example 28

Forming Toluene Styrenic Telomer Distribution (TSTD28) with Potassium t-Butoxide Co-catalyst with increased TMEDA Charge to Improve Catalyst Complex Solubility The procedure of Example 10 was repeated except that: 1343 g (≈1.6 liters, 14.58 mole) of toluene was charged to the reactor (31 ppm residual $H_2O$), which was further made anhydrous by the addition of 0.35 g (5.5 mmole) n-butyllithium. The anhydrous toluene was heated to 80° C., upon reaching the set point temperature, a mixture comprised of 16.33 g (0.146 mole) potassium t-butoxide, 90 g (0.98 mole) toluene and 105.71 g of N,N,N',N'-tetramethylethylenediamine (TMEDA, 0.910 mole) was charged through the charge vessel and delivered subsurface to the gently agitated (300 rpm) toluene solution. The vessel and line were flushed with a 100 ml aliquot of toluene before charging with 56.67 g n-butyllithium solution (2.0 M, 16.5 wt % in cyclohexane, 0.146 mole). All total (the initial charge, the amount used to form the potassium t-butoxide/TMEDA solution and the amount used to flush the charge lines) 1603 g (17.4 mole) of toluene was charged to the reactor prior to initiating the styrene feed.

Styrene, 3671 g (35.25 mole) was fed through the 1/16th inch OD feed line over 178 minutes such that the feed velocity was ≈18 ft/s with a feed rate of 20.62 g/min. The reaction mixture was quenched with 17.50 g (0.291 mole) acetic acid in 100 ml of toluene. An aliquot of the reaction mixture gave the following GPC analysis: $M_p$: 403, $M_n$: 493, $M_w$: 684, $M_z$: 943, PD: 1.39, $\sigma_n$ 307, $_n\alpha_3$=2.038.

Examples 29-44

Wiped Film Conditions for Forming STSTDs from TSTDs formed in Prior Examples

The following Examples provide the conditions and material balance data for forming stripped toluene styrenic telomer distributions of this invention using a laboratory scale wiped film evaporator. The estimated material balance data, raw material utilization for styrene and toluene and the % yield calculated from the synthesis/washing results (above) and the stripping results (below) are reported in Tables 6 and 7.

Example 29

Forming Stripped Toluene Styrenic Telomer Distribution STSTD 29

A 2416 g portion of Example 10 Part-A (49.5% of the reaction mixture), was stripped using a wiped film evaporator (WFE) of toluene and 1,3-diphenylpropane (WFE conditions: feed rate=1.33 L/hr, oil jacket temperature=180° C., Pressure=≈0.1 mmHg and condenser temperature=0° C.) to yield 1896 g a liquid resin having the following GPC analysis: $M_p$: 400, $M_n$: 688, $M_w$: 941, $M_z$: 1256, PD: 1.37, $\sigma_n$= 417, $_n\alpha_3$=1.77. The cold finger condensed 138 g of a mixture primarily comprised of 1,3-diphenylpropane, 1,3,5-triphenylpropane and 1,3,5,7-tetraphenylheptane.

Example 30

Forming Stripped Toluene Styrenic Telomer Distribution STSTD 30

A 2176 g portion of Example 10 Part-B (50.5% of the reaction mixture), was stripped using a wiped film evaporator (WFE) of toluene and 1,3-diphenylpropane (WFE conditions: feed rate=1.33 L/hr, oil jacket temperature=180° C., Pressure=≈0.1 mmHg and condenser temperature=0° C.) to yield 1937 g a liquid resin having the following GPC analysis: $M_p$: 511, $M_n$: 676, $M_w$: 938, $M_z$: 1259, PD: 1.39, $\sigma_n$=421, $_n\alpha_3$=1.75. The cold finger condensed 152 g of a mixture primarily comprised of 1,3-diphenylpropane, 1,3,5-triphenylpropane and 1,3,5,7-tetraphenylheptane.

Example 31

Forming Stripped Toluene Styrenic Telomer Distribution STSTD

A 2529 g portion of Example 12 (56.8% of the reaction mixture), was stripped using a wiped film evaporator (WFE) of toluene and 1,3-diphenylpropane (WFE conditions: feed rate=1.33 L/hr, oil jacket temperature=212° C., Pressure=≈5.0 mmHg and condenser temperature=0° C.) to yield 2091 g a liquid resin having the following GPC analysis: $M_p$: 403, $M_n$: 577, $M_w$: 762, $M_z$: 1014, PD: 1.32, $\sigma_n$=327, $_n\alpha_3$=1.98. The cold finger condensed 407 g of a mixture primarily comprised of 1,3-diphenylpropane, 1,3,5-triphenylpropane and 1,3,5,7-tetraphenylheptane.

Example 32

Forming Stripped Toluene Styrenic Telomer Distribution STSTD 32

A 3366 g portion of Example 13 Part-A (57.4% of the reaction mixture), was stripped of toluene using a wiped film evaporator (WFE) of toluene and 1,3-diphenylpropane (WFE conditions: feed rate=1.33 L/hr, oil jacket temperature=185° C., Pressure=≈55.0 mmHg and condenser temperature=0° C.) to yield 2439 g a liquid resin. A 960 g portion of the toluene stripped resin (39.4% of the reaction mixture), was further stripped on the WFE to remove 1,3-diphenylpropane (WFE conditions: feed rate=1.33 L/hr, oil jacket temperature=208° C., Pressure=≈5.0 mmHg and condenser temperature=0° C.) to yield 813 g a liquid resin having the following GPC analysis: $M_p$: 410, $M_n$: 587, $M_w$: 772, $M_z$: 1018, PD: 1.32, $\sigma_n$=330, $_n\alpha_3$=1.90. The cold finger condensed 140 g of a mixture primarily comprised of 1,3-diphenylpropane, 1,3,5-triphenylpropane and 1,3,5,7-tetraphenylheptane.

Example 33

Forming Stripped Toluene Styrenic Telomer Distribution STSTD 33

A 2492 g portion of Example 13 Part-B (42.6% of the reaction mixture), was stripped of toluene using a wiped film evaporator (WFE) of toluene and 1,3-diphenylpropane (WFE conditions: feed rate=1.33 L/hr, oil jacket temperature=185° C., Pressure=≈55.0 mmHg and condenser temperature=0° C.) to yield 1793 g a liquid resin. A 948 g portion of the toluene stripped resin (52.9% of the reaction mixture), was further stripped on the WFE to remove 1,3-diphenylpropane (WFE conditions: feed rate=1.33 L/hr, oil jacket temperature=208° C., Pressure=≈5.0 mmHg and condenser temperature=0° C.) to yield 793 g a liquid resin having the following GPC analysis: $M_p$: 410, $M_n$: 590, $M_w$: 769, $M_z$: 1002, PD: 1.30, $\sigma_n$=325, $_n\alpha_3$=1.82. The cold finger condensed 139 g of a mixture primarily comprised of 1,3-diphenylpropane, 1,3,5-triphenylpropane and 1,3,5,7-tetraphenylheptane.

Example 34

Forming a Telomer Blend Forming Stripped Toluene Styrenic Telomer Distribution STSTD 34

A 4439 g portion of Example 14 (≈100% of the reaction mixture), was stripped using a wiped film evaporator (WFE) of toluene and 1,3-diphenylpropane (WFE conditions: feed rate=1.33 L/hr, oil jacket temperature=212° C., Pressure=≈5.0 mmHg and condenser temperature=0° C.) to yield 3673 g a liquid resin having the following GPC analysis: $M_p$: 400, $M_n$: 574, $M_w$: 759, $M_z$: 1009, PD: 1.32, $\sigma_n$=326, $_n\alpha_3$=1.95. The cold finger condensed 702 g of a mixture primarily comprised of 1,3-diphenylpropane, 1,3,5-triphenylpropane and 1,3,5,7-tetraphenylheptane.

Example 35

Forming a Telomer Blend Stripped Toluene Styrenic Telomer Distribution Forming STSTD 35

A 4474 g portion of Example 16 (≈100% of the reaction mixture), was stripped using a wiped film evaporator (WFE)

of toluene and 1,3-diphenylpropane (WFE conditions: feed rate=1.33 L/hr, oil jacket temperature=212° C., Pressure=≈5.0 mmHg and condenser temperature=0° C.) to yield 3601 g a liquid resin having the following GPC analysis: $M_p$: 411, $M_n$: 581, $M_w$: 769, $M_z$: 1027, PD: 1.32, $\sigma_n$=330, $_n\alpha_3$=2.00. The cold finger condensed 703 g of a mixture primarily comprised of 1,3-diphenylpropane, 1,3,5-triphenylpropane and 1,3,5,7-tetraphenylheptane.

Example 36

Forming a Telomer Blend Stripped Toluene Styrenic Telomer Distribution Then Stripping STSTD 36

A blend was formed from a 2361 g portion of Example 17 Part-A (47.0% of the reaction mixture) and a 1291 g portion of Example 18 Part-A (30.7% of the reaction mixture) and having the following analysis: $M_p$: 304, $M_n$: 440, $M_w$: 639, $M_z$: 905, PD: 1.45, $\sigma_n$=296, $_n\alpha_3$=2.07. The blend was stripped using a wiped film evaporator (WFE) of toluene and 1,3-diphenylpropane (WFE conditions: feed rate=1.33 L/hr, oil jacket temperature=170° C., Pressure=<0.1 mmHg and condenser temperature=0° C.) to yield 2651 g a liquid resin having the following GPC analysis: $M_p$: 406, $M_n$: 547, $M_w$: 706 $M_z$: 923, PD: 1.29, $\sigma_n$=295, $_n\alpha_3$=1.95. The cold finger condensed 422 g of a mixture primarily comprised of 1,3-diphenylpropane, 1,3,5-triphenylpropane and 1,3,5,7-tetraphenylheptane.

Example 37

Forming a Telomer Blend Stripped Toluene Styrenic Telomer Distribution Then stripping STSTD 37

A blend was formed from a 2643 g portion of Example 17 Part-B (53.0% of the reaction mixture) and a 1037 g portion of Example 18 Part-B (24.6 of the reaction mixture) and having the following analysis: $M_p$: 305, $M_n$: 437, $M_w$: 631, $M_z$: 888, PD: 1.44, $\sigma_n$=291, $_n\alpha_3$=2.04. The blend was stripped using a wiped film evaporator (WFE) of toluene and 1,3-diphenylpropane (WFE conditions: feed rate=1.33 L/hr, oil jacket temperature=165° C., Pressure=<0.1 mmHg and condenser temperature=0° C.) to yield 2955 g a liquid resin having the following GPC analysis: $M_p$: 302, $M_n$: 530, $M_w$: 686 $M_z$: 900, PD: 1.29, $\sigma_n$=288, $_n\alpha_3$=1.97. The cold finger condensed 500 g of a mixture primarily comprised of 1,3-diphenylpropane, 1,3,5-triphenylpropane and 1,3,5,7-tetraphenylheptane.

Example 38

Forming a Telomer Blend From Two Stripped Toluene Styrenic Telomer Distributions STSTDS 38

A blend was produced from of 2086 g of STSTD 31 from Example 31, 1985 g of STSTD 34 from Example 34, and 7000 g of dry BCM to form a 36.8 wt % having the following GPC analysis: $M_p$: 406, $M_n$: 582, $M_w$: 763, $M_z$: 1004, PD: 1.31, $\sigma_n$=325, $_n\alpha_3$=1.89.

Example 39

Forming Stripped Toluene Styrenic Telomer Distribution STSTD 39

A 4385 g portion of Example 19 (100% of the reaction mixture), was stripped using a wiped film evaporator (WFE) of toluene and 1,3-diphenylpropane (WFE conditions: feed rate=1.33 L/hr, oil jacket temperature=212° C., Pressure=≈5.0 mmHg and condenser temperature=0° C.) to yield 3664 g a liquid resin having the following GPC analysis: $M_p$: 513, $M_n$: 656, $M_w$: 903, $M_z$: 1246, PD: 1.38, $\sigma_n$=403, $_n\alpha_3$=2.10. The cold finger condensed 348 g of a mixture primarily comprised of 1,3-diphenylpropane, 1,3,5-triphenylpropane and 1,3,5,7-tetraphenylheptane.

Example 40

Forming Stripped Toluene Styrenic Telomer Distribution STSTD 40

A 5008 g portion of Example 20 (100% of the reaction mixture), was stripped using a wiped film evaporator (WFE) of toluene and 1,3-diphenylpropane (WFE conditions: feed rate=1.33 L/hr, oil jacket temperature=155° C., Pressure=<0.1 mmHg and condenser temperature=0° C.) to yield 3926 g a liquid resin having the following GPC analysis: $M_p$: 500, $M_n$: 616, $M_w$: 823, $M_z$: 1096, PD: 1.34, $\sigma_n$=357, $_n\alpha_3$=1.89.

The cold finger condensed 170 g of a mixture primarily comprised of 1,3-diphenylpropane, 1,3,5-triphenylpropane and 1,3,5,7-tetraphenylheptane.

Example 41

Forming Stripped Toluene Styrenic Telomer Distribution STSTD 41

A 5255 g portion of Example 22 (100% of the reaction mixture), was stripped using a wiped film evaporator (WFE) of toluene and 1,3-diphenylpropane (WFE conditions: feed rate=1.33 L/hr, oil jacket temperature=157° C., Pressure=<0.1 mmHg and condenser temperature=0° C.) to yield 3946 g a liquid resin having the following GPC analysis: $M_p$: 517, $M_n$: 606, $M_w$: 776, $M_z$: 1008, PD: 1.28, $\sigma_n$=321, $_n\alpha_3$=1.94. The cold finger condensed 229 g of a mixture primarily comprised of 1,3-diphenylpropane, 1,3,5-triphenylpropane and 1,3,5,7-tetraphenylheptane.

Example 42

Forming Stripped Toluene Styrenic Telomer Distribution STSTD 42

A 3787 g portion of Example 24 (100% of the reaction mixture), was stripped using a wiped film evaporator (WFE) of toluene and 1,3-diphenylpropane (WFE conditions: feed rate=1.33 L/hr, oil jacket temperature=212° C., Pressure=≈5.0 mmHg and condenser temperature=0° C.) to yield 2882 g a liquid resin having the following GPC analysis: $M_p$: 408, $M_n$: 606, $M_w$: 794, $M_z$: 1047, PD: 1.31, $\sigma_n$=338, $_n\alpha_3$=1.93. The cold finger condensed 467 g of a mixture primarily comprised of 1,3-diphenylpropane, 1,3,5-triphenylpropane and 1,3,5,7-tetraphenylheptane.

Example 43

Forming Stripped Toluene Styrenic Telomer Distribution STSTD 43

A 4330 g portion of Example 25 (100% of the reaction mixture), was stripped using a wiped film evaporator (WFE) of toluene and 1,3-diphenylpropane (WFE conditions: feed rate=1.33 L/hr, oil jacket temperature=165° C., Pressure=<0.1 mmHg and condenser temperature=0° C.) to yield 3944 g a liquid resin having the following GPC analysis: $M_p$: 504, $M_n$: 565, $M_w$: 713, $M_z$: 909, PD: 1.26, $\sigma_n$=289, $_n\alpha_3$=1.82. The cold finger condensed 378 g of a mixture primarily comprised of 1,3-diphenylpropane, 1,3,5-triphenylpropane and 1,3,5,7-tetraphenylheptane.

Example 44

Forming Stripped Toluene Styrenic Telomer Distribution STSTD 44

A 4279 g portion of Example 27 (100% of the reaction mixture), was stripped using a wiped film evaporator (WFE) of toluene and 1,3-diphenylpropane (WFE conditions: feed rate=1.33 L/hr, oil jacket temperature=175° C., Pressure=<0.1 mmHg and condenser temperature=0° C.) to yield 3644 g a liquid resin having the following GPC analysis: $M_p$: 501, $M_n$: 653, $M_w$: 882, $M_z$: 1176, PD: 1.35, $\sigma_n$=387, $_n\alpha_3$=1.83. The cold finger condensed 292 g of a mixture primarily comprised of 1,3-diphenylpropane, 1,3,5-triphenylpropane and 1,3,5,7-tetraphenylheptane.

In Tables 3-5 sty/toluene/hr denotes moles of styrene fed per mole of toluene per hour and sty/butyllithium/hr denotes moles of styrene fed per mole of butyllithium (initially charged) per hour.

TABLE 3

| Unstripped TSTD | 1 | 2 | 3 | 4 | 5 | 6 |
|---|---|---|---|---|---|---|
| Toluene (lbs) | 192.3 | 192.3 | 192.1 | 192.9 | 191.4 | 189.6 |
| lb-mole | 2.1 | 2.1 | 2.1 | 2.1 | 2.1 | 2.1 |
| Styrene (lbs) | 374.4 | 359.2 | 361 | 440 | 437.2 | 450 |
| lb-mole | 3.6 | 3.4 | 3.5 | 4.2 | 4.2 | 4.3 |
| TMEDA (lbs) | 4.1 | 3.63 | 3.63 | 4.65 | 4.23 | 5.7 |
| lb-mole | 0.0351 | 0.0313 | 0.0313 | 0.0401 | 0.0365 | 0.0487 |
| 23.63% BuLi in C6 solution (lbs) | 3.9 | 3.5 | 3.5 | 4.4 | 4.1 | 4.4 |
| BuLi (lbs) | 0.92 | 0.83 | 0.83 | 1.04 | 0.97 | 1.04 |
| lb-mole | 0.014400 | 0.012923 | 0.012923 | 0.016246 | 0.015138 | 0.016246 |
| Cyclohexane (lbs) | 3.0 | 2.7 | 2.7 | 3.4 | 3.1 | 3.4 |
| Avg. Temperature (° C.) | 77.4 | 78.6 | 79.9 | 79.2 | 78.6 | 78.6 |
| Feed Time (min) | 162 | 158 | 129 | 146 | 162 | 152 |
| Feed Rate (lbs/min) | 2.31 | 2.27 | 2.85 | 3.00 | 3.00 | 3.00 |
| sty/toluene/hr | 0.64 | 0.63 | 0.77 | 0.83 | 0.75 | 0.83 |
| sty/butyllithium/hr | 92 | 101 | 125 | 107 | 103 | 105 |
| $M_n$ | 433 | 440 | 483 | 417 | 418 | 428 |
| $M_w$ | 626 | 649 | 721 | 597 | 609 | 612 |
| $M_z$ | 883 | 931 | 1034 | 835 | 858 | 859 |
| PD | 1.45 | 1.48 | 1.49 | 1.43 | 1.46 | 1.43 |
| Standard Deviation $\sigma_n$ | 289 | 303 | 339 | 274 | 283 | 281 |
| Asymmetry $_n\alpha_3$ | 2.05 | 2.13 | 2.07 | 2.02 | 2.01 | 2.06 |

TABLE 4

| Unstripped TSTD | 10 | 11 | 12 | 13 | 14 |
|---|---|---|---|---|---|
| Temperature, ° C. | 78 | 80 | 80 | 80 | 80 |
| Mole sty/mole tol | 2.10 | 2.99 | 2.05 | 1.81 | 2.03 |
| sty/toluene/hr | 0.80 | 0.98 | 0.72 | 0.65 | 0.70 |
| sty/butyllithium/hr | 100.88 | 89.21 | 92.47 | 93.17 | 90.53 |
| % 1,3-diphenylpropane | 8% | 9% | 12% | 12% | 12% |
| $M_p$ | 408 | 416 | 308 | 308 | 418 |
| $M_n$ | 562 | 540 | 469 | 471 | 475 |
| $M_w$ | 866 | 820 | 696 | 702 | 704 |
| $M_z$ | 1216 | 1147 | 985 | 996 | 992 |
| PD | 1.54 | 1.52 | 1.48 | 1.49 | 1.48 |
| Variance ($M_w M_n - M_n^2$) | 1.71E+05 | 1.51E+05 | 1.06E+05 | 1.09E+05 | 1.09E+05 |
| Skewness $_nU_3$ | 1.26E+08 | 1.05E+08 | 6.86E+07 | 7.11E+07 | 6.95E+07 |
| Standard Deviation $\sigma_n$ | 413 | 389 | 326 | 330 | 330 |
| Asymmetry $_n\alpha_3$ | 1.788 | 1.794 | 1.974 | 1.981 | 1.939 |
| PDF Model Results | Weibull | Weibull | Weibull | Weibull | Weibull |
| γ | 1.395 | 1.390 | 1.294 | 1.293 | 1.305 |
| α | 8.000 | 7.505 | 6.010 | 6.100 | 6.140 |
| $M_n$ | 571 | 547 | 469 | 473 | 475 |
| $M_w$ | 866 | 820 | 693 | 701 | 703 |
| $M_z$ | 1212 | 1144 | 979 | 993 | 992 |
| PD | 1.52 | 1.55 | 1.48 | 1.48 | 1.48 |
| Standard Deviation $\sigma_n$ | 411 | 387 | 324 | 329 | 329 |
| Asymmetry $_n\alpha_3$ | 1.794 | 1.797 | 1.977 | 1.981 | 1.955 |

| Unstripped TSTD | 15 | 16 | 17 | 18 |
|---|---|---|---|---|
| Temperature, ° C. | 85 | 80-92 | 85-92 | 85-92 |
| Mole sty/mole tol | 0.06 | 1.99 | 1.77 | 2.01 |
| sty/toluene/hr | 0.56 | 0.69 | 0.69 | 0.76 |
| sty/butyllithium/hr | 88.32 | 97.24 | 123.74 | 125.95 |
| % 1,3-diphenylpropane | 16% | 13% | 16% | 15% |

TABLE 4-continued

|  |  |  |  |  |
|---|---|---|---|---|
| $M_p$ | 307 | 308 | 192 | 315 |
| $M_n$ | 406 | 465 | 407 | 533 |
| $M_w$ | 551 | 696 | 582 | 798 |
| $M_z$ | 734 | 1000 | 813 | 1138 |
| PD | 1.36 | 1.50 | 1.43 | 1.50 |
| Variance ($M_w M_n - M_n^2$) | 5.89E+04 | 1.07E+05 | 7.12E+04 | 1.41E+05 |
| Skewness $_nU_3$ | 2.56E+07 | 7.33E+07 | 3.82E+07 | 1.07E+08 |
| Standard Deviation $\sigma_n$ | 243 | 328 | 267 | 376 |
| Asymmetry $_n\alpha_3$ | 1.790 | 2.081 | 2.009 | 2.011 |
| PDF Model Results | Weibull | Weibull | Weibull | Weibull |
| $\gamma$ | 1.385 | 1.251 | 1.251 | 1.270 |
| $\alpha$ | 4.650 | 5.970 | 4.770 | 7.000 |
| $M_n$ | 407 | 464 | 409 | 512 |
| $M_w$ | 553 | 696 | 581 | 791 |
| $M_z$ | 735 | 1000 | 812 | 1148 |
| PD | 1.36 | 1.50 | 1.42 | 1.55 |
| Standard Deviation $\sigma_n$ | 244 | 328 | 265 | 378 |
| Asymmetry $_n\alpha_3$ | 1.762 | 2.078 | 2.046 | 2.056 |

TABLE 5

| Unstripped TSTD | 19 | 20 | 21 | 22 | 23 |
|---|---|---|---|---|---|
| Temperature, °C. | 80 | 80 | 80 | 80 | 80 |
| Mole sty/mole tol | 1.99 | 2.03 | 2.05 | 2.00 | 2.07 |
| sty/toluene/hr | 0.65 | 0.66 | 0.66 | 0.67 | 0.69 |
| sty/butyllithium/hr | 98.96 | 78.23 | 77.92 | 94.50 | 93.84 |
| % 1,3-diphenylpropane | 3% | 7% | 7% | 5% | 7% |
| $M_p$ | 413 | 517 | 512 | 520 | 509 |
| $M_n$ | 620 | 547 | 539 | 551 | 514 |
| $M_w$ | 885 | 795 | 780 | 747 | 724 |
| $M_z$ | 1233 | 1092 | 1074 | 986 | 1002 |
| PD | 1.42 | 1.45 | 1.45 | 1.36 | 1.41 |
| Variance | 1.64E+05 | 1.36E+05 | 1.30E+05 | 1.08E+05 | 1.08E+05 |
| Skewness $_nU_3$ | 1.346E+08 | 8.859E+07 | 8.489E+07 | 6.003E+07 | 7.064E+07 |
| Standard Deviation $\sigma_n$ | 405 | 368 | 360 | 329 | 329 |
| Asymmetry $_n\alpha_3$ | 1.991 | 1.773 | 1.813 | 1.692 | 1.992 |
| PDF Model Results | Beta | Beta | Beta | Beta | Beta |
| $\alpha$ | 1.510 | 1.729 | 1.570 | 1.850 | 1.468 |
| $\beta$ | 21.5 | 27.875 | 25.950 | 32.380 | 27.050 |
| $M_n$ | 581 | 562 | 538 | 544 | 495 |
| $M_w$ | 875 | 795 | 780 | 747 | 718 |
| $M_z$ | 1239 | 1077 | 1081 | 989 | 1005 |
| PD | 1.46 | 1.42 | 1.45 | 1.37 | 1.45 |
| Standard Deviation $\sigma_n$ | 413 | 362 | 361 | 332 | 332 |
| Asymmetry $_n\alpha_3$ | 1.924 | 1.744 | 1.869 | 1.662 | 1.961 |

| Unstripped TSTD | 24 | 25 | 26 | 27 |
|---|---|---|---|---|
| Temperature, °C. | 80 | 80 | 76 | 70 |
| Mole sty/mole tol | 1.12 | 2.12 | 2.00 | 2.04 |
| sty/toluene/hr | 0.39 | 0.72 | 0.64 | 0.65 |
| sty/butyllithium/hr | 88.96 | 98.10 | 68.44 | 70.96 |
| % 1,3-diphenylpropane | 10% | 8% | 10% | 7% |
| $M_p$ | 404 | 508 | 521 | 415 |
| $M_n$ | 484 | 497 | 546 | 576 |
| $M_w$ | 714 | 675 | 842 | 845 |
| $M_z$ | 1004 | 895 | 1184 | 1155 |
| PD | 1.48 | 1.36 | 1.54 | 1.47 |
| Variance | 1.11E+05 | 8.85E+04 | 1.62E+05 | 1.55E+05 |
| Skewness $_nU_3$ | 7.19E+07 | 4.558E+07 | 1.168E+08 | 1.033E+08 |
| Standard Deviation $\sigma_n$ | 334 | 297 | 402 | 394 |
| Asymmetry $_n\alpha_3$ | 1.937 | 1.732 | 1.798 | 1.694 |
| PDF Model Results | Beta | Beta | Beta | Beta |
| $\alpha$ | 1.525 | 1.794 | 1.650 | 1.790 |
| $\beta$ | 28.301 | 35.875 | 24.700 | 26.800 |
| $M_n$ | 497 | 497 | 580 | 595 |
| $M_w$ | 714 | 675 | 842 | 842 |
| $M_z$ | 989 | 892 | 1160 | 1136 |
| PD | 1.44 | 1.36 | 1.45 | 1.42 |
| Standard Deviation $\sigma_n$ | 328 | 297 | 390 | 384 |
| Asymmetry $_n\alpha_3$ | 1.907 | 1.698 | 1.801 | 1.699 |

TABLE 6

| TSTD | 10A | 10B | 12 | 13A | 13B | 14 | 16 |
|---|---|---|---|---|---|---|---|
| STSTD | 29 | 30 | 31 | 32 | 33 | 34 | 35 |
| $M_w$ | 941 | 938 | 762 | 772 | 769 | 759 | 769 |
| Styrene charged | 3698 | 3698 | 3719 | 3563 | 3563 | 3705 | 3640 |
| Asymmetry $_n\alpha_3$ | 1.77 | 1.75 | 1.98 | 1.90 | 1.82 | 1.95 | 2.00 |
| lbs toluene incorporated | 424 | 451 | 750 | 638 | 601 | 713 | 683 |
| adjusted total yield | 4122 | 4149 | 4469 | 4201 | 4164 | 4418 | 4323 |
| TSTD mass (g) | 3843 | 3847 | 3752 | 3584 | 3542 | 3709 | 3617 |
| light-end yield | 280 | 302 | 716 | 617 | 622 | 709 | 706 |
| STSTD Yield % | 93% | 93% | 84% | 85% | 85% | 84% | 84% |
| Total lbs product/lb styrene | 1.11 | 1.12 | 1.20 | 1.18 | 1.17 | 1.19 | 1.19 |
| lbs STSTD/lb styrene | 1.04 | 1.04 | 1.01 | 1.01 | 0.99 | 1.00 | 0.99 |
| Total lbs product/lb toluene | 9.72 | 9.20 | 5.96 | 6.58 | 6.93 | 6.19 | 6.33 |
| lbs STSTD/lb toluene | 9.06 | 8.53 | 5.00 | 5.62 | 5.89 | 5.20 | 5.29 |

TABLE 7

| TSTD | 19 | 20 | 22 | 24 | 25 | 27 |
|---|---|---|---|---|---|---|
| STSTD | 39 | 40 | 41 | 42 | 43 | 44 |
| $M_w$ | 903 | 823 | 776 | 794 | 713 | 882 |
| Asymmetry $_n\alpha_3$ | 2.10 | 1.89 | 1.94 | 1.93 | 1.82 | 1.83 |
| Styrene charged | 3718 | 3604 | 3620 | 3004 | 3655 | 3722 |
| lbs toluene incorporated | 362 | 517 | 634 | 530 | 811 | 244 |
| adjusted total yield | 4080 | 4121 | 4254 | 3534 | 4466 | 3966 |
| TSTD mass (g) | 3726 | 3950 | 4021 | 3041 | 4075 | 3672 |
| light-end yield | 354 | 171 | 233 | 493 | 391 | 294 |
| STSTD Yield % | 91% | 96% | 95% | 86% | 91% | 93% |
| Total lbs product/lb styrene | 1.10 | 1.14 | 1.18 | 1.18 | 1.22 | 1.07 |
| lbs STSTD/lb styrene | 1.00 | 1.10 | 1.11 | 1.01 | 1.11 | 0.99 |
| Total lbs product/lb toluene | 11.28 | 7.97 | 6.71 | 6.67 | 5.51 | 16.24 |
| lbs STSTD/lb toluene | 10.30 | 7.64 | 6.34 | 5.74 | 5.03 | 15.04 |

The results of Examples 11 and 15 as shown in Table 4 clearly demonstrate the importance of utilizing a controlled yet very rapid feed of the styrene to the reaction mixture in order to form the unique toluene styrenic telomer distributions of this invention. In Example 11 three moles of styrene is fed per mole of toluene with out significant deviation of the molecular weight distribution with regard to its mean value $M_w$, PDI, $\sigma_n$, and $_n\alpha_3$ from the other Examples. In Example 15 the styrene feed was stopped only 6 minutes into the feed as with Example 11 the resulting telomer molecular weight distribution did not deviate significantly with regard to its mean value $M_w$, PDI, $\sigma_n$ and $_n\alpha_3$ from the other Examples. These two Examples which use a catalyst formed from an alkyllithium as the sole metal constituent clearly show that for the intensely mixed, highly dispersed uniform reaction mixtures of this invention, each differential increment of styrene fed (ds) over some differential value of time (dt) the result is formation of a distribution of dead telomer chain components $x_i$s primarily characterized by the styrene feed rate (ds/dt). These results demonstrate that under these conditions of this invention, there is no appreciable regeneration of the dead telomer chain components $x_i$s and the final product distribution is simply the timed average sum of all populations of incrementally produced dead polymer chains. Thus, an important feature of this invention is the surprising result that narrow very low molecular weight toluene styrenic telomer distributions having very limited skewness and low asymmetry are achieved through very rapid styrene feed rates at very low catalyst loadings. This is contrary to all prior art teachings.

The process technology represented by the Examples in Table 5 have the distinct advantage of forming reduced levels of 1,3-diphenylpropane. The results demonstrate that as in the case of the exclusively lithium process discussed in the immediately preceding paragraph, the distribution of dead telomer chain components is principally set by the rapid incremental styrene feed rate (ds/dt). However, under these conditions in which there is the added potassium t-butoxide based co-catalyst, regeneration of primarily only dead component chain $x_1$ can and does occur. The result is the reacting out of much of the 1,3-diphenylpropane and formation of higher molecular weight component chains ($x_i$s) thereby improving the overall yield of the toluene styrenic telomer distribution without increase in the weight average molecular weight, $M_w$, and more importantly without an increase in the z average molecular weight $M_z$ and consequent increase in skewness and asymmetry. Thus, this process technology of this invention in which a metal co-catalyst is used also produces toluene styrenic telomer distributions suitable for production of the brominated styrenic polymers of this invention.

However, in contrast to processes wherein the metal portion of the catalyst consists of lithium only, when the metal portion of the catalyst is formed from lithium and potassium, solubility of the catalysts is problematic. This is borne out by the results shown in Table 5 for process technology where potassium t-butoxide and additional TMEDA (mole K:mole Li active=1:1, mole K+mole Li (as total Li):mole TMEDA=1:2.5) (mole active Li does not include added butyllithium to dry the initial charge of toluene, mole total Li includes the catalyst charge and the amount required to dry toluene). Inspection of the molecular distributions formed relative to the molecular weight distribution indicates that expected trends are not always followed. We have discovered that, unlike a catalyst in which the metal consists only of lithium, there is a propensity for certain compositions and concentrations of the formed catalyst to precipitate from the reaction mixture and effectively reduce catalyst activity. The data points to the issue of forming the catalyst under very narrow combinations of potassium t-butoxide, n-butyllithium, Li$_2$O (from moisture in solvent and butyllithium used to dry) and TMEDA. Example 28 demonstrates that increasing the TMEDA charge relative to the total metal charged from 2.5:1 to 3.0:1 improves the reproducibility of the results but with some slight loss in asymmetry.

Comparative Examples 45-48

Comparative Example 45 by comparison demonstrates the process inefficiencies of an anionic polystyrene-based process for forming a benzyl oligostyrene distribution having a molecular weight in the range of the molecular weights of toluene styrenic telomers of this invention. Comparative Examples 46-48 illustrate the results we obtained when repeating Example 4 of EP 0 741 147 A1. These experimental results together with the results as reported in Example 4 of EP 0 741 147 A1 are summarized in Table 8.

The results clearly establish that the type and shape of product distribution formed from that prior process technology is characterized by having a highly populated, high molecular weight tail. The presence of such excessive amounts of high molecular weight polymer component chains renders such distributions incapable of forming on bromination the brominated styrenic polymers of this invention. Furthermore, the characteristic high percentage of high molecular weight fractions formed by the process technology in EP 0 741 147 A1 would impart upon bromination of the distribution of EP 0 741 147 A1 a high glass transition temperature. Such a brominated material with a high glass transition temperature could not provide the desired melt flow characteristics and favorable impact properties provided by the brominated styrenic polymers of this invention.

Comparative Example 45

Forming Anionic Polystyrene Benzyl Oligostyrene

Toluene (anhydrous grade), 2162 g (≈2.5 liters, 23.46 mol), was charged to the reactor and heated to 50° C. Upon reaching the set point temperature, 308.8 g n-butyllithium solution (2.0 M, 16.5 wt % in cyclohexane, 0.795 mol) was charged through the charge vessel and delivered subsurface to the gently agitated (300 rpm) toluene solution. The vessel and line were flushed with a 250 ml aliquot of toluene before charging with 115.77 g of N,N,N',N'-tetramethylethylenediamine dissolved in 250 ml of toluene (TMEDA, 0.997 mol). Agitation was increased to 850 RPM and the TMEDA was pumped into the reactor subsurface. The charging pump was flushed with a 400 ml aliquot of toluene. The reactor was cooled to 45° C. All total (initial charge and that which was used to flush charge lines and pump) 3808 g (41.33 mol) of toluene was charged to the reactor prior to initiating the styrene feed. Styrene, 512 g (4.92 mol) dissolved in 482 g of toluene was fed through the dip leg to the reactor in 40 minutes. Upon near completion of the styrene feed, 500 ml of toluene was charged to the styrene feed system and the lines thereby fully flushed of the reactive styrene monomer. The styrene feed to the reactor was deemed complete when no further heat of reaction was observed generally signified by the closing of the automated control valve on the coiling coils. The catalyst is then quenched with a 500 ml charge of toluene and containing 50.1 g of isopropyl alcohol (0.835 mol).

Approximately ½ of the reaction mixture was transferred to the wash vessel previously heated to 85° C. and then washed with deoxygenated water (300 ml). Phase cut was made at 80° C., and was rapid requiring little settling time. Water and any rag or emulsion was removed through the bottom drain valve. An aliquot was removed for analysis via GPC ($M_p$: 714, $M_n$: 670, $M_w$: 763, $M_z$: 843, PD: 1.14, $\sigma_n$=250, $_n\alpha_3$=0.318). The temperature of the oil jacket was increased to 170° C. Cyclohexane, residual moisture, TMEDA and toluene were distilled through a simple distillation head (1 atm.). When the pot temperature reached 148° C., the material was cooled and drained into a nitrogen-purged bottle. The second half of the material was treated in the exact same manner and placed in the same bottle after work up (558 g). Thus 558 g of a APS benzyl oligostyrene was produced from 512 g of styrene and 0.795 mole of butyllithium.

Comparative Example 46

Comparative Example Forming Reaction Mixture with in Large Volume Diluent with Limiting Chain Transfer Agent The procedure of Example 10 was repeated except that: 1325 g (≈1.7 liters, 15.74 mole) of cyclohexane was charged to the reactor (12 ppm residual H$_2$O), which was further made anhydrous by the addition of 0.30 g (4.7 mmole) n-butyllithium. The anhydrous cyclohexane was heated to 70° C., upon reaching the set point temperature, a mixture comprised of 9.14 g (0.081 mole) potassium t-butoxide, 80 g (0.95 mole) cyclohexane, 236.6 g (2.23 mole, 100 ppm water) ethylbenzene and 50.30 g of N,N,N',N'-tetramethylethylenediamine (TMEDA, 0.433 mole) was charged through the charge vessel and delivered subsurface to the gently agitated (300 rpm) cyclohexane solution. The vessel and line were flushed with a 100 ml aliquot of cyclohexane before charging with 31.47 g n-butyllithium solution (2.0 M, 16.5 wt % in cyclohexane, 0.081 mole). All total (the initial charge, the amount used to form the potassium t-butoxide/TMEDA solution and the amount used to flush the charge lines) 1563 g (18.57 mole) of cyclohexane was charged to the reactor prior to initiating the styrene feed. Styrene, 1648 g (15.82 mole) was fed through the 1/16$^{th}$ inch OD feed line over 366 minutes such that the feed velocity was ≈3.82 ft/s with a feed rate of 4.50 g/min. The reaction mixture was quenched with 9.76 g (0.163 mole) isopropyl alcohol in 100 ml of toluene. An aliquot of the reaction mixture gave the following GPC analysis: $M_p$: 1598, $M_n$: 1056, $M_w$: 2027, $M_z$: 3377, PD: 1.92, $\sigma_n$=1010, $_n\alpha_3$=2.699.

Comparative Example 47

Comparative Example Forming Reaction Mixture with in Large Volume Diluent with Limiting Chain Transfer Agent The procedure of Example 10 was repeated except that: 1290 g (≈1.7 liters, 15.33 mole) of cyclohexane was charged to the reactor (18 ppm residual H$_2$O), which was further made anhydrous by the addition of 0.35 g (5.5 mmole) n-butyllithium. The anhydrous cyclohexane was heated to 70° C., upon reaching the set point temperature, a mixture comprised of 10.36 g (0.092 mole) potassium t-butoxide, 82 g (0.98 mole) cyclohexane, 238.6 g (2.25 mole, 131 ppm water) ethylbenzene and 57.42 g of N,N,N',N'-tetramethylethylenediamine (TMEDA, 0.494 mole) was charged through the charge vessel and delivered subsurface to the gently agitated (300 rpm) cyclohexane solution. The vessel and line were flushed with a 100 ml aliquot of cyclohexane before charging with 36.36 g n-butyllithium solution (2.0 M, 16.5 wt % in cyclohexane, 0.094 mole). All total (the initial charge, the amount used to form the potassium t-butoxide/TMEDA solution and the amount used to flush the charge lines) 1526 g (18.13 mole) of cyclohexane was charged to the reactor prior to initiating the styrene feed. Styrene, 1675 g (16.08 mole) was fed through the $1/16^{th}$ inch OD feed line over 375 minutes such that the feed velocity was ≈3.79 ft/s with a feed rate of 4.47 g/min. The reaction mixture was quenched with 11.17 g (0.186 mole) isopropyl alcohol in 100 ml of toluene. An aliquot of the reaction mixture gave the following GPC analysis: $M_p$: 1585, $M_n$: 1046, $M_w$: 2055, $M_z$: 3471, PD: 1.96, $\sigma_n$=1030, $_n\alpha_3$=2.771.

the $1/16^{th}$ inch OD feed line over 369 minutes such that the feed velocity was ≈3.78 ft/s with a feed rate of 4.46 g/min. The reaction mixture was quenched with 11.13 g (0.185 mole) isopropyl alcohol in 100 ml of toluene. An aliquot of the reaction mixture gave the following GPC analysis: $M_p$: 1331, $M_n$: 877, $M_w$: 1597, $M_z$: 2608, PD: 1.68, $\sigma_n$=795, $_n\alpha_3$=2.624.

TABLE 8

|  | Example # | | | |
|---|---|---|---|---|
|  | EP 0741 147 A1 Example 4 | 46 | 47 | 48 |
| Temperature, ° C. | 70 | 70 | 70 | 70 |
| CTA | EB | EB | EB | Tol |
| Cyclohexane Diluent (ml) | 1558 | 1558 | 1558 | 1558 |
| g Cyclohexane/g Styrene | 0.95 | 0.95 | 0.91 | 0.95 |
| Mole Styrene/mole CTA | 7.09 | 7.14 | 7.19 | 7.05 |
| Mole Styrene/mole CTA/hr | 1.18 | 1.17 | 1.15 | 1.15 |
| Mole Styrene/mole Li/hr | 32.06 | 32.00 | 27.48 | 27.57 |
| $DP_n$ | 7.94 | 9.13 | 9.04 | 8.36 |
| $M_p$ | NR | 1598 | 1585 | 1333 |
| $M_n$ | 932 | 1056 | 1046 | 961 |
| $M_w$ | 1500 | 2027 | 2055 | 1616 |
| $M_z$ | NR | 3377 | 3471 | 2612 |
| PD | 1.61 | 1.92 | 1.96 | 1.68 |
| Variance | 5.29E+05 | 1.03E+06 | 1.06E+06 | 6.29E+05 |
| Skewness | — | 2.80E+09 | 3.00E+09 | 1.36E+09 |
| Standard Deviation $\sigma_n$ | 728 | 1013 | 1027 | 793 |
| Asymmetry, $_n\alpha_3$ | — | 2.70 | 2.77 | 2.71 |
| PDF Model | Log-Norm | Log-Norm | Log-Norm | Log-Norm |
| $\sigma$ | 7.08 | 7.35 | 7.35 | 7.14 |
| $\mu$ | 0.696 | 0.77 | 0.79 | 0.71 |
| $M_n$ | 932 | 1139 | 1142 | 991 |
| $M_w$ | 1500 | 2027 | 2055 | 1616 |
| $M_z$ | 2381 | 3343 | 3433 | 2582 |
| PD | 1.61 | 1.78 | 1.80 | 1.63 |
| Standard Deviation $\sigma_n$ | 727 | 1006 | 1021 | 787 |
| Asymmetry, $_n\alpha_3$ | 2.70 | 2.74 | 2.81 | 2.71 |

Comparative Example 48

Comparative Example Forming Reaction Mixture in Large Volume Diluent with Limiting Chain Transfer Agent The procedure of Example 10 was repeated except that: 1318 g (≈1.7 liters, 15.66 mole) of cyclohexane was charged to the reactor (15 ppm residual $H_2O$, which was further made anhydrous by the addition of 0.16 g (2.5 mmole) n-butyllithium. The anhydrous cyclohexane was heated to 70° C., upon reaching the set point temperature, a mixture comprised of 10.36 g (0.092 mole) potassium t-butoxide, 94 g (1.12 mole) cyclohexane, 206.3 g (2.24 mole, 31 ppm water) toluene and 55.45 g of N,N,N',N'-tetramethylethylenediamine (TMEDA, 0.477 mole) was charged through the charge vessel and delivered subsurface to the gently agitated (300 rpm) cyclohexane solution. The vessel and line were flushed with a 100 ml aliquot of cyclohexane before charging with 36.14 g n-butyllithium solution (2.0 M, 16.5 wt % in cyclohexane, 0.093 mole). All total (the initial charge, the amount used to form the potassium t-butoxide/TMEDA solution and the amount used to flush the charge lines) 1554 g (18.46 mole) of cyclohexane was charged to the reactor prior to initiating the styrene feed. Styrene, 1644 g (15.78 mole) was fed through Comparative Benzyl-Oligostyrene and Ethylbenzene Styrenic Telomer Distribution Formation Processes Comparative Example 45 is adapted from the limited experimental details reported independently by Nakamura and Tsukahara and demonstrates the process inefficiencies associated with formation of benzyl oligostyrenes in the molecular weight range useful for forming brominated flame retardants for broad spectrum application in thermoplastic resins. Thus 558 g of a 763 $M_w$ benzyl oligostyrene having a polydispersity index of 1.14, standard deviation of 250 Daltons and an asymmetry of 0.318 was formed from about 46 g of toluene (determined by material balance) with 512 g (4.92 mol) styrene, consuming 0.795 mol of butyllithium and requiring 1.0 mole TMEDA. Though useful for forming such Gaussian shaped distributions, the process is cost prohibitive for producing substrates economically well suited for forming polymeric brominated flame retardants of this weight average molecular weight.

Comparative Examples 46-48 are designed to mimic the reaction conditions reported set forth for Example 4 of EP 0 741 147 A1 in that disclosure. As was pointed out in the background section of this application, EP 0 741 147 A1 only reports $M_n$ and $M_w$ but not $M_z$. Without $M_z$ the shape of the distributions formed in terms of skewness and asymmetry cannot be assessed. As a consequence the three Comparative Examples, Examples 46-48 were run, two with ethylbenzene as in EP 0 741 147 A1 and one with toluene. The Examples formed distributions of component chains $x_i$, where the distribution of the weight fractions of $x_i$s, $X_i$s, fit a lognormal probability density function (LNPDF) given by equation (7).

The results of the model and this comparative study are in Table 8 above. Based on the lognormal PDF a value of $M_z=2381$ predicted for EP 0 741 147 A1 Example 4. A lognormal probability density distribution, (when normalized $X_i$ or weight fraction) of the random variable $x_i$ is established when multiplicative probabilities exist. For the process technology disclosed in EP 0 741 147 A1 the first multiplicative probability ($P_{tr\ CTA,i}$) that defines the probability density or $x_i$ is chain transfer from the chain transfer agent (CTA) to form dead polymer component chain $x_i$. The second multiplicative probability ($P_{ri}$) is regeneration of $x_i$ by the reverse reaction of chain transfer involving the ionized form of the chain transfer agent. The third multiplicative probability is the probability, $P_{tr\ i,j}$, that chain transfer will occur between dead polymer component chain $x_i$ and living polymer component chain $x_j$. The results reported in Table 8 are consistent with the process description disclosed in EP 0 741 147 A1 regarding chain transfer from living chains to dead chains in a near equilibrium process for at least those component chain $x_i$ fractions that participate in such reactions. Based on these results it appears that component chains $x_1$-$x_7$ effectively participate in such equilibria. Higher molecular chains may very well not participate as effectively if at all. Such process technology produces undesirable distributions having highly populated high molecular weight tails and as such is not at all suited for forming the brominated flame retardants of this invention.

$$f(x_i) = (M_i \sigma \sqrt{2\pi})^{-1} \exp(-(\ln(M_i)-\mu)^2/2\sigma^2) \qquad (7)$$

and as before $$X_i = f(x_i)/\Sigma f(x_i), \qquad (2)$$

likewise $$n_i = X_i/M_i \qquad (3)$$

Brominated Distributions of Styrenic Polymers of the Invention

In the practice of this invention, any known method for bromination of aromatic hydrocarbons may be employed. In general, the brominations are conducted in the absence of light and preferably use elemental bromine as the brominating agent. The bromination is carried out under anhydrous conditions, using a suitable Lewis acid catalyst such as an aluminum halide or ferric halide catalyst. To minimize bromination on aliphatic carbon atoms, the reaction is preferably conducted at temperatures below about 25° C. A bromination solvent such as, for example, dibromomethane, ethylene dibromide, bromochloromethane, dichloromethane, ethylene dichloride is typically used in the process.

Examples BR-49 BR-80

Preferred Bromination Technology for Use in the Practice of this Invention

The preferred processes of this invention comprise brominating distributions of styrenic polymers of this invention with a brominating agent and in the presence of a catalytic amount of an aluminum halide catalyst. Desirably, the initial form of the aluminum halide catalyst used in the processes of this invention is as $AlCl_3$ or $AlBr_3$. The $AlCl_3$ is desirably slurried in a suitable diluent. Alternatively, $AlCl_3$ can be reacted by means of chloride bromide exchange (trans-halogenation) to produce a mixed or partially mixed chlorobromo aluminum trihalide with improved solubility in the liquid diluent. When $AlBr_3$ is used, it is desirable to predissolve it in bromine. The bromination processes of this invention can be conducted as a batch, semi-batch or as a continuous process.

As noted previously, preferred processes of this invention can be additionally characterized as having the toluene styrenic telomer distribution of this invention fed to a reactor as a solute in proximity to and contemporaneously with joint or separate feed(s) to the reactor of the brominating agent and the $AlBr_3$, such feeds being subsurface the liquid contents of the reactor (usually a liquid solvent heel at feed initiation and the crude reaction mass after feeding has been initiated) and such feeds forming, with the initial reactor contents, a crude reaction mass at least comprising brominated styrene polymer distribution of this invention, $AlBr_3$, and solvent. The crude reaction mass can also contain unreacted brominating agent. Another class of impurity that will likely be present in all cases is N-bromoamines, which are suspected to give rise to undesirable color bodies and thermally labile bromine. These N-bromoamines would form from amine components or impurities suspected to be present in styrene polymer distributions of this invention. They are suspected to be derived from the chain transfer polymerization promoter, TMEDA.

The solvent chosen for the feed of the styrene polymer distribution of this invention is preferably the same as the solvent that is pre-charged to the reactor before feeding begins.

The solvent used in the styrene polymer distributions of this invention and reactor pre-charges can be selected from any of the following exemplary solvents; dichloromethane, dibromomethane, bromochloromethane, bromotrichloromethane, chloroform, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof and mixtures of any two or more of the foregoing. Preferred solvents are dichloromethane, dibromomethane, and 1,2-dichloroethane. Bromochloromethane is a particularly preferred solvent.

Whatever the solvent chosen is, it is important to ensure that it is relatively free of water. Water in the reaction system during bromination will affect catalytic activity of the aluminum halide catalyst as is well recognized in the art. Generally, it is best that the solvent contain less than about 50 ppm (weight/weight) water. In regard to water, all reactants should be dry. The brominating agent, e.g. bromine, should not contain more than about 30 ppm water. The toluene styrenic telomer distributions of this invention should also be sufficiently dry so as to not introduce deleterious amounts of water into the bromination.

The amount of solvent in the feed of the toluene styrenic telomer distributions of this invention is that amount which at least enables the formation of a free-flowing, low-viscosity solution. In cases where the toluene styrenic telomer distributions of this invention is liquid, consideration for using a solvent-free feed of the toluene styrenic telomer distributions of this invention can be given. However, it has been found that the use of a solvent is preferred as it helps dilute the feed of the toluene styrenic telomer distributions of this invention so that efficient bromination can occur in the reaction mass. Generally, when the solvent is bromochloromethane, from about 60 to about 80 wt % of the feed of the toluene styrenic telomer distributions of this invention will be solvent. Preferred amounts of solvent are from about 65 to about 75 wt %. It has shown to be advantageous to treat the solution of the toluene styrenic telomer distribution of this invention in the brominating solvent with a solid absorbent that does not introduce or catalyze the formation of unacceptable amounts of impurities, such as acidic aluminum oxide to remove polar species prior to bromination. Such treatment results in enhanced thermal HBr stability at temperatures as high as 320° C. Other suitable absorbents that do not introduce or catalyze formation of an unacceptable amount of impurities are available in the marketplace. Such materials as the acidic forms of Amberlyst® or Amberlyte® resins (Rohm & Haas Company), the acidic forms of Dowex® resins (The Dow Chemical Company), or the like are deemed suitable for use as absorbents for use in this treatment procedure. High surface silica gel, neutral and basic forms of aluminum oxide, and certain acidic zeolites are also deemed suitable for use in this treatment procedure.

The pre-charge of solvent to the reactor prior to the reactant and catalysts feeds is that amount which will provide a sufficient mass to provide an adequate heat sink to disperse the heat of the bromination reaction combined with the heat of solution of the by-product HBr so that a "heat kick" or temperature spike is minimized in the proximity of the above mentioned feeds. To this end, it is also preferred that the crude reactor contents/crude reaction mass be stirred to promote thermal and mass uniformity therein. Use of a heel from a previous run already saturated with HBr reduces the initial demand on the cooling system of the reactor and for that reason is preferred in some commercial configurations.

The $AlBr_3$ can be fed as a solute in, for example bromine, separate from the brominating agent feed, however, such a separated feeding scheme is not preferred. Process simplicity, dictates that the brominating agent be bromine and that the $AlBr_3$ and the bromine are fed as a single feed. $AlBr_3$ readily dissolves in bromine. The amount of $AlBr_3$ fed, whether separately or in combination with the bromine feed, is a catalytic amount sufficient to provide from about 0.3 to about 1 mole % $AlBr_3$ per mole of bromine fed as calculated using the equation:

Mole % $AlBr_3$=(weight of $AlBr_3$/266.7÷weight of Bromine/159.81)×100.

The amount of bromine fed is that amount required to achieve the desired bromination level sought assuming some small loss of bromine overhead with by-product HBr. Thus, for example, when desiring to obtain a bromine content of about 73.4 to about 74.5 wt %, about 3.5 to about 3.8 moles of bromine are fed per mole of phenyl group present. The moles of phenyl group present for the toluene styrenic telomer distribution (I)

$$C_6H_5CH_2CH_2-[(C_6H_5)CHCH_2-]_{n_{average}}CH_2C_6H_5 \quad (I)$$

is given by the following:

Mole phenyl/mole toluene styrenic telomers= $2+n_{average}=2+[(M_n-196.29)/104.15]$.

Alternatively and more conveniently one can simply charge bromine based on the equations below:

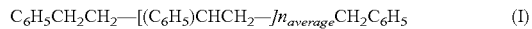

wt Br=wt % Br·wt $SSPD_{brominated}$     a)

wt $SSPD_{brominated}$≈wt $SSPD_{unbrominated}$/(1−wt % Br)     b)

Note: In b), the approximation is the result of ignoring the small amount of mass not accounted for the protons substituted by bromine.
Thus wt Br≈wt % Br·[wt $SSPD_{unbrominated}$/(1−wt % Br)]     c)

and

Moles bromine=2·wt Br/159.81     d)

Moles bromine≈2·wt % Br*[wt $SSPD_{unbrommated}$/(1−wt % Br)]/159.81     e)

It is preferred to feed, as close as is possible, just the amount of bromine needed to obtain the wt % bromine desired. If, excess bromine is fed, then at least some of that excess will be in the crude reaction mass and will have to be removed in down-stream finishing steps.

Whatever the reason for the presence of excess bromine in the crude reaction mass, conventional techniques recognized in the art to remove such excess bromine can be used, e.g. using a reducing agent, e.g. sodium sulfite, to convert the bromine to water soluble bromide salts. However, it has been observed that the use such reducing agents tends to encourage the formation of an emulsion and/or rag during some of the down-stream finishing steps. Such, emulsion or rag layer causes separation difficulties and process inefficiencies.

The toluene styrenic telomer distributions of this invention, brominating agent and $AlBr_3$ feeds should be made beneath the surface of the reactor contents/reaction mass and in close proximity to each other. It is a principle of this invention that the bromination of the toluene styrenic telomer distributions of this invention should occur quickly. The rates of reaction for the brominations of this invention are very fast due to reaction kinetics. Thus, in the processes of this invention, the rate determining factor is the rate of mass transfer. Hence, the use of proximate feeds is designed so that the reactants and catalyst are close, one to the other. Another factor in assuring fast bromination is the feed of the $AlBr_3$ in solution with bromine. It is believed that the bromine preconditions the $AlBr_3$ to the active catalyst state so that the catalyst is active when first fed. One technique to ensure close proximity of the feeds is to provide that the feed tubes into the reactor contents/reaction mass be held together so that they discharge in adjacent parallel or in direct, impinging directions.

Having the feeds discharge beneath the reactor content/crude reaction mass liquid levels is beneficial as it ensures that there is heat dissipation away from the feeding area. Having a "hot spot" at the feeding area is to be avoided to the extent commercially possible. Again, stirring of the reactor contents/crude reaction mass also aids in heat dispersion.

The amount of solvent pre-charge to the reactor should be that amount necessary to accomplish the heat dissipation function without burdening the process with higher than needed material handling expenses.

The feed rate of the individual feeds should be as high as is possible considering the reactor size and design, the heat that must be handled and the cooling available to assist in heat management, the feeding apparatus available and the ability to safely handle HBr by-product gas. The higher the possible feed rates, the more efficient the process.

During the co-feed, the reactor contents/crude reaction mass should be kept at a temperature within the range of from about −20° C. to about 5° C. and preferably within the range of from about −10° C. to about 0° C. until substantially all the bromination has occurred. The feeds to the reactor are conveniently fed at about ambient temperature. To obtain the reactor contents/crude reaction mass temperatures mentioned above, the reactor is provided with adequate cooling. The temperature should be measured as close to the feed area as is practical.

The pressure in the reactor during the bromination is not critical, super-atmospheric pressures being the norm. However, very high pressures are not preferred in the context of equipment requirements and safety issues. Autogenous pressures are permissible.

Subsequent to the reactant and catalyst feeds, it is permissible to allow the reaction mass to experience a ride time to ensure that bromination has ceased. It is permissible, when brominating at about 74 wt % bromine, to allow the temperature to warm to about 7° C. to help facilitate consumption and react out as much of the fed bromine as is practical. This is particularly desirable where the practitioner decides to forgo the use of a sulfite or thiosulfate based bromine reducing agent during the initial aqueous quench so as to avoid any emulsion and rag layer difficulties. It is possible to forgo the ride completely and transfer the reactor content to a wash solution containing hydrazine hydrate. Unlike sulfite and thiosulfate bromine reducing agents, use of hydrazine hydrate is not accompanied by emulsions or thick rag layers.

After the feeds are completed and the ride time, if any, has passed, the crude reaction mass is removed from the reactor and quenched in water. As mentioned previously, if the crude reaction mass or, for that matter, any organic phase that is treated down-stream of the bromination, contains unreacted bromine, such bromine content can be lowered or eliminated by the use of a reducing agent to convert the bromine to water soluble bromide. But again, the use of such reducing agents, particularly the sulfites can cause emulsion formation, and can lead to a product with a higher ΔE value in the Hunter Solution Color Value Test. Therefore, it is recommended to not use bisulfite or sulfite, or any other sulfur-based bromine reducing agent.

The quench is conveniently performed at ambient temperature and generally speaking no heating other than the heat of solution of residual HBr is needed to effect a phase separation. Since bromine and other active brominating species can be present it is preferred to minimize heating of the mixture and to limit exposure to visible light. This assists, to some extent, in helping to ensure a low thermally labile bromine content. In more preferred embodiments of this invention hydrazine hydrate is added to the quenching wash water to immediately treat unreacted bromine. Hydrazine may even attenuate the activity of other active bromine species if present.

The water quench does not have a ride time as the deactivation of the $AlBr_3$ and the reduction of bromine is nearly instantaneous as the crude reaction mass is fed to the quench water or quench water reducing agent solution. Once the quench is complete, two defined phases are formed, an aqueous phase and an organic phase. The organic phase contains solvent and the brominated styrenic polymer distribution of this invention, and will require further treatment.

After the water quench and phase separation and any additional bromine removal steps (water extraction or distillation) are complete, it is a preferred feature of this invention to wash the organic phase with a basic sodium borohydride solution. The borohydride and its borane by-products act to convert available active bromine species, including available unreacted brominating agent, e.g. bromine (if any should still be present), and any available derivatives formed from the unreacted brominating agent (e.g., hypobromites, and/or hypobromous acid) and also any available N-bromoamines, so that the bromine and active bromine species are reduced to bromide, and in the case of the N-bromides, this material is reduced to sodium bromide and free amine. The use of sodium borohydride to reduce bromine in the production of brominated polystyrenes is known. However, a novel feature of the preferred processes of this invention is the use of a caustic solution of sodium borohydride to reduce the amount of N-bromo amine derived color bodies that accompany the brominated toluene styrenic telomer distribution. Thus, for the processes of this invention the sodium borohydride has a primary function, i.e., to reduce the amount of N-bromoamines present, and a secondary function, i.e., the reduction of any amount of bromine present. Thus, quantitatively, the amount of sodium borohydride used is that amount necessary to handle both functions. As used in this paragraph, the term "available", as used in connection with active bromine species, unreacted brominating agent, derivatives formed from the unreacted brominating agent, and N-bromoamines, denotes that the identified materials are not occluded within solids to such an extent that they cannot be removed simply by contact with the sodium borohydride solution.

As the caustic aqueous sodium borohydride solution is used to treat the organic phase, an aqueous phase is formed. The pH of the sodium borohydride solution is such that the formed aqueous phase has a pH between about 10 and about 14 throughout the period that the formed aqueous phase is in contact with the organic phase.

The preferred sodium borohydride content of the treating solution is within the range of from about 0.05 to about 1.0 wt % sodium borohydride, based on the total weight of the treating solution.

An important feature of the caustic sodium borohydride step is that a temperature above about 45° C. and preferably within the range of from about 54° C. to about 62° C. at one atmosphere is maintained during the treatment period. Experimentation has shown that room temperature does not obtain the high attenuation of N-bromoamine derived color bodies and thermally labile bromine that higher temperatures obtain. However, if sodium borohydride is employed subsequent to an acidic hydrazine hydrate quenching wash then a room temperature borohydride treatment can be employed. In fact when hydrazine hydrated is used it is possible to forgo borohydride treatment with only minor sacrifice of product quality as measured by DE, YI and thermal color stability. A room temperature caustic wash (5% NaOH is sufficient) can simply employed. Still from a product stability standpoint the borohydride treatment is a more preferred embodiment.

The treatment temperature is maintained for at least that amount of time needed to obtain the benefits of the treatment, generally at least about 30 minutes has deemed to be more than sufficient. The practitioner can choose a lesser amount or a greater amount of time as suits his/her needs. Generally, experimentation has shown that the organic phase and aqueous mixture (during treatment, mixing is provided) will noticeably begin to thin at about 45° C. to 50° C. It is theorized that the N-bromides and any N-sulfides and/or N-oxides species present are quaternary and hence charged species or at least highly polar species. Such species are implicated in the thickening of the intimately mixed organic and basic aqueous phase. This is observed in an increased draw on the agitator drive used in the mixing. At a temperature above 45° C. and closer to 54° C. such thickening is eliminated and the draw on the drive is reduced. At temperatures below 45° C., thickening occurs and at times incomplete phase separation is observed. Once higher temperatures are achieved, the thickening phenomenon is eliminated, and phase separation is nearly instantaneous, especially when temperatures in excess of 54° C. are used.

The use of the above described aqueous caustic sodium borohydride treatment or wash can be used at any time after the water quench step and phase separation and on any recovered organic phase in the down stream, finishing sequence.

It is preferred to avoid substantial heating of the organic phase prior to the sodium borohydride treatment. Hence temperatures below 35° C. are preferred prior to the borohydride treatment.

After the final washing, the organic phase is separated from the aqueous phase and fed to hot water, say from about 90° C. to about 100° C., to flash off the solvent present and to yield solids in the aqueous phase. Temperature maintenance can be achieved by keeping the water at reflux temperature. This flashing off technique is well known in the art of producing brominated polystyrenics.

Once the solvent has been flashed off, the solids are separated from the water by conventional means, e.g. filtration and the like. The separated solids are then dried by conventional drying techniques, again keeping in mind the $T_g$ of the solids. The dried solids are the finished compositions of this invention.

Another method that may be useful when dealing with low $T_g$ polymers, is to send the organic phase (after azeotropic drying to prevent corrosion issues) to a wiped film evaporator, a falling film evaporator, a continuous strip kettle or a devolatilization extruder where solvent can be rapidly removed and the resulting viscous melt can be easily manipulated and then granulated or pelletized.

Whether devolatilization by means of precipitation or by means of wiped film evaporator, a falling film evaporator, a continuous strip kettle or a devolatilization extruder, it is preferred to filter the azeotropically dried solution through activated acidic aluminum oxide. It has been found that about 1-5 parts by weight of aluminum oxide per 100 parts by weight of dissolved (contained) brominated toluene styrenic telomer is sufficient to remove impurities that contribute to reduced thermal color stability.

A general description of bromination procedures and variations in workup procedure used in the practice of this invention are described below and summarized in Table 9. A summary of the analyses performed on the products formed in the Examples is set forth in Table 10. In Table 11 results including thermal color data for a larger scale bromination is presented. GPC data reported in Tables 10 and 11 were derived using the Light Scattering GPC Method 1. In Table 12 analytical results are reported for bromination of STSTDs obtained from the 100 gallon glass reactor but brominated using AlCl3 as the initially charged bromination catalyst and employing hydrazine hydrate in the quenching wash. In Table 13 analytical results are reported for bromination of STSTDs obtained from the 2 gallon 316 stainless steel reactor, these STSTDS were brominated using AlCl3 as the initially charged bromination catalyst and employing hydrazine hydrate in the quenching wash. In Table 14 analytical results are reported for bromination of STSTDs obtained from the 2 gallon 316 stainless steel reactor using potassium t-butoxide as a co-catalyst during the formation of the TSTD. These STSTDS were brominated using AlCl3 as the initially charged bromination catalyst and employing hydrazine hydrate in the quenching wash. GPC data reported in Tables 12-14 were derived using the Light Scattering GPC Method 2.

Preparation for Bromination

Dry bromochloromethane (BCM, 5-30 ppm moisture by Karl Fisher) was prepared either azeotropically drying or by drying with activated acidic aluminum oxide (EMD Chemicals, Aluminum oxide, mesh 70-230, column chromatography grade). All feed lines, feed tanks and glassware were dried (oven dried at 130° C. min 2 hour where appropriate) and purged over-night prior to use in the bromination reaction. All glassware, feed lines, and feed tanks are maintained under a $N_2$ atmosphere during the course of the set-up and the operation of the bromination reactor.

The amount of $AlBr_3$ catalyst (commercially available) needed to make a 0.25 mole % (calculated using the formula [moles $AlBr_3$/moles $Br_2$]*100%=0.25 mole % $AlBr_3$) solution of active catalyst was weighed and then transferred to oven dried reagent bottles in a nitrogen-purged glove box. By active catalyst, it is meant that amount of catalyst above any additional amount that would be otherwise deactivated by moisture either in the bromine itself or any other process stream involved in the bromination reaction. Bromine (5-10 ppm moisture content) was pumped into the reagent bottle containing the $AlBr_3$ and then stirred with a PTFE coated magnetic stirring bar for 30 minutes to assure homogeneous dissolution of the catalyst. The 0.25 mole % $AlBr_3$ in bromine solution was then transferred to a graduated feeding vessel placed on a large capacity laboratory balance.

The anionic chain-transfer styrenic polymer distribution used was dissolved in dry (5-10 ppm moisture) BCM to make a 25-wt % solution. The solution was then charged to a graduated feeding vessel. The 0.25 mole % $AlBr_3$ in bromine and the 25 wt % ACTST in BCM solution are co-fed via separate peristaltic pumps through 1/8" (3.2 mm) O.D. feed lines to a well-stirred fresh or recycle heel of anhydrous BCM at 0° C. to −10° C. The relative feed rates are constantly monitored such that ratio of the two reagents fed remains constant or near constant during the course of the electrophilic bromination reaction.

Bromination Equipment Set-up

A 5 L oil jacketed flask (bromination reactor) was equipped with an overhead glass stirrer shaft, PTFE stirring paddle, a water-cooled condenser, thermowell, nitrogen inlet, and bottom drain valve. The reactor was vented through a calcium sulfate moisture trap to a well-stirred caustic scrubber to absorb co-product HBr and entrained $Br_2$. Additionally the reactor was outfitted with three inlet lines: 1) 1/4" (6.4 mm) O.D. PTFE BCM feed for initial feed of BCM to the reactor (the BCM can be either fresh or a BCM recycle heel from a previous run); 2) 1/8" (3.2 mm) O.D. substrate/BCM subsurface feed line; and 3) 1/8" (3.2 mm) O.D. $Br_2$/$AlBr_3$ subsurface feed line. The $AlBr_3$/$Br_2$ and SSPD/BCM feed lines are secured such that both inlet lines discharge their contents in close proximity creating a locally high reagent concentration. The bromination reactor was completely covered with aluminum foil to exclude light and the reaction was conducted in a darkened ventilation hood.

The bromination reactor was placed above a 6-liter water quench vessel with a 3/8" (9.5 mm) O.D. PTFE drain line that connects the bottom drain valve of the bromination reactor to the quench vessel to allow for direct transfer of the bromination reactor's contents. The quench vessel was oil jacketed and equipped with an over-head stirring mechanism, thermowell and was baffled for intimate mixing of organic and aqueous phases. The quench vessel had a nitrogen inlet and was purged to a caustic scrubber. The quench vessel had a bottom drain valve to enable transfer of the pot's contents to an intermediate 5-liter storage vessel.

The intermediate storage vessel was piped to transfer its contents to a wash kettle. The wash kettle was a 6-liter oil-jacketed, baffled reactor outfitted with an over-head stirrer, thermocouple and bottom drain valve.

Product isolation set-up provides a water-containing vessel into which the product slurry is fed accompanied by the concomitant azeotropic removal of BCM. The precipitate from is passed through an oven for drying.

Example BR-49

Bromination of TSTD1 with Sodium Borohydride Treatment of Unreacted Bromine

To the 5 L bromination reactor described above was charged 3000 g of dry BCM (23 ppm moisture, Karl Fisher). The BCM was cooled in the dark to −2° C. and a previously prepared 25 wt % solution comprised of 333 g of a distilled SSPD1 mixture ($M_w$=698) and 1000 g of dry BCM was charged to a dry, 2000 mL N$_2$ blanketed graduated cylinder outfitted with a ⅛" (3.2 mm) O.D. PTFE feed line placed to transfer the entire content of the cylinder by means of a peristaltic metering pump to the bromination reactor. The previously prepared AlBr$_3$ (0.25 mol %) in bromine (1795.9 g) was transferred via a peristaltic pump into a 1.5 liter graduated cylinder. This feed vessel was maintained under a N$_2$ atmosphere and was outfitted with a ⅛" (3.2 mm) O.D. PTFE feed line placed to transfer the desired amount of bromine solution by means of a peristaltic metering pump to the bromination reactor.

The two reagents were co-fed at predetermine relative rates such that the entire content of the two feeds were charged and simultaneously completed in 180 minutes with an average residence time of 90 minutes. Ample cooling was provided through out the operation such that the reaction temperature remains close to −2° C. Upon completion of the feed the reaction was allowed to stir for an additional 15 minutes and gradually warmed to 7° C. to allow unreacted bromine to be consumed. The reaction mixture was transferred (gravity) to the 6 L quench vessel through the bottom drain valve and the ⅜" (9.5 mm) O.D. PTFE transfer line.

The quench vessel was previously charged with 1000 mL tap water (25° C.) and stirred at 400 rpm to assure intimate mixing of the organic and aqueous phase. The quench was exothermic and a 10° C. temperature rise was observed. Agitation was slowed to 20 rpm and the organic phase allowed to settle. The light yellow bromine/HBr aqueous phase gradually separated forming the top layer. The lower organic phase was transferred to a 5 L storage vessel containing 1000 mL of 1 wt % NaBH$_4$ and 10% aqueous NaOH.

This two-phase system was then transferred to the 6 L wash kettle and refluxed (62° C.) for 30 minutes. Agitation was interrupted and the bottom organic layer cut from the reactor. The organic layer was returned to the completely drained kettle and washed with 1000 mL of tap water until a pH of 10 was observed.

The near colorless organic solution was fed to a well-stirred 10-liter vessel containing fresh water with a pot temperature of 95° C. The solid product separated as BCM azeotropically distilled and was removed from the precipitator. The product was collected via vacuum filtration on a 3-liter coarse glass sintered glass filter funnel. The product was washed twice (2×1000 mL) and left to dry on the funnel. The white filter cake (2400 g) was then dried in an oven under a nitrogen purge for 36 hours at 105° C. It was then dried further at reduced pressure (4 hrs, 105° C., 30 in. Hg vacuum) resulting in 1200 g of white product, analyses of which are summarized in Table 10.

Example BR-50

Bromination of TSTD1 with Sodium Bisulfite Treatment of Unreacted Bromine

The procedure of Example BR-49 was used except that unreacted bromine was titrated by addition of 10% sodium bisulfite solution to the quench vessel before transfer to the intermediated storage vessel containing 1 wt % NaBH4 and 10% aqueous NaOH. All subsequent steps were as in BR-9. The white filter cake (2400 g) was then dried in an oven under a nitrogen purge for 36 hours at 105° C. It was then dried further at reduced pressure (4 hrs, 105° C., 30 in. Hg vacuum) resulting in 1200 g of white product, analyses of which are summarized in Table 10.

Example BR-51

Bromination of TSTD1 with Sodium Borohydride Treatment of Unreacted Bromine with Subsequent Treatment with Acidic Aluminum Oxide The procedure of Example BR-49 was used except that a 1334 g of a 25 wt % solution of SSPD1(M$_w$=698, PD=1.29) in dry BCM was co-fed with 1682.9 g of 0.25 mole % AlBr$_3$ in bromine to a heel of 3000 g of BCM at a constant relative feed rate such that the average residence time in the reactor was 90 minutes.

The post bromination work up procedure was as BR-9 except that after the product mixture was azeotropically dried until the pot temperature reached 69° C. at 1 atm pressure. The mixture was then stirred with 60 grams of activated acidic aluminum oxide (EMD Chemicals, Aluminum oxide, mesh 70-230, column chromatography grade) for 1 hr allowing to cool to about 45° C. over that period. The product mixture was then vacuum filtered to remove Alumina. The Alumina was rinsed with one 200 mL portion of dry BCM. The filtrate and rinsate were combined and fed to the precipitation vessel. The product was precipitated from 96° C. water with concurrent removal of organic solvent. The product was collected by filtration as in BR-9. The resulting white filter cake (2250 g) was then dried in an oven under a nitrogen purge for 36 hours at 105° C. It was then dried further at reduced pressure (4 hrs, 105° C., 30 in. Hg vacuum) resulting in 1125 g of white product, analyses of which are summarized in Table 10.

Example BR-52

Bromination of TSTD7 with Sodium Borohydride Treatment of Unreacted Bromine

The procedure of Example BR-49 was used except that a 1334 g of a 25 wt % solution of SSPD7 (M$_w$=706, PD=1.29) in dry BCM was co-fed with 1795.9 g of 0.25 mole % AlBr$_3$ in bromine to a heel of 3000 g of BCM at a constant relative feed rate such that the average residence time in the reactor was 90 minutes. The post bromination procedure was as BR-9. The procedure produced a white filter cake (2400 g) was then dried in an oven under a nitrogen purge for 36 hours at 105° C. It was then dried further at reduced pressure (4 hrs, 105° C., 30 in. Hg vacuum) resulting in 1202 g of white product, analyses of which are summarized in Table 10.

Example BR-53

Bromination of TSTD8 with Sodium Borohydride Treatment of Unreacted Bromine

The procedure of Example BR-49 was used except that a 1334 g of a 25 wt % solution of SSPD8 (M$_w$=706, PD=1.29) in dry BCM was co-fed with 1795.9 g of 0.25 mole % AlBr$_3$ in bromine to a heel of 3000 g of BCM at a constant relative feed rate such that the average residence time in the reactor was 90 minutes. The post bromination procedure was as BR-9. The procedure produced a white filter cake (2400 g) was then dried in an oven under a nitrogen purge for 36 hours at 105° C. It was then dried further at reduced pressure (4 hrs, 105° C., 30 in. Hg vacuum) resulting in 1210 g of white product, analyses of which are summarized in Table 10.

Example BR-54

Bromination of Acidic Aluminum Oxide Treated TSTD6 with Sodium Borohydride

The procedure of Example BR-49 was used except that a 25 wt % solution of SSPD6 ($M_w$=706, PD=1.29) in dry BCM which was first treated with 100 grams of activated acidic aluminum oxide (EMD Chemicals, Aluminum oxide, mesh 70-230, column chromatography grade) for 1 hr. The substrate feed was then gravity filtered to remove Alumina. A 1256 g portion of the alumina treated 25 wt % solution was co-fed with 1693.4 g of 0.25 mole % $AlBr_3$ in bromine to a heel of 3000 g of BCM at a constant relative feed rate such that the average residence time in the reactor was 90 minutes.

The post bromination procedure was as in BR-9 except that after the wash/treatment steps the product mixture was azeotropically dried until the pot temperature reached 69° C. at 1 atm pressure. The mixture was then stirred with 60 grams of activated acidic aluminum oxide (EMD Chemicals, Aluminum oxide, mesh 70-230, column chromatography grade) for 1 hr allowing to cool to about 45° C. over that period. The product mixture was then vacuum filtered to remove Alumina. The Alumina was rinsed with one 200 mL portion of dry BCM. The filtrate and rinsate were combined and fed to the precipitation vessel.

The product was precipitated from 96° C. water with concurrent removal of organic solvent. The product was collected by filtration as in BR-9. The procedure produced a white filter cake (2260 g) was then dried in an oven under a nitrogen purge for 36 hours at 105° C. It was then dried further at reduced pressure (4 hrs, 105° C., 30 in. Hg vacuum) resulting in 1130 g of white product, analyses of which are summarized in Table 10.

Example BR-15 demonstrates advantages of conducting the bromination on a semi-batch basis with a shorter reaction time. Examples BR-15—Part A and BR-15—Part B demonstrate the advantages of removing polar species by use of a solid absorbent such as acidic aluminum oxide.

Example BR-55

Bromination of TSTD6 with Sodium Borohydride Treatment of Unreacted Bromine

The procedure of bromination example, BR-49 was used except that that a 880 g of a 25 wt % solution of SSPD6 ($M_w$=697, PD=1.29) in dry BCM was co-fed with 1186.5 g of 0.25 mole % $AlBr_3$ in bromine to a heel of 2000 g of BCM at a constant relative feed rate such that the average residence time in the reactor was 60 minutes. The reactor was discharged to the quench pot, the reaction mixture was water washed and then transferred to the intermediate storage vessel containing 1250 g of 1 wt % NaBH4 in 10% aqueous NaOH.

The bromination reactor was then charged with a second 2000 g heel of BCM. Then the second 880 g of a 25 wt % solution of SSPD6 ($M_w$=697, PD=1.28) in dry BCM was co-fed with 1186.5 g of 0.25 mole % $AlBr_3$ in bromine to the 2000 g BCM heel. This second co-feed was again conducted such that the average residence time in the reactor was 60 minutes. The second reaction mixture was then transferred to the quench vessel washed and then combined with the first reaction mixture in the intermediate storage vessel. The combined product mixture was fed to the $NaBH_4$ treatment reactor in portions with azeotropic distillation of BCM (62° C.) until the entire contents fit safely in the 6000 ml reactor. The reaction mixture was cooled to 55° C. and the phases separated. The organic product phase was then returned to the wash vessel and washed with 1000 ml of fresh water. The phases were separated and the organic product phase was then azeotropically dried and until the pot temperature reached 69° C.

Example BR-55

Part A

Product Precipitation without Further Treatment

About one half of the product mixture was precipitated as in BR-49. The procedure produced a white filter cake (1600 g) was then dried in an oven under a nitrogen purge for 36 hours at 105° C. It was then dried further at reduced pressure (4 hrs, 105° C., 30 in. Hg vacuum) resulting in 820 g of white product, analyses of which are summarized in Table 10.

Example BR-55

Part B

Product Precipitation with Subsequent Treatment with Acidic Aluminum Oxide

The second half of the product mixture was precipitated as in BR-49 except that prior to precipitation the mixture was stirred with 40 grams of activated acidic aluminum oxide (EMD Chemicals, Aluminum oxide, mesh 70-230, column chromatography grade) for 3 hr cooling to about 25° C. over that period. The product mixture was then vacuum filtered to remove alumina. The alumina was rinsed with one 200 mL portion of dry BCM. The filtrate and rinsate were combined and fed to the precipitation vessel. The procedure produced a white filter cake (1550 g) was then dried in an oven under a nitrogen purge for 36 hours at 105° C. It was then dried further at reduced pressure (4 hrs, 105° C., 30 in. Hg vacuum) resulting in 770 g of white product, analyses of which are summarized in Table 10.

Example BR-56

Bromination Using $AlCl_3$ of TSTD6 with Premixing of TSTD/BCM/Bromine then Subsequent Treatment with Sodium Borohydride of Unreacted Bromine The procedure of Bromination BR-49 was used except that that a 1333 g of a 25 wt % solution of SSPD6 ($M_w$=697, PD=1.29) in dry BCM was co-fed with 1823 g of bromine to a heel of 3000 g of BCM containing 2.28 g (0.017 mole) of $AlCl_3$. The feed SSPD6/BCM feed and catalyst free bromine were premixed by pumping separately into a glycol cooled (−5°) jacketed static mixer attached to the bromination reactor. The feed was conducted at a constant relative feed rate such that the feed required 180 minutes. The reactor content was discharged to the quench pot, the reaction mixture was water washed and then transferred to the intermediate storage vessel containing 1000 g of 1 wt % NaBH4 in 10% aqueous NaOH. The post reaction work up was BR-9. The procedure produced 1215 g of a white solid having analyses reported in Table 10.

Example BR-57

Larger Scale Bromination Using AlBr$_3$ of Lab Prepared TSTD with Sodium Borohydride Treatment of Unreacted Bromine The bromination was conducted in a 50 L glass reactor outfitted with a liquid jacket and temperature control with the Huber system, agitator, a reflux overhead condenser cooled to −7° C., gas evolution port connected to a scrubber by means of two separate half inch O.D. Teflon® tubing lines, a BCM feed line from a holding tank, and a bromine feed line from a bromine storage tank.

The reactor was charged with 30 kg of BCM and cooled to −3° C. The SSPD feed was prepared as a 14.8 kg solution of a 25 wt % solution in BCM. This SSPD composite of laboratory-prepared substrate having Mw=702 and PD=1.3, was made on 12-L scale using recycled toluene and recycled TMEDA. The runs were analogous to Example 6—Part A, however, twice the catalyst loading was used to make up for less efficient mixing. This solution was co-fed with 18.7 kg of 0.25 wt % AlBr$_3$ in bromine. The solutions were co-fed through Teflon® tubing ending in close proximity (less than 50 mm) subsurface to the reaction mixture. The 25 wt % SSPD solution in BCM and the bromine solution were fed simultaneously (at mass-rates proportional to their respective mass) over a 130-min period, with care to ensure a continuous and constant-rate addition of both feeds so that the feeds finish together. Hydrogen bromide was formed and began to vigorously evolve after about 1 h. A 22 L flask with a gas scrubbing tower was charged with 16 kg of water. The scrubber was used to trap the formed HBr vented through the two Teflon® lines from the outlets on the reflux condenser. At the end of the addition, the reaction mixture was allowed to warm to 7° C., and then held at 7° C. for 30 min prior to quenching and workup.

The workup of the bromination reaction was conducted in a 100 L glass jacketed reactor. It was charged with 20 kg of water, the water and quenched organic phase were kept cool (at about 5° C.) by maintaining a jacket temperature of 1° C. The transfer was conducted by means of a vacuum differential. The quench vessel was placed under a vacuum of about 300 mmHg. The transfer of the bromination reaction mixture was conducted through a ⅜" Teflon® line leading from the bottom of the bromination reactor into the headspace of the quench reactor. The temperature in the quench reactor increases during the 30-40 min addition period to about 15° C. The bromination reactor and transfer line were rinsed with 8 kg of BCM, which was sent to the quench reactor where it mixed with the brominated SSPD solution. After agitating for about 15 minutes, the mixture was allowed to settle for 5 minutes whereupon the phases separate readily.

The bottom phase contained product and free bromine. It was collected from the reactor into three 5-gal carboys each of which had been previously charged with 3.33 Kg of 1% NaBH$_4$ in 10% aqueous NaOH. Because there was an extractable present in the carboys' material construction, contact time of the BCM solutions with the carboy was kept to a minimum. Negligible to no contamination of the product by the extractable was observed in the product solutions by NMR. As each carboy was filled, it was vigorously agitated by hand to decolorize the bromination reaction mixture by reduction of Br$_2$ and its active bromine derivatives with NaBH$_4$. The upper aqueous phase in the quench vessel was then collected and treated with sodium sulfite solution to reduce residual bromine before disposal or recovery for bromide value. The quench reactor was additionally washed with 4 kg of water, and sent for disposal. The contents of the three product solution/borohydride carboys were then returned to the reactor, and the aqueous portion was diluted with 10 kg of additional water to reduce the caustic concentration to prevent glass erosion. After checking for the presence of borohydride anion (BH$_4^-$), the reactor contents were heated to reflux for 1 hour by setting the internal reaction temperature to 70° C. though the temperature peaked at 62° C. It was then cooled to 25° C. and left to settle overnight (but only a few minutes were needed.) The process was repeated twice more for a total of three runs.

The three runs produced 58 kg of solution with 22 wt % brominated SSPD (BR-17) were obtained each. These batches were combined for isolation and then 11 kg of solution were fed to 17 kg water at 93° C. over a 2 hour period. This required 16 separate precipitation batches. BCM was distilled overhead while the product was fed to the precipitation vessel, the product forming a fine water-slurry in the vessel. After cooling, the product was isolated by centrifugation, and dried in an oven under a purge of nitrogen for 36 hours at 105° C. and then under vacuum at 105° C. for 6 hours. The dry blended composite of 16 precipitation batches yielded 37.2 Kg of material having the analyses reported in Table 11.

Example BR-58

Bromination using AlCl$_3$ of STSTD8 with Hydrazine Treatment of Unreacted Bromine The procedure of Bromination BR-49 was used except that that a 1333 g of a 25 wt % solution of TSTD 8 ($M_w$=720, PD=1.30) in BCM (34 ppm moisture) was co-fed with 1823 g of bromine to a heel of 3000 g of BCM containing 4.06 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution.

The quenched reaction mixture was thus washed and then allowed to rapidly settle. The bottom organic layer was then transferred to the wash reactor containing 1000 g of fresh water. The mixture was stirred for 15 minutes at ambient temperature and then left to settle. The milky organic phase was then transferred to two separate intermediate storage vessels (½ of the product phase into each). The first vessel contain 500 g of 5-wt % sodium hydroxide, the second vessel contained 500 g of 5-wt % sodium hydroxide and additionally 6 grams of sodium borohydride.

Example BR-58

Part-A

Caustic Wash Work-Up Procedure

The content of the first vessel was transferred to the baffled wash reactor and stirred at 30° C. for 30 minutes. During that period the organic phase lost its milky appearance becoming lightly colored and transparent. Mixing was interrupted and the phases were allowed to separate. The organic product phase was separated from the aqueous phase excluding any rag layer (generally very small less than a 0.05% by volume of the organic phase) from the product phase and then washed with 500 g of fresh water. The near colorless organic solution was fed to a well-stirred 10-liter vessel containing fresh water with a pot temperature of 95° C. The solid product separated as BCM azeotropically distilled and was removed from the precipitator. The product was collected via vacuum filtration on a 3-liter coarse glass sintered glass filter funnel. The product was washed twice (2×1000 mL) and left to dry on the funnel. The white filter cake (1200 g) was then dried in an oven under a nitrogen purge for 36 hours at 105° C. It was then dried further at reduced pressure (4 hrs, 105° C., 30 in. Hg vacuum) resulting in 605 g of white product, analyses of which are summarized in Table 12.

Example BR-58

Part-B

Caustic NaBH$_4$ Wash Work-Up Procedure

The content of the first vessel was transferred to the baffled wash reactor and stirred at 62° C. for 30 minutes. During that period the organic phase lost its milky appearance becoming lightly colored and transparent. Mixing was interrupted and the phases were allowed to separate. The organic product phase was separated from the aqueous phase excluding any rag layer (generally very small less than a 0.05% by volume of the organic phase) from the product phase and then washed with 500 g of fresh water. The near colorless organic solution was fed to a well-stirred 10-liter vessel containing fresh water with a pot temperature of 95° C. The sold product separated as BCM azeotropically distilled and was removed from the precipitator. The product was collected via vacuum filtration on a 3-liter coarse glass sintered glass filter funnel. The product was washed twice (2×1000 mL) and left to dry on the funnel. The white filter cake (1200 g) was then dried in an oven under a nitrogen purge for 36 hours at 105° C. It was then dried further at reduced pressure (4 hrs, 105° C., 30 in. Hg vacuum) resulting in 605 g of white product, analyses of which are summarized in Table 12.

Example BR-59

Bromination using AlCl$_3$ of STSTD8 with Hydrazine Treatment of Unreacted Bromine The procedure of Bromination BR-49 was used except that that a 1333 g of a 25 wt % solution of TSTD 8 (M$_w$=720, PD=1.30) in BCM (34 ppm moisture) was co-fed with 1823 g of bromine to a heel of 3000 g of BCM containing 4.06 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 12.

Example BR-60

Bromination Using AlCl$_3$ of TSTD9 with Hydrazine Treatment of Unreacted Bromine The procedure of Bromination BR-49 was used except that that a 1333 g of a 25 wt % solution of TSTD 9 (M$_w$=762, PD=1.29) in BCM (27 ppm moisture) was co-fed with 1823 g of bromine to a heel of 3000 g of BCM containing 3.96 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 12.

Example BR-61

Bromination using AlCl$_3$ of STSTD9 with Hydrazine Treatment of Unreacted Bromine The procedure of Bromination BR-49 was used except that that a 1333 g of a 25 wt % solution of TSTD 9 (M$_w$=762, PD=1.29) in BCM (27 ppm moisture) was co-fed with 1823 g of bromine to a heel of 3000 g of BCM containing 3.96 g (0.030 mole) of AlCl$_3$. The feed was conducted at an unbalanced variable relative rate such that the TSTD feed required 180 minutes while the bromine feed required 192 minutes. Upon completion of the bromine feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 12.

Example BR-62

Bromination Using AlCl$_3$ of STSTD9 with Hydrazine Treatment of Unreacted Bromine The procedure of Bromination BR-49 was used except that that a 1333 g of a 25 wt % solution of TSTD 9 (M$_w$=762, PD=1.29) in BCM (27 ppm moisture) was co-fed with 1823 g of bromine to a heel of 3000 g of BCM containing 3.96 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 12.

Example BR-63

Bromination Using AlCl$_3$ of STSTD9 with Hydrazine Treatment of Unreacted Bromine The procedure of Bromination BR-49 was used except that that a 1333 g of a 25 wt % solution of TSTD 9 (M$_w$=762, PD=1.29) in BCM (27 ppm moisture) was co-fed with 1823 g of bromine to a heel of 3000 g of BCM containing 3.96 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 12.

Example BR-64

Bromination Using AlCl$_3$ of STSTD 29 with Hydrazine Treatment of Unreacted Bromine

The procedure of Bromination BR-49 was used except that that a 1333 g of a 25 wt % solution of TSTD 29 (M$_w$=941, PD=1.39) in BCM (18 ppm moisture) was co-fed with 1823 g of bromine to a heel of 3000 g of BCM containing 3.95 g (0.029 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-65

Bromination Using AlCl$_3$ of STSTD 30 with Hydrazine Treatment of Unreacted Bromine

The procedure of Bromination BR-49 was used except that that a 1333 g of a 25 wt % solution of TSTD 30 (M$_w$=938, PD=1.39) in BCM (22 ppm moisture) was co-fed with 1823 g of bromine to a heel of 3000 g of BCM containing 3.93 g (0.029 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-66

Bromination Using AlCl$_3$ of STSTD 35 with Hydrazine Treatment of Unreacted Bromine

The procedure of Bromination BR-49 was used except that that a 1333 g of a 25 wt % solution of TSTD 35 (M$_w$=769, PD=1.32) in BCM (24 ppm moisture) was co-fed with 1823 g of bromine to a heel of 3000 g of BCM containing 3.97 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-67

Bromination using AlCl$_3$ of STSTD 35 with Hydrazine Treatment of Unreacted Bromine

The procedure of Bromination BR-49 was used except that that a 1333 g of a 25 wt % solution of TSTD 35 (M$_w$=769, PD=1.32) in BCM (24 ppm moisture) was co-fed with 1823 g of bromine to a heel of 3000 g of BCM containing 3.97 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-68

Bromination using AlCl$_3$ of STSTD 32 with Hydrazine Treatment of Unreacted Bromine

The procedure of Bromination BR-48 was used except that that a 1333 g of a 25 wt % solution of TSTD 32 (M$_w$=772, PD=1.32) in BCM (67 ppm moisture) was co-fed with 1823 g of bromine to a heel of 3000 g of BCM containing 4.30 g (0.032 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-69

Bromination using AlCl$_3$ of STSTD 33 with Hydrazine Treatment of Unreacted Bromine

The procedure of Bromination BR-49 was used except that that a 1333 g of a 25 wt % solution of TSTD 33 (M$_w$=769, PD=1.32) in BCM (58 ppm moisture) was co-fed with 1823 g of bromine to a heel of 3000 g of BCM containing 4.27 g (0.032 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-70

Bromination Using AlCl$_3$ of STSTD 38 with Hydrazine Treatment of Unreacted Bromine

The procedure of Bromination BR-49 was used except that that a 1333 g of a 25 wt % solution of TSTD 38 (M$_w$=763, PD=1.31) in BCM (21 ppm moisture) was co-fed with 1823 g of bromine to a heel of 3000 g of BCM containing 3.94 g (0.029 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 13.

Example BR-71

Bromination Using AlCl$_3$ of STSTD 36 with Hydrazine Treatment of Unreacted Bromine

The procedure of Bromination BR-49 was used except that that a 1333 g of a 25 wt % solution of TSTD 36 ($M_w$=706, PD=1.29) in BCM (33 ppm moisture) was co-fed with 1823 g of bromine to a heel of 3000 g of BCM containing 4.02 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-72

Bromination Using AlCl$_3$ of STSTD 37 with Hydrazine Treatment of Unreacted Bromine

The procedure of Bromination BR-49 was used except that that a 1333 g of a 25 wt % solution of TSTD 37 ($M_w$=686, PD=1.29) in BCM (33 ppm moisture) was co-fed with 1823 g of bromine to a heel of 3000 g of BCM containing 4.02 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 13.

Example BR-73

Bromination Using AlCl$_3$ of STSTD 39 Forming 74 Br-wt % Product with Hydrazine Treatment of Unreacted Bromine

The procedure of Bromination BR-49 was used except that that a 1333 g of a 25 wt % solution of TSTD 39 ($M_w$=903, PD=1.38) in BCM (36 ppm moisture) was co-fed with 1796 g of bromine to a heel of 3000 g of BCM containing 4.06 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 14.

Example BR-74

Bromination Using AlCl$_3$ of STSTD 39 Forming 73 Br-wt % Product with Hydrazine Treatment of Unreacted Bromine

The procedure of Bromination BR-49 was used except that that a 1333 g of a 25 wt % solution of TSTD 39 ($M_w$=903, PD=1.38) in BCM (36 ppm moisture) was co-fed with 1726 g of bromine to a heel of 3000 g of BCM containing 4.06 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 14.

Example BR-75

Bromination Using AlCl$_3$ of STSTD 40 with Hydrazine Treatment of Unreacted Bromine

The procedure of Bromination BR-49 was used except that that a 1333 g of a 25 wt % solution of TSTD 40 ($M_w$=823, PD=1.34) in BCM (25 ppm moisture) was co-fed with 1823 g of bromine to a heel of 3000 g of BCM containing 3.96 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 14.

Example BR-76

Bromination Using AlCl$_3$ of STSTD 41 with Hydrazine Treatment of Unreacted Bromine

The procedure of Bromination BR-49 was used except that that a 1333 g of a 25 wt % solution of TSTD 41 ($M_w$=776, PD=1.28) in BCM (20 ppm moisture) was co-fed with 1823 g of bromine to a heel of 3000 g of BCM containing 3.96 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 14.

Example BR-77

Bromination Using AlCl$_3$ of STSTD 42 with Hydrazine Treatment of Unreacted Bromine

The procedure of Bromination BR-49 was used except that that a 1333 g of a 25 wt % solution of TSTD 42 ($M_w$=794, PD=1.31) in BCM (36 ppm moisture) was co-fed with 1823 g of bromine to a heel of 3000 g of BCM containing 4.02 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further subdivided, treated, isolated and dried as in BR-58. The analyses of the two parts, Part A and Part B are reported in Table 14.

Example BR-78

Bromination Using AlCl$_3$ of STSTD 43 with Hydrazine Treatment of Unreacted Bromine The procedure of Bromination BR-49 was used except that that a 1333 g of a 25 wt % solution of TSTD 43 (M$_w$=713, PD=1.26) in BCM (46 ppm moisture) was co-fed with 1823 g of bromine to a heel of 3000 g of BCM containing 4.02 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 14.

Example BR-79

Bromination Using AlCl$_3$ of STSTD 44 with Hydrazine Treatment of Unreacted Bromine The procedure of Bromination BR-49 was used except that that a 1333 g of a 25 wt % solution of TSTD 44 (M$_w$=882, PD=1.35) in BCM (26 ppm moisture) was co-fed with 1823 g of bromine to a heel of 3000 g of BCM containing 3.98 g (0.030 mole) of AlCl$_3$. The feed was conducted at a constant relative feed rate such that the feed required 180 minutes. Upon completion of the feed the reaction mixture was stirred 0±3° C. for 15 minutes and then the reactor content was discharged to the stirred quench pot containing 1000 g of a 0.5 wt % hydrazine hydrate solution. The reaction mixture was washed and further treated with caustic and sodium borohydride, isolated and dried as in BR-58 Part-B to yield 1207 grams of product. The analyses of product are reported in Table 14.

TABLE 9

| Bromination Example | BR-49 | BR-50 | BR-51 | BR-52 | BR-53 | BR-54 | BR-55a | BR-55b |
|---|---|---|---|---|---|---|---|---|
| Styrenic Telomer Example | STSTD 1 | STSTD 1 | STSTD 1 | STSTD 7 | STSTD 8 | STSTD 8 | STSTD 6 | STSTD 6 |
| M$_w$ | 692 | 692 | 692 | 707 | 706 | 706 | 697 | 2373 |
| PD | 1.29 | 1.29 | 1.29 | 1.29 | 1.29 | 1.29 | 1.28 | |
| Styrene Polymer (g) | 333 | 333 | 312 | 333 | 333 | 314 | 440 | |
| Moisture (ppm) | 23 | 23 | 23 | 10 | 20 | 10 | 19 | |
| Wt % in BCM | 25 | 25 | 25 | 25 | 25 | 25 | 25 | |
| Treatment of Feed Before Bromination | none | none | none | none | none | Acidic Al$_2$O$_3$ | none | |
| 0.25 wt % AlBr$_3$ in Bromine (g) | 1796 | 1796 | 1683 | 1796 | 1796 | 1693 | 2373 | |
| BCM Heel | 3000 | 3000 | 3000 | 3000 | 3000 | 3000 | 4000 | |
| Average Rxn. Temp. (° C.) | −2 | −2 | −2 | −2 | −2 | −2 | −3 | |
| Rxn. Temperature Range during Feed (° C.) | −6 to −2 | −6 to −2 | −6 to −2 | −6 to −2 | −6 to −2 | −6 to −2 | −6 to −2 | |
| Final Rxn. Temperature (° C.) | 7 | 7 | 7 | 7 | 7 | 7 | 7 | |
| Xcess Br$_2$ Reducing Agent | NaBH$_4$ | Sodium bisulfite | NaBH$_4$ | NaBH$_4$ | NaBH$_4$ | NaBH$_4$ | NaBH$_4$ | |
| Additional Treatment after washes. | none | none | Acidic Al$_2$O$_3$ | none | none | none | none | Acidic Al$_2$O$_3$ |
| Mass of Brominated Styrene Polymer | 1200 | 1200 | 1125 | 1202 | 1210 | 1130 | 820 | 770 |

TABLE 10

| Bromination Example | | BR-49 | BR-50 | BR-51 | BR-52 | BR-53 | BR-54 | BR-55a | BR-55b | BR-56 |
|---|---|---|---|---|---|---|---|---|---|---|
| Styrenic Telomer Example | | STSTD1 | STSTD 1 | STSTD 1 | STSTD 7 | STSTD 8 | STSTD 8 | STSTD 6 | STSTD 6 | na |
| Residual BCM (ppm) | | 54 | 7 | 37 | <10 | <20 | <100 | <100 | <100 | <100 |
| Wt % Br XRF | | 74.1 | 74.0 | 73.4 | 73.9 | 73.6 | 73.5 | 74.3 | 74.3 | 74.0 |
| T$_g$ by DSC (° C.) | | 116.2 | 115.8 | 111.3 | 118.3 | 117.9 | 122.4 | 117.8 | 118.5 | 121.8 |
| TGA (° C.) | 1% wt Loss | 323 | 321 | 325 | 317 | 325 | 326 | 321 | 330 | 316 |
| | 5% wt Loss | 359 | 353 | 357 | 355 | 356 | 359 | 357 | 360 | 355 |
| | 10% wt Loss | 372 | 367 | 368 | 368 | 367 | 371 | 368 | 373 | 367 |
| | 50% wt Loss | 408 | 404 | 405 | 402 | 401 | 407 | 406 | 408 | 404 |
| Thermal HBr 300° C. (ppm) | | 160 | 82 | 85 | 115 | 85 | <50 | 55 | 111 | 342 |
| Thermal HBr 320° C. (ppm) | | na | na | na | na | na | 186 | 853 | na | |
| GPC | M$_n$ | 2290 | 2390 | 2440 | 2380 | 2470 | 2420 | 2610 | 2610 | 2240 |
| | M$_w$ | 2980 | 3020 | 3050 | 3090 | 3080 | 3140 | 3325 | 3325 | 2910 |
| | M$_z$ | 3860 | 3900 | 3820 | 4190 | 3880 | 4170 | 4565 | 4565 | 3738 |
| | PD | 1.3 | 1.3 | 1.3 | 1.3 | 1.3 | 1.3 | 1.27 | 1.27 | 1.30 |
| ASTM 1925 | L | 96.3 | 95.82 | 96.06 | 96.23 | 96.30 | 96.18 | 96.30 | 96.35 | 95.84 |
| | a | −0.05 | −0.30 | −0.41 | −0.34 | −.040 | −0.38 | −0.37 | −0.38 | −0.93 |
| | b | 0.54 | 2.3 | 1.6 | 1.82 | 1.72 | 1.91 | 1.63 | 1.49 | 3.58 |
| | YI | 3.32 | 4.06 | 2.68 | 3.12 | 2.89 | 3.26 | 2.75 | 2.47 | 5.97 |
| Hunter Solution Color | L | 100.1 | 99.94 | 100.4 | 100.2 | 100.6 | 99.75 | 100.17 | 100.5 | 96.16 |
| | a | −1.05 | −0.17 | 0.04 | −0.09 | −0.07 | −0.06 | −0.02 | 0.02 | −1.4 |
| | b | 0.54 | 2.3 | 0.06 | 0.70 | 0.40 | 0.75 | 0.52 | 0.05 | 4.74 |
| | ΔE | 0.6 | 4.06 | 0.21 | 0.73 | 0.36 | 0.97 | 0.56 | 0.02 | 5.16 |

TABLE 11

| BR-57 | | |
|---|---|---|
| Residual BCM (ppm) | | <10 |
| Residual H$_2$O (ppm) | | <50 |
| XRF wt % Bromine | | 73.8 |
| T$_g$ (° C.) (DSC) | | 119.9 |
| TGA 5% Wt. Loss (° C.) | | 356 |
| Thermal HBr-FP 300° C. (ppm) | | 117 |
| GPC Data | M$_n$ | 2290 |
| | M$_w$ | 3020 |
| | M$_z$ | 4020 |
| | PD | 1.3 |

TABLE 11-continued

| BR-57 | | |
|---|---|---|
| Hunter Solids Color Data | L | 95.98 |
| | a | −0.56 |
| | b | 2.86 |
| | YI | 4.9 |
| Hunter Solution Color Data | L | 99.9 |
| | a | −0.59 |
| | b | 2.06 |
| | ΔE | 3.18 |
| Thermal Color Stability | 250° C. 15 min | 14.5 |
| | 250° C. 15 min | 28.9 |

TABLE 12

| Bromination Example | BR-58 | BR-59 | BR-60 | BR-61 | BR-62 | BR-63 |
|---|---|---|---|---|---|---|
| Styrenic Telomer Example | STSTD8 | STSTD8 | STSTD9 | STSTD9 | STSTD9 | STSTD9 |
| Substrate M$_w$ | 720 | 720 | 762 | 762 | 762 | 762 |
| % Br (nmr) | 74 | 74 | 74 | 74 | 74 | 74 |
| M$_w$ | 2765 | 2709 | 2741 | 2754 | 2747 | 2762 |
| M$_n$ | 2001 | 1975 | 2056 | 2062 | 2067 | 2068 |
| M$_z$ | 4243 | 4129 | 3826 | 3850 | 3803 | 3857 |
| PD | 1.382 | 1.372 | 1.334 | 1.335 | 1.329 | 1.336 |
| Tg (° C.) (DSC) | 119.61 | 120.72 | 123.88 | 122.17 | 121.64 | 122.25 |
| Part A (No NaBaH$_4$) | | | | | | |
| TGA 5% Wt. Loss (° C.) | 356.45 | 359.16 | 360.82 | 359.8 | na | 359.61 |
| T HBr 300° C. (ppm) | 71 | 77 | 81 | 58 | na | <50 |
| Solids Color YI | 4.41 | 4.05 | 3.75 | 5.38 | na | 4.23 |
| Solution Color Delta E | 1.81 | 3.26 | 1.93 | 3.38 | na | 2.02 |
| T Color 250° C. 15 min | 7.1 | 5.41 | 6.3 | 8.9 | na | 6.17 |
| T Color 300° C. 20 min | 18.7 | 18.48 | 15.3 | 20.7 | na | 13.99 |
| Part B (NaBaH$_4$ treat) | | | | | | |
| TGA 5% Wt. Loss (° C.) | 357.18 | 358.98 | 359.73 | 361.27 | 360.27 | 360.07 |
| T HBr 300° C. (ppm) | 103 | <50 | <50 | 52 | 50 | <50 |
| Solids Color YI | 3.25 | 2.72 | 2.44 | 4.21 | 3.54 | 2.96 |
| Solution Color Delta E | 1.1 | 2.65 | 0.66 | 1.88 | 0.52 | 0.66 |
| T Color 250° C. 15 min | 6.62 | 3.24 | 5.23 | 7.01 | 4.84 | 3.96 |
| T Color 300° C. 20 min | 15.86 | 16.73 | 14.68 | 12.17 | 15.59 | 12.9 |

TABLE 13

| Bromination Example | Br-64 | Br-65 | Br-66 | Br-67 | Br-68 | Br-69 | Br-70 | Br-71 | Br-72 |
|---|---|---|---|---|---|---|---|---|---|
| Styrenic Telomer Example | STSTD29 | STSTD30 | STSTD35 | STSTD35 | STSTD32 | STSTD33 | STSTD38 | STSTD36 | STSTD37 |
| Substrate M$_w$ | 941 | 938 | 769 | 769 | 772 | 769 | 767 | 706 | 686 |
| M$_w$ | 3519 | 3490 | 2854 | 2854 | 2843 | 2830 | 2835 | 2590 | 2586 |
| M$_n$ | 2480 | 2399 | 2082 | 2083 | 2094 | 2016 | 2102 | 1980 | 1927 |
| M$_z$ | 5020 | 5088 | 4141 | 4164 | 4020 | 4485 | 3977 | 3584 | 3902 |
| PD | 1.42 | 1.455 | 1.371 | 1.370 | 1.358 | 1.403 | 1.349 | 1.308 | 1.342 |
| Tg (° C.) (DSC) | 138.27 | 131.81 | 122.11 | 121.66 | 123.72 | 126.71 | 123.05 | 117.86 | 116.55 |
| Part A (no NaBH4) | | | | | | | | | |
| TGA 5% Wt. Loss (° C.) | 362.57 | 363.43 | 359.44 | 359.14 | 359.48 | 361.79 | 358.47 | 356.31 | 358.99 |
| T HBr 300° C. (ppm) | <50 | <50 | 59 | <50 | 87 | 103 | 77 | 70 | ? |
| Solids Color YI | 5.19 | 4.74 | 3.51 | 4.55 | 5.21 | 4.77 | 4.86 | 6.48 | 6.11 |
| Solution Color Delta E | 3.16 | 1.14 | 1.92 | 3.24 | 3.27 | 2.97 | 3.12 | 4.39 | 2.01 |
| T Color 250° C. 15 min | 10.74 | 10.39 | 6.75 | 7.73 | 7.5 | 7.23 | 7.91 | 12.92 | 11.86 |
| T Color 300° C. 20 min | 20.7 | 23.32 | 20.58 | 21.66 | 18.9 | 17.62 | 20.98 | 28.17 | 25.89 |
| Part B (NaBH4 treat) | | | | | | | | | |
| TGA 5% Wt. Loss (° C.) | 362.06 | 360.68 | 360.05 | 359.24 | 432.5 | 359.96 | 357.19 | 355.99 | 357.88 |
| T HBr 300° C. (ppm) | <50 | 75 | <50 | 110 | 97 | 96 | <50 | <50 | |
| Solids Color YI | 3.83 | 3.36 | 2.97 | 3.70 | 4.07 | 2.94 | 3.38 | 4.12 | 4.00 |
| Solution Color Delta E | 1.34 | 2.62 | 1.33 | 1.61 | 1.31 | 1.09 | 1.36 | 2.09 | 1.26 |
| T Color 250° C. 15 min | 9.53 | 8.27 | 4.74 | 6.32 | 6.29 | 5.96 | 6.8 | 9.4 | 9.64 |
| T Color 300° C. 20 min | 22.25 | 22.57 | 20.3 | 18.87 | 19.98 | 20.9 | 23.47 | 24.27 | 28.1 |

TABLE 14

| Bromination Example | Br-73 | Br-74 | Br-75 | Br-76 | Br-77 | Br-78 | Br-79 |
|---|---|---|---|---|---|---|---|
| Styrenic Telomer Example | STSTD39 | STSTD39 | STSTD40 | STSTD41 | STSTD42 | STSTD43 | STSTD44 |
| Substrate $M_w$ | 903 | 903 | 824 | 776 | 794 | 713 | 882 |
| $M_w$ | 3468 | 3401 | 3050 | 2782 | 2906 | 2653 | 3291 |
| $M_n$ | 2422 | 2374 | 2219 | 2129 | 2187 | 2109 | 2373 |
| $M_z$ | 5283 | 5192 | 4340 | 3817 | 3940 | 3425 | 4663 |
| PD | 1.432 | 1.432 | 1.4 | 1.307 | 1.328 | 1.26 | 1.4 |
| Tg (° C.) (DSC) | 130.63 | 123.19 | 125.63 | 122.33 | 129.21 | 122.95 | 132.49 |
| Part A (no $NaBaH_4$) | | | | | | | |
| TGA 5% Wt. Loss (° C.) | 365.15 | 359.36 | na | na | 367.76 | na | na |
| T HBr 300° C. (ppm) | <50 | <50 | na | na | <50 | na | na |
| Solids Color YI | 3.47 | 3.27 | na | na | 3.62 | na | na |
| Solution Color Delta E | 1.17 | 1.03 | na | na | 1.24 | na | na |
| T Color 250° C. 15 min | 3.87 | 3.24 | na | na | 4.89 | na | na |
| T Color 300° C. 15 min | 9.56 | 8.61 | na | na | 16.44 | na | na |
| Part B ($NaBaH_4$ treat) | | | | | | | |
| TGA 5% Wt. Loss (° C.) | 363.31 | 359.83 | 359.57 | 366.34 | 365.22 | 361.31 | 361.1 |
| T HBr 300° C. (ppm) | <50 | <50 | <50 | <50 | <50 | <50 | <50 |
| Solids Color YI | 3.15 | 2.56 | 2.82 | 3.3 | 3.06 | 2.83 | 2.66 |
| Solution Color Delta E | 0.74 | 0.38 | 0.17 | 0.86 | 0.48 | 0.31 | 0.38 |
| T Color 250° C. 15 min | 2.99 | 2.42 | 2.52 | 8.8 | 3.75 | 3.4 | 6.12 |
| T Color 300° C. 15 min | 7.9 | 8.58 | 11.72 | 11.34 | 10.2 | 14.29 | 17.36 |

Use of and Properties Achievable from the Brominated Flame Retardants of this Invention As shown above, the brominated styrenic polymer distributions of this invention (often referred to herein as "brominated flame retardants of this invention") are characterized, among other things, by being broad spectrum flame retardants. This means that the flame retardants can be effectively used in a wide variety of different types of polymers, including various thermoplastic polymers. Additionally, the brominated flame retardants of this invention are deemed to be effective in thermoset polymers, such as epoxy resins used for printed wiring and circuit boards, as well as natural and synthetic elastomers, including thermoplastic polyurethane elastomers (TPU), etc.

Illustrative polymers in which the brominated flame retardants of this invention may be used include: olefin polymers, cross-linked and otherwise, for example homopolymers of ethylene, propylene, and butylene; copolymers of two or more of such alkene monomers and copolymers of one or more of such alkene monomers and other copolymerizable monomers, for example, ethylene/propylene copolymers, ethylene/ethyl acrylate copolymers and ethylene/propylene copolymers, ethylene/acrylate copolymers and ethylene/vinyl acetate copolymers; polymers of olefinically unsaturated monomers, for example, polystyrene, e.g. high impact polystyrene, and styrene copolymers, polyurethanes; polyamides; polyimides; polycarbonates; polyethers; acrylic resins; polyesters, especially poly(ethyleneterephthalate) and poly(butyleneterephthalate); polyvinyl chloride; thermosets, for example, epoxy resins; elastomers, for example, butadiene/styrene copolymers and butadiene/acrylonitrile copolymers; terpolymers of acrylonitrile, butadiene and styrene; natural rubber; butyl rubber and polysiloxanes. The polymer may be, where appropriate, cross-linked by chemical means or by irradiation. The brominated flame retardants of this invention can also be used in textile applications, such as in latex-based back coatings.

The amount of brominated flame retardants of this invention used in a formulation will be that quantity needed to obtain the flame retardancy sought. In general, the formulation and resultant product may contain from about 1 to about 30 wt %, preferably from about 5 to about 25 wt % of a brominated flame retardant of this invention. Master batches of polymer containing a brominated flame retardant of this invention, which are blended with additional amounts of substrate polymer or binding agent, typically contain even higher concentrations of the flame retardant, e.g., up to 95 wt % or more.

It is advantageous to use the brominated flame retardant of this invention in combination with antimony-based synergists, e.g. $Sb_2O_3$. Such use is conventionally practiced in most, if not all, flame retardant applications in which aromatic bromine flame retardants are used. Generally, the flame retardant products of this invention will be used with the antimony based synergists in a weight ratio ranging from about 1:1 to 7:1, and preferably of from about 2:1 to about 4:1.

Any of several conventional additives used in thermoplastic formulations may be used, in their respective conventional amounts, with the brominated flame retardant of this invention, e.g., plasticizers, antioxidants, fillers, pigments, UV stabilizers, etc.

Thermoplastic articles formed from formulations containing a thermoplastic polymer and a brominated flame retardant of this invention can be produced conventionally, e.g., by injection molding, extrusion molding, compression molding, and the like. Blow molding may also be appropriate in certain cases.

Among particular flame retarded compositions of this invention are the following:

A) A HIPS-based formulation containing a flame retardant amount of a brominated flame retardant of this invention. Such formulations can be composed of primarily HIPS or they can be an alloy of HIPS, such as a polyphenylene ether-HIPS blend. These are flame retarded compositions formed by blending a brominated flame retardant of this invention with the HIPS or alloy thereof.

B) An ABS-based formulation containing a flame retardant amount of a brominated flame retardant of this invention. Such formulations can be composed of primarily ABS or they can be an alloy of ABS, such as a polycarbonate-ABS blend. These are flame retarded compositions formed by blending a brominated flame retardant of this invention with the ABS or alloy thereof.

C) A polyolefin-based formulation containing a flame retardant amount of a brominated flame retardant of this invention. Such polyolefin-based formulations include polyethylene, polypropylene, and ethylene or propylene copolymers with other olefinic monomers copolymerizable therewith. These are flame retarded compositions formed by blending a brominated flame retardant of this invention with a polyolefin homopolymer or copolymer.

D) An engineering thermoplastic-based formulation containing a flame retardant amount of a brominated flame retardant of this invention. These are flame retarded compositions formed by blending a brominated flame retardant of this invention with a engineering thermoplastic polymer or blend thereof.

E) A formulation as in D) wherein the engineering thermoplastic is a thermoplastic polyester. These are flame retarded compositions formed by blending a brominated flame retardant of this invention with a thermoplastic polyester or blend thereof.

F) A formulation as in D) wherein the engineering thermoplastic is a thermoplastic polyamide. These are flame retarded compositions formed by blending a brominated flame retardant of this invention with a polyamide thermoplastic or blend thereof.

G) A formulation as in any of A)-F) wherein the flame retardant amount is in the range of about 1 to about 95 wt % based on the total weight of the formulation.

H) A formulation as in any of A)-F) wherein the formulation additionally contains a synergistic amount of a flame retardant synergist.

I) A flame retarded thermoset resin composition which comprises a thermoset resin in which has been included a flame retardant amount of a brominated flame retardant of this invention.

J) A composition as in I) wherein said thermoset resin is a novolak resin.

The uniquely beneficial combination of properties that become manifest when a flame retardant of this invention is blended into a polymeric substrate such as a thermoplastic resin were demonstrated by a group of tests in which the substrate polymer was a high impact polystyrene (Dow® 801 high impact polystyrene resin). The materials tested, the tests utilized, and results of such tests are summarized in Table 15. Additional tests in which the substrate polymer was a high impact polystyrene (INEOS NOVA 495F high impact polystyrene resin) were also evaluated. The materials tested, the tests utilized, and results of such tests are summarized in Tables 16-19.

TABLE 15

| Application Example | 80 | 81 | 82 | 83 | 84 | 85 | 86 | 87 | 88 |
|---|---|---|---|---|---|---|---|---|---|
| Bromination Example | BR-9 | BR-10 | BR-11 | BR-12 | BR-13 | BR-14 | BR-15a | BR-16 | BR-17 |
| Styrene Polymer Example | SSPD1 | SSPD1 | SSPD1 | SSD7 | SCSD8 | SCSD8 | SSPD6 | SSPD6 | na |
| Wt % Bromine XRF | 74.1 | 74.0 | 73.4 | 73.9 | 73.6 | 73.5 | 74.3 | 74.0 | 73.8 |
| $T_g$ Substrate (° C.) | 116.2 | 115.8 | 111.3 | 118.3 | 117.9 | 122.4 | 118.5 | 121.8 | 119.9 |
| Formulation | | | | | | | | | |
| Dow 801 (HIPS) (wt. %) | 82.5 | 82.5 | 82.5 | 82.5 | 82.5 | 82.5 | 82.5 | 82.5 | 82.5 |
| Brightsun HB (ATO) (wt. %) | 4 | 4 | 4 | 4 | 4 | 4 | 4 | 4 | 4 |
| Br-FR Loading (wt. %) | 13.5 | 13.5 | 13.5 | 13.5 | 13.5 | 13.5 | 13.5 | 13.5 | 13.5 |
| Thermal | | | | | | | | | |
| MFI, 200° C./5 kg (g/10 min) | 11.4 | 11.6 | 11.7 | 11.3 | 11.2 | 10.7 | 11.8 | 11.6 | 11.6 |
| HDT, 264 psi (° C.) | 72.5 | 72.4 | 72.4 | 72.5 | 71.7 | 72 | 72.2 | 72.6 | 72.2 |
| Vicat (° C.) | 100.1 | 100.0 | 100.0 | 100.1 | 100.1 | 100.3 | 100.1 | 100.2 | 100.1 |
| Impact | | | | | | | | | |
| Izod Impact (ft-lb/in) | 1.586 | 1.594 | 1.552 | 1.619 | 1.606 | 1.607 | 1.63 | 1.58 | 1.63 |
| Flammability | | | | | | | | | |
| UL-94, 1/8" rating | V-0 | V-0 | V-0 | V-2 | V-2 | V-0 | V-0 | V-0 | V-0 |
| $t_1 + t_2$ (sec) | 11 | 9 | 10 | 39 | 30 | 10 | 16 | 16 | 16 |
| Color | | | | | | | | | |
| L* | 94.88 | 95.03 | 95.52 | 95.14 | 94.97 | 95.28 | 95.21 | 94.26 | 95.21 |
| a* | −0.81 | −0.56 | −0.66 | −0.66 | −0.66 | −0.63 | −0.59 | −0.79 | −0.59 |
| b* | 3.69 | 3.27 | 2.85 | 3.00 | 3.24 | 3.00 | 3.26 | 5.22 | 3.26 |
| YI (D1925) | 6.15 | 5.68 | 4.8 | 5.12 | 5.58 | 5.13 | 5.68 | 9.16 | 5.68 |

TABLE 16

| Application Example | 89 | 90 | 91 | 92 | 93 | 94 | 95 |
|---|---|---|---|---|---|---|---|
| Bromination Example | As in BR-58 | As in Br-58 | As in Br-58 | Br-60A | Br-60B | Br-61B | Br-62A |
| Quench | no Hydrazine | no Hydrazine | no Hydrazine | Hydrazine | Hydrazine | Hydrazine | Hydrazine |
| STSTD Used | 8 | 8 | 8 | 9 | 9 | 9 | 9 |
| STSTD $M_w$ | 720 | 720 | 720 | 762 | 762 | 762 | 762 |
| $T_g$ | 124.46 | 124.46 | 124.46 | 122.17 | 122.17 | 121.64 | 122.25 |
| TC 250° C. | 8.46 | 8.46 | 8.46 | 8.9 | 7.01 | 4.84 | 6.17 |
| TC 300° C. | 20.73 | 20.73 | 20.73 | 20.7 | 12.17 | 15.59 | 13.99 |

TABLE 16-continued

| Application Example | | 89 | 90 | 91 | 92 | 93 | 94 | 95 |
|---|---|---|---|---|---|---|---|---|
| FORMULATION | | | | | | | | |
| Ineos Nova HIPS 495F | wt. % | 82.5 | 82.5 | 82.5 | 82.5 | 82.5 | 82.5 | 82.5 |
| Br-FR | wt. % | 13.5 | 13.5 | 13.5 | 13.5 | 13.5 | 13.5 | 13.5 |
| Brightsun HB (ATO) | wt. % | 4 | 4 | 4 | 4 | 4 | 4 | 4 |
| PROPERTIES | | | | | | | | |
| Vicat | °C. | 97.1 | 97.0 | 97.1 | 97.1 | 96.8 | 97.0 | 96.8 |
| Izod Impact | ft-lb/in | 1.73 | 1.66 | 1.71 | 1.81 | 1.73 | 1.72 | 1.77 |
| UL-94, 1/8" | rating | V-0 | V-0 | V-0 | V-0 | V-0 | V-0 | V-0 |
| $t_1 + t_2$ | sec | 11.05 | 10 | 14.74 | 10 | 8.26 | 9.09 | 12.11 |
| MFR, 200° C./5 kg | g/10 min | 12.3 | 13.1 | 12.7 | 12.4 | 12.9 | 13.1 | 12.6 |
| Gloss | | 52.9 | 61.8 | 49.9 | 40.1 | 45.2 | 46.7 | 50.3 |
| L | | 93.23 | 93.88 | 93.31 | 92.57 | 92.77 | 92.76 | 92.8 |
| a | | −0.4 | −0.51 | −0.5 | −0.26 | −0.35 | −0.37 | −0.37 |
| b | | 4.21 | 3.63 | 3.79 | 4.32 | 3.86 | 3.65 | 3.84 |
| YI (D1925) | | 7.82 | 6.54 | 6.91 | 8.23 | 7.22 | 6.8 | 7.16 |

TABLE 17

| Application Example | | 96 | 97 | 98 | 99 | 100 | 101 | 102 |
|---|---|---|---|---|---|---|---|---|
| Bromination Example | | Br-64A | Br-64B | Br-65A | Br-65A | Br-66B | Br-66B | Br-67B |
| STSTD Used | | 29 | 29 | 30 | 30 | 35 | 35 | 35 |
| STSTD $M_w$ | | 941 | 941 | 938 | 938 | 769 | 769 | 769 |
| $T_g$ | | 138.27 | 138.27 | 131.81 | 131.81 | 122.11 | 122.11 | 121.66 |
| TC 250° C. | | 10.74 | 9.53 | 10.39 | 8.27 | 6.75 | 4.74 | 6.32 |
| TC 300° C. | | 20.7 | 22.25 | 23.32 | 22.57 | 20.58 | 20.3 | 18.87 |
| FORMULATION | | | | | | | | |
| Ineos Nova HIPS 495F | wt. % | 82.5 | 82.5 | 82.4 | 82.4 | 82.5 | 82.5 | 82.5 |
| Br-FR | wt. % | 13.5 | 13.5 | 13.6 | 13.6 | 13.5 | 13.5 | 13.5 |
| Brightsun HB (ATO) | wt. % | 4 | 4 | 4 | 4 | 4 | 4 | 4 |
| PROPERTIES | | | | | | | | |
| Vicat | °C. | 97.7 | 97.6 | 97.5 | 97.4 | 97.0 | 97.0 | 96.9 |
| Izod Impact | ft-lb/in | 1.69 | 1.68 | 1.73 | 1.72 | 1.71 | 1.67 | 1.66 |
| UL-94, 1/8" | rating | V-0 | V-0 | V-0 | V-0 | V-0 | V-0 | V-0 |
| $t_1 + t_2$ | sec | 10 | 17 | 14 | 10 | 10 | 9.9 | 9 |
| MFR, 200° C./5 kg | g/10 min | 11.6 | 11.6 | 11.9 | 11.3 | 12.7 | 12.52 | 12.6 |
| Gloss | | 45 | 40.4 | 45.8 | 44.3 | 36.4 | 41 | 40.6 |
| L | | 93.18 | 93.64 | 93.56 | 93.75 | 92.59 | 92.70 | 92.67 |
| a | | −0.42 | −0.55 | −0.50 | −0.58 | −0.35 | −0.38 | −0.39 |
| b | | 4.57 | 4.19 | 4.51 | 4.00 | 3.50 | 3.93 | 3.8 |
| YI (D1925) | | 8.51 | 7.61 | 8.27 | 7.20 | 6.52 | 7.34 | 7.08 |

TABLE 18

| Application Example | | 103 | 104 | 105 | 106 | 107 | 108 | 109 |
|---|---|---|---|---|---|---|---|---|
| Bromination Example | | BR-68A | Br-69A | Br-70A | Br-71A | Br-71B | Br-72A | Br-72B |
| | | 32 | 33 | 38 | 36 | 36 | 37 | 37 |
| STSTD $M_w$ | | 772 | 769 | 767 | 706 | 706 | 686 | 686 |
| $T_g$ | | 123.72 | 126.71 | 123.05 | 117.82 | 117.82 | 116.55 | 116.55 |
| TC 250° C. | | 7.5 | 7.23 | 7.91 | 12.92 | 9.4 | 11.86 | 9.64 |
| TC 300° C. | | 18.9 | 17.62 | 20.98 | 28.17 | 24.27 | 28.1 | 25.89 |
| FORMULATION | | | | | | | | |
| Ineos Nova HIPS 495F | wt. % | 82.5 | 82.5 | 82.5 | 82.4 | 82.4 | 82.5 | 82.5 |
| Br-FR | wt. % | 13.5 | 13.5 | 13.5 | 13.6 | 13.6 | 13.5 | 13.5 |
| Brightsun HB (ATO) | wt. % | 4 | 4 | 4 | 4 | 4 | 4 | 4 |
| PROPERTIES | | | | | | | | |
| Vicat | °C. | 97.1 | 97.1 | 97.1 | 96.9 | 96.7 | 96.8 | 96.7 |
| Izod Impact | ft-lb/in | 1.68 | 1.63 | 1.62 | 1.75 | 1.73 | 1.71 | 1.73 |
| UL-94, 1/8" | rating | V-0 | V-0 | V-0 | V-0 | V-0 | V-0 | V-0 |
| $t_1 + t_2$ | sec | 16 | 9 | 10 | 15 | 11 | 15 | 14 |
| MFR, 200° C./5 kg | g/10 min | 12.5 | 12.4 | 12.7 | 12.6 | 12.5 | 12.5 | 12.4 |

TABLE 18-continued

| Application Example | 103 | 104 | 105 | 106 | 107 | 108 | 109 |
|---|---|---|---|---|---|---|---|
| Gloss | 38.6 | 39.5 | 45.7 | 44.7 | 39.1 | 32.2 | 37.8 |
| L | 91.90 | 91.90 | 91.07 | 93.34 | 93.65 | 93.02 | 93.63 |
| a | −0.33 | −0.27 | −0.12 | −0.54 | −0.68 | −0.50 | −0.64 |
| b | 4.08 | 3.94 | 4.17 | 4.89 | 4.59 | 4.74 | 4.37 |
| YI (D1925) | 7.74 | 7.52 | 8.20 | 9.00 | 8.24 | 8.77 | 7.87 |

TABLE 19

| Application Example | | 110 | 111 | 112 | 113 | 114 | 115 | 116 | 117 | 118 | 119 |
|---|---|---|---|---|---|---|---|---|---|---|---|
| Bromination Example | | Br-73A | Br-73B | Br-74A | Br-74B | Br-79B | Br-75B | Br-77A | Br-77B | Br-76 | Br-78 |
| STSTD Used | | 39 | 39 | 39 | 39 | 44 | 40 | 42 | 42 | 41 | 43 |
| STSTD $M_w$ | | 903 | 903 | 903 | 903 | 882 | 824 | 794 | 794 | 776 | 713 |
| Tg | | 130.63 | 130.63 | 123.19 | 123.19 | 132.49 | 125.63 | 129.21 | 129.21 | 122.33 | 122.95 |
| TC 250° C. | | 3.87 | 2.99 | 3.24 | 2.42 | 6.12 | 2.52 | 4.89 | 3.75 | 8.8 | 3.4 |
| TC 300° C. | | 9.56 | 7.9 | 8.61 | 8.58 | 17.36 | 11.72 | 16.44 | 10.2 | 11.34 | 14.29 |
| FORMULATION | | | | | | | | | | | |
| Ineos Nova HIPS 495F | wt. % | 82.4 | 82.4 | 82.3 | 82.3 | 82.4 | 82.5 | 82.5 | 82.5 | 82.4 | 82.5 |
| Br-FR | wt. % | 13.6 | 13.6 | 13.7 | 13.7 | 13.6 | 13.5 | 13.5 | 13.5 | 13.6 | 13.5 |
| Brightsun HB (ATO) | wt. % | 4 | 4 | 4 | 4 | 4 | 4 | 4 | 4 | 4 | 4 |
| PROPERTIES | | | | | | | | | | | |
| 1Vicat | ° C. | 97.5 | 97.2 | 97.1 | 97.0 | 97.5 | 97.3 | 97.4 | 97.2 | 97.3 | 97.3 |
| Izod Impact | ft-lb/in | 1.60 | 1.61 | 1.59 | 1.62 | 1.66 | 1.67 | 1.69 | 1.62 | 1.74 | 1.76 |
| UL-94, ⅛" | rating | V-0 | V-0 | V-0 | V-0 | V-0 | V-0 | V-0 | V-0 | V-0 | V-0 |
| $t_1 + t_2$ | sec | 11 | 12 | 11 | 12 | 9 | 9 | 13 | 11 | 11 | 10 |
| MFR, 200° C./5 kg | g/10 min | 12.0 | 12.1 | 12.6 | 12.4 | 11.8 | 12.0 | 12.4 | 12.5 | 12.4 | 12.3 |
| Gloss | | 60.6 | 60.3 | 55.8 | 65.7 | 36.4 | 50.9 | 63.4 | 49.3 | 44.7 | 50.6 |
| L | | 93.86 | 93.96 | 93.78 | 93.67 | 93.77 | 94.18 | 91.12 | 92.24 | 93.69 | 93.89 |
| a | | −0.33 | −0.42 | −0.39 | −0.41 | −0.48 | −0.49 | −0.05 | −0.19 | −0.40 | −0.52 |
| b | | 3.17 | 3.48 | 3.65 | 3.37 | 3.90 | 3.59 | 3.83 | 3.50 | 4.11 | 3.69 |
| YI (D925) | | 5.83 | 6.33 | 6.71 | 6.16 | 7.10 | 6.48 | 7.57 | 6.71 | 7.59 | 6.65 |

As can be seen from the results summarized in Tables 15-19, the brominated flame retardants of this invention contribute effective flame retardancy as measured by the UL-94® test procedure, while providing substantially improved melt flow of the polymer resin without sacrifice of thermal properties such as heat distortion temperature (HDT) and Vicat performance. Additionally, the molded articles of this resin are white and have excellent impact properties as measured by the notched Izod Impact Test.

The brominated flame retardants of this invention also are highly effective when blended with various engineering thermoplastics, including engineering thermoplastic blends such as polycarbonate/ABS alloys and polyphenylene oxide/HIPS alloys, and especially in thermoplastic polyamides (various grades of nylons) and thermoplastic polyesters (e.g., PET, PBT, etc.). In addition, they are highly effective as flame retardants in various polyolefin homopolymers and copolymers, especially in polypropylene and propylene copolymers, including atactic polypropylenes, syndiotactic polypropylenes, and isotactic polypropylenes.

The excellent effectiveness of the brominated flame retardants of this invention was demonstrated by forming three flame retarded compositions of this invention. These were blends of a flame retardant of this invention in:

a blend of commercially-available thermoplastic polyamide resins, Zytel 70G43L (DuPont Engineering Polymers), indicated to be a polyamide 66 plastic material with glass fiber reinforcement (43%) and Zytel 101L (DuPont Engineering Polymers), indicated to be a polyamide 66 resin; or a blend of a glass filled masterbatch and a glass-free sample, both comprised of the same commercially-available polybutylene terephthalate resin (Crastin 6134; DuPont Engineering Polymers); or.

a commercially-available propylene copolymer (Pro-fax 7523) indicated to be a polypropylene impact copolymer plastic (LyondellBasell).

These blends were molded into test pieces which were then subjected to a variety of standard test procedures. The materials used, the proportions in which they were used, and the test results are summarized in Table 20.

TABLE 20

| Formulation Example # | | 120 | 121 | 122 |
|---|---|---|---|---|
| Additive | | GF* Nylon | GF* PBT | coPP |
| Zytel 70G43L | | 66.7 | | |
| Zytel 101L | | 7.6 | | |
| 45% Glass filled Crastin PBT | | | 66.6 | |
| Crastin 6134 | | | 17.0 | |
| Profax 7523 | | | | 63.3 |
| BR-17 | | 19.0 | 11.0 | 28.0 |
| Brightsun HB Antimony Oxide | | 6.3 | 5.0 | 8.0 |
| PTFE Teflon 6C | | 0.4 | 0.4 | 0.3 |
| Irganox 1010 | | | | 0.1 |
| Irgafos 168 | | | | 0.1 |
| Calcium Stearate | | | | 0.2 |
| Test | Unit | | | |
| UL 94 ⅛" | Rating | V-0 | V-0 | Fail (glow**) |
| | Seconds | 7 | 7 | 117 |
| Melt Flow Index | g/10 min | 45 | 20 | 12 |
| HDT | ° C. | 241 | 190 | 103 |
| HDT Conditions | temp/time | 120° C./hr | 120° C./hr | 120° C./hr |
| Moisture Content | % | 0.04 | 0.01 | |

TABLE 20-continued

| Formulation Example # | | 120 | 121 | 122 |
|---|---|---|---|---|
| Gloss | 60° | 20 | 67 | 51 |
| Hunter Color | L | 83.5 | 82.2 | 96.5 |
| | a | 0.3 | 0.0 | −0.3 |
| | b | 7.9 | 7.1 | 3.2 |
| | YI (D1925) | 17.3 | 15.6 | 5.7 |
| Tensile Strength | psi × 10^3 | 21 | 16 | 2.3 |
| Tensile Modulus | psi × 10^5 | 14 | 14 | 2.8 |
| Elongation at yield | % | 3.4 | 2.4 | 3.1 |
| Elongation at Break | % | 3.4 | 2.4 | 38 |
| Flexural Strength | psi × 10^3 | 34 | 26 | 6.5 |
| Flexural Modulus | psi × 10^5 | 12 | 12 | 2.4 |
| Izod Impact | ft-lb/in | 1.76 | 0.85 | 0.64 |
| Dielectric Strength | V/mil | 490 | 480 | 690 |
| Dielectric constant | | 3.9 | 3.8 | 2.4 |
| Volume Resistivity | Ohm*cm | 1.1E15 | 1.9 E 16 | 9.0 E 16 |

*GF = 30% fiberglass reinforcement
**burn time sufficient for V-2, failed on >60 seconds afterglow.

It can be seen from the results shown in Table 20 that the above engineering thermoplastic blends and the above polypropylene copolymer blend of this invention had a very desirable combination of properties.

The brominated flame retardants of this invention have also been found to be effective in a thermoset resin, in particular, an epoxy resin. Example 29 describes the preparation of the test sample and summarizes test results obtained on evaluation the resultant thermoset resin.

Example 123

In general, stock solutions of advanced resin, curative and promoter are all prepared and stored separately to facilitate experimentation. An 85 wt % phenol epoxy novolac resin solution, DEN® 438-EK85, containing 15 wt % 2-butanone (MEK) was obtained from The Dow Chemical Company. Durite SD-1702 novolak curing agent was obtained from Hexion Corporation. A novolac resin solution was prepared by dissolving 50 wt % SD-1702 in 50 wt % MEK solvent.

Flame retardant prepared in Example BR-17 containing ca. 74 wt % Br was jet-milled to an average particle size of 3.01 micron ($d_{50}$=2.64 micron). A flame retardant resin mixture containing 20.0 wt % Br was prepared in an 8 oz wide-mouth glass jar by adding 75.76 g of 85 wt % DEN 438 solution, 75.60 g of 50 wt % SD-1702 solution and 38.20 g of the flame retardant. Toluene (95 g) was added to the resin mixture, and a solution was obtained by continuously mixing while heating the jar with a heat gun. Curing promoter, 2-phenylimidazole (0.052 g) was added and mixed well into the resin solution. The novolac-to-promoter ratio was about 742:1. About 0.5-1 mL of the resin solution was added to a hot cure plate (Thermo-electric company) at about 162-164° C. A tongue depressor was split in half lengthwise, and half of the depressor was used to move the resin on the hot plate until stiffness was noted and then lifting the resin with the flat part of the depressor until string formation ceased. The gel time was 4 minutes, 24 seconds, determined by the point where resin "strings" could no longer be pulled from the resin mixture and the epoxy becomes "tack free".

An 11 inch square woven glass fabric (7628 glass with 643 finish from BGF Industries) was cut to size from a large roll and stapled to wood supports (12 inches long, 1 inch wide and 1/16 inch thick) on the top and bottom ends of the fabric. The wood supports contained holes in the corners for inserting paper clips on one end for hanging the fabric in the B-stage oven. The A-stage, or resin varnish, was painted on the front and back of the fabric. Paper clips were unfolded and inserted into the both holes of one wood support. The resin-saturated fabric was hung from aluminum supports in a laboratory fume hood and allowed to drip dry for about one minute before hanging in a pre-heated (to 170° C.) forced air Blue M oven (Lab Safety Supply Inc., a unit of General Signal) for 4 minutes. The edges of the B-staged pre-preg were removed by reducing the sheet dimensions to 10 inch by 10 inch. The sheet was cut into four 5 inch by 5 inch sheets and weighed before stacking the four layers of pre-preg between two layers of Pacothane release film (Insulectro Corp.) and two steel plates (1/8 inch thick, 12 inch by 12 inch square dimensions). The laminate was formed in the hot press at 5,000 psig for 1 hour. The resulting laminate was 0.032 inches thick, contained 44 wt % resin and underwent 3 wt % resin overflow during pressing. Five 0.5 inch wide coupons were cut from the laminate using a diamond saw, and the coupon edges were smoothed with sandpaper. The flammability of the coupons was screened by ASTM D3801-06 using an Atlas UL-94 burn chamber, resulting in a V-0 rating with 13 seconds total burn time for the two ignitions on all five coupons.

Analytical Methods

Known analytical methods can be used or adapted for use in assaying the characteristics of the compositions and formulations of this invention.

Total Bromine Content

Since the compositions of this invention have good, or at least satisfactory, solubility in solvents such as tetrahydrofuran (THF), the determination of the total bromine content for the compositions of this invention is easily accomplished by using conventional X-Ray Fluorescence techniques. The sample analyzed is a dilute sample, say 0.1 g+/−0.05 g in 60 mL THF. The XRF spectrometer can be a Phillips PW1480 Spectrometer. A standardized solution of bromobenzene in THF is used as the calibration standard. The total bromine values described herein and reported in the Examples are all based on the XRF analytical method.

Hunter Solution Color Value Test

To determine the color attributes of the flame retardant compositions of this invention, use is again made of the ability to dissolve these compositions in easy-to-obtain solvents, such as chlorobenzene. The analytical method entails weighing a 5 gram+/−0.1 g sample of the composition into a 50 mL centrifuge tube. To the tube also add 45 g+/−0.1 g chlorobenzene. Close the tube and shake for 1 hour on a wrist action shaker. After the 1 hour shaking period, examine the solution for undissolved solids. If a haze is present, centrifuge the solution for 10 minutes at 4000 rpm. If the solution is still not clear, centrifuge an additional 10 minutes. Should the solution remain hazy, then it should be discarded as being incapable of accurate measurement. If, however, and this is the case most of the time, a clear solution is obtained, it is submitted for testing in a HunterLab Color Quest Sphere Spectrocolorimeter. A transmission cell having a 20-mm transmission length is used. The colorimeter is set to "Delta E-lab" to report color as ΔE and to give color values for "L", "a" and "b". Product color is determined as total color difference (ΔE) using Hunter L, a, and b scales for the 10% by weight concentrations of the product in chlorobenzene versus chlorobenzene.

Yellowness Index Hunter Colorimeter

Compositions of this invention were subjected to the analysis described in ASTM D 1925

$T_g$ Values $T_g$ values were obtained by DSC with a TA Instruments DSC Model 2920. Samples were heated to 400° C. at a rate of 10 C.°/min under nitrogen. $T_g$ is determined by noting the change in the specific heat of a polymer at the glass to rubber transition. This is a second order endothermic transition (requires heat to go through the transition). In DSC, the transition appears as a step transition and not a peak such as might be seen with a melting transition. See, *The Elements of Polymer Science and Engineering, An introductory Text for Engineers and Chemist*, Alfred Rudin, Academic Press, Orlando Fla., 1982, pg 403.

Thermogravimetric Analysis.

Thermogravimetric analysis (TGA) is also used to test the thermal behavior of the flame retardant compositions of this invention. The TGA values are obtained by use of a TA Instruments Thermogravimetric Analyzer. Each sample is heated on a Pt pan from 25° C. to about 600° C. at 10 C.°/min with a nitrogen flow of 50-60 mL/min.

Thermal Stability Test (Thermally Labile Bromine Test).

This test procedure is essentially as described in U.S. Pat. No. 5,637,650. In conducting this test, each sample is run in duplicate. A 2.00 g+/−0.01 g sample is placed into a new clean 20 mm by 150 mm test tube. With a neoprene stopper and Viton® fluoroelastomer tubing, the test tube is connected to a nitrogen purge line with exit gas from the test tube being passed successively through subsurface gas dispersion frits in three 250-mL sidearm filter flasks each containing 200 mL of 0.1N NaOH and 5 drops of phenolphthalein. With a constant nitrogen purge at 0.5 SCFH, the test tube is heated at 300° C. in a molten salt bath (51.3% $KNO_3$/48.7% $NaNO_3$) for 15 minutes followed by 5 minutes at ambient temperature. The test tube containing the sample is then replaced with a clean dry test tube, and the apparatus is purged with nitrogen for an additional 10 minutes with the empty test tube in the 300° C. salt bath. The test tube, tubing and gas dispersion tubes are all rinsed with deionized water, and the rinse is combined quantitatively with the solutions in the three collection flasks. The combined solution is acidified with 1:1 $HNO_3$ and titrated with 0.01 N $AgNO_3$ using an automatic potentiometric titrator (Metrohm 670, 716, 736, or equivalent). Results are calculated as ppm in accordance with the equation:

$$HBr=(mL\ AgNO_3\ to\ end\ point)\cdot(normality\ of\ AgNO_3)\cdot(80912)/(sample\ wt.)$$

The tubing is thoroughly dried with nitrogen before the next analysis. Each day before the first sample, three empty clean test tubes are run as blanks to assure there is no residual hydrogen halide in the system.

GPC Molecular Weights for Brominated Stripped Toluene Styrenic Telomer Distribution of This Invention—Method 1

The $M_w$, $M_n$, $M_z$ and PD values were obtained by gel permeation chromatography (GPC) using an integrated multidetector GPC system manufactured by Viscotek Corporation. The system includes a combination pump and autosampler (model GPC-Max) along with an integrated detector system (model TDA) which includes a refractive index detector (RI) along with a dual angle light scattering detector. The columns used were Polymer Labs (Varian) Oligopore columns, 300 mm by 7.5 mm, part number 1113-6520. The solvent used was tetrahydrofuran, HPLC grade. The test procedure entails dissolving approximately 0.20 g of sample in 10 mL of THF. An aliquot of this solution is filtered and 50 µL is injected on the columns. Light scattering determinations require a single polystyrene standard for calibration. A polystyrene standard with a known molecular weight of 19,550 Daltons was used to calibrate the detector system. The software used to determine the molecular weight distribution was Viscotek Omnisec, version 4.2.0.237 gel permeation chromatography (GPC) data collection and processing system.

GPC Molecular Weights for Brominated Stripped Toluene Styrenic Telomer Distribution of This Invention—Method 2

The $M_w$, $M_n$, $M_z$ and PD values were obtained by GPC using a modular system with a Shimadzu autosampler (model SIL-9), a Shimadzu refractive index detector (model RID-6A), a Waters HPLC pump (model 510) and a Waters TCM column heater. The columns used were Polymer Labs (Varian) Oligopore columns, 300 mm by 7.5 mm, part number 1113-6520. The solvent used was tetrahydrofuran, HPLC grade. The test procedure used entailed dissolving approximately 0.10 g of sample in 10 mL of THF. An aliquot of this solution is filtered and 50 µL is injected on the columns. Based on isolated 1,3-diphenylpropane and 1,3,5-triphenylpentane adducts, and the mode of separation is size exclusion, peaks are identified according to their order of elution as 1,3-diphenylpropane, 1,3,5-triphenylpentane, 1,3,5,7-tetraphenylheptane, 1,3,5,7,9-pentaphenylnonane, etc. The individual peaks of the oligomeric material are then assigned theoretical molecular weight values. Where the molecular weight for the brominated standard is calculated as follows:

$$Brominated\ Standard\ MW=Unbrominated\ Standard\ MW/(1\text{-wt. fraction bromine})$$

A calibration curve is constructed using these theoretical values for the standards as if they were brominated to the weight fraction bromine of the brominated toluene styrenic telomer distribution being analyzed. The calibration curve is constructed using these theoretical values and their corresponding retention times. Based on this calibration, the overall distribution data is calculated and reported. The calculations were performed by the Viscotek Omnisec, version 4.2.0.237 gel permeation chromatography (GPC) data collection and processing system.

GPC Molecular Weights for Stripped Toluene Styrenic Telomer Distribution of this Invention The $M_w$, $M_n$, $M_z$ and PD values were obtained by GPC using a modular system with a Shimadzu autosampler (model SIL-9), a Shimadzu refractive index detector (model RID-6A), a Waters HPLC pump (model 510) and a Waters TCM column heater. The columns used were Polymer Labs (Varian) Oligopore columns, 300 mm by 7.5 mm, part number 1113-6520. The solvent used was tetrahydrofuran, HPLC grade. The test procedure used entailed dissolving approximately 0.10 g of sample in 10 mL of THF. An aliquot of this solution is filtered and 50 µL is injected on the columns. Based on isolated 1,3-diphenylpropane and 1,3,5-triphenylpentane adducts, and the mode of separation is size exclusion, peaks are identified according to their order of elution as 1,3-diphenylpropane, 1,3,5-triphenylpentane, 1,3,5,7-tetraphenylheptane, 1,3,5,7,9-pentaphenylnonane, etc. The individual peaks of the oligomeric material are then assigned theoretical molecular weight values. A calibration curve is constructed using these theoretical values and their corresponding retention times. Based on this calibration, the overall distribution data is calculated and reported. The calculations were performed by the Viscotek Omnisec, version 4.2.0.237 gel permeation chromatography (GPC) data collection and processing system.

Analytical Method for Determining Thermal Color Values

The procedure for thermal color analysis is as follows: A custom made metal heating block from J-Kem Scientific (St. Louis, Mo.) featuring 12 heating ports with diameters to snuggly fit 20 ml flat bottom scintillation vials is used. The heating block is placed in a in a nitrogen-purged glove box and heated to the test temperature (either 250 or 300° C.). Duplicate 2-gram samples of the BAPC powder are placed in 20 ml scintillation vials to be heat treated in the heating block. The material in the vials are heated for the specified time (15 minutes at 250° C. or 20 minutes at 300° C.). Upon completion of the heat treatment or thermal aging period, the samples are immediately removed from the block and cooled under nitrogen. The samples are dissolved to make a 10 wt % solution in chlorobenzene and the measurement is made directly of the 10% solution in the scintillation vial. The solution color is of the dissolved sample in terms of L, a, b and Delta E is measured and compared to a chlorobenzene blank standard (L=100, a=0, b=0) using a Hunter Lab Color Quest XE Colorimeter (Reston, Va.).

Analytical Methods for Molding Articles:

HDT was determined by ASTM D 648; Vicat, ° C. by ASTM D 1525; Izod Impact by ASTM D 256; Melt Flow Index by ASTM D 1238; and UL-94, ⅛" (32 mm) rating by UL-94. Color properties were determined by ASTM D 1925.

The flame retardant compositions of this invention are used with flame retarding synergist. These synergists are those that are commonly used with aryl brominated flame retardants and are well known in the art. Exemplary of such synergists are iron oxide, zinc borate, or, preferably, antimony oxide synergist, such as, antimony trioxide, antimony pentoxide, potassium antimonite, sodium antimonite. The amount of flame retardant synergist, when used, generally will be in the range of up to about 12 wt % based on the total weight of the HIPS or ABS based formulation. Synergist amounts will most often fall within the range of from about 1 to about 6 wt %. Departures from the foregoing ranges of proportions are permissible whenever deemed necessary or desirable under the particular circumstances at hand, and such departures are within the scope and contemplation of this invention.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or publication referred to in any portion of this specification is incorporated in toto into this disclosure by reference, as if fully set forth herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text taken in context clearly indicates otherwise.

The invention may comprise, consist or consist essentially of the materials and/or procedures recited herein.

This invention is susceptible to considerable variation in its practice. Therefore the foregoing description is not intended to limit, and should not be construed as limiting, the invention to the particular exemplifications presented hereinabove.

The invention claimed is:

1. A composition of the formula:

$$C_6H_5CH_2CH_2-[(C_6H_5)CHCH_2-]_{n_{average}}CH_2C_6H_5 \qquad (I)$$

wherein, each $C_6H_5$ is a phenyl group, wherein n is an average number in the range of about 2.3 to about 4.8 with the proviso that 1,3-diphenylpropane, a compound of the above formula in which n is 0, optionally is present in said distribution in an amount of not more than 5 GPC area %, and with the further proviso that said distribution optionally further contains toluene in an amount of not more than 0.1 GPC area %, and wherein said distribution is further characterized by having an $M_w$ in the range of about 631 to about 941, an $M_n$ in the range of about 437 to about 688, an $M_z$ in the range of about 888 to about 1259, and a polydispersity in the range of about 1.26 to about 1.44, a standard deviation in the range of about 288 to about 421, and an asymmetry in the range of about 1.7 to about 2.1.

2. A composition as in claim 1 wherein, n is an average number in the range of about 2.9 to about 3.9 with the proviso that 1,3-diphenylpropane, a compound of the above formula in which n is 0, optionally is present in said distribution in an amount of not more than 1 GPC area %, and wherein said distribution is further characterized by having an $M_w$ in the range of about 650 to about 750, an $M_n$ in the range of about 500 to about 600, an $M_z$ in the range of about 888 to about 1120, and a polydispersity in the range of about 1.26 to about 1.35.

3. A composition as in claim 2 wherein said distribution is further characterized by having an $M_w$ in the range of about 690 to about 715, an $M_n$ in the range of about 520 to about 560, an $M_z$ in the range of about 910 to about 960, and a polydispersity in the range of about 1.26 to about 1.32.

4. A process for producing a toluene styrenic telomer distribution, which process comprises:

I) feeding styrene at a feed velocity greater than 10 feet/second into an agitated reaction mixture formed from components comprising toluene, alkyllithium, and optionally Group IA or IIA co-catalyst and TMEDA, at rates of (i) moles of styrene/moles of toluene/hour in the range of about 0.3 to about 1.5 and (ii) moles of styrene/moles of alkyllithium/hour in the range of about 40 to about 110; with a molar ratio of styrene:toluene in the range of about 0.50 to about 4, a molar ratio of styrene: alkyllithium in the range of about 100 to about 350, and a molar ratio of TMEDA:alkyllithium in the range of about 2.2 to about 8; and maintaining the temperature of the reaction mixture in the range of about 70° C. to about 95° C.; the agitation being at least sufficient to maintain a substantially homogeneous concentration profile in the reaction mixture;

II) quenching the reaction mixture with a protic solvent to destroy the catalyst species formed in (I)

A) water washing the quenched reaction mixture to remove metal-containing component(s) formed as a result of the quenching or water washing and making at least one phase cut to remove aqueous phase, separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %; or B) stripping anhydrous toluene and TMEDA thereby separating and recovering dry TMEDA and unreacted toluene from the reaction mixture, adding back at least an equal volume of toluene as was stripped and then adding wash water and making at least one phase cut to remove aqueous phase; (a) separating and recovering toluene used for washing, whereby water is also removed from the reaction mixture and continuing the separation such that the toluene content of the resultant product mixture is less than 0.1 wt % and the content of 1,3-diphenylpropane in the product mixture is less than 25 wt %.

5. A process for producing a toluene styrenic telomer distribution, which process comprises:

I) feeding styrene into an agitated reaction mixture formed from components comprising toluene, alkyllithium, and TMEDA, at rates of (i) moles of styrene/moles of toluene/hour in the range of about 0.3 to about 1.5 and (ii) moles of styrene/moles of alkyllithium/hour in the range of about 40 to about 110; with a molar ratio of styrene:toluene in the range of about 0.50 to about 4, a molar ratio of styrene:alkyllithium in the range of about 100 to about 350, and a molar ratio of TMEDA:alkyllithium in the range of about 2.2 to about 8; and maintaining the temperature of the reaction mixture in the range of about 70° C. to about 90° C.; the agitation being at least sufficient to maintain a substantially homogeneous concentration profile in the reaction mixture;

II) quenching the reaction mixture while at a temperature of below about 80° C. with a protic solvent which, (i) if water is the quenching solvent, making at least one phase cut, and (ii) if a quenching solvent other than water is used, adding wash water and making a phase cut; and III) separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %.

6. A process as in any of claims 4 or 5 wherein the protic solvent employed in the quench is (i) deoxygenated water or (ii) other than water and the added wash water is deoxygenated water.

7. A process as in claim 4 wherein the toluene added back in II) to replace the volume of stripped anhydrous toluene is deoxygenated toluene.

8. A process as in any of claims 4 or 5 wherein the molar ratio of styrene:toluene in the range of about 0.75 to about 4, a molar ratio of styrene:alkyllithium in the range of about 150 to about 350 range.

9. A process as in any of claims 4 or 5 wherein the process is conducted at rates of (i) moles of styrene/moles of toluene/hour in the range of about 0.6 to about 0.85 and (ii) moles of styrene/moles of alkyllithium/hour in the range of about 90 to about 110; with a molar ratio of styrene:toluene in the range of about 1.75 to about 2.2, a molar ratio of styrene:alkyllithium in the range of about 250 to about 280, and a molar ratio of TMEDA:alkyllithium in the range of about 2.4 to about 3; and maintaining the temperature of the reaction mixture in the range of about 78° C. to about 81° C.

10. A process as in claim 5 wherein in III) the content of 1,3-diphenylpropane in the product mixture is less than 5 wt %.

11. A process as in claim 5 wherein in III) the content of 1,3-diphenylpropane in the product mixture is less than 1 wt %.

12. A brominated composition which comprises a brominated styrenic polymer distribution formed from bromination of a styrenic polymer distribution of any of claims 1, or 2, or 3 said brominated composition having the formula:

$$C_6H_{(5-x)}Br_xCH_2CH_2(C_6H_{(5-x)}Br_xCHCH_2—)_n$$
$$CH_2C_6H_{(5-x)}Br_x$$

wherein: n is an average number in the range of about 2.3 to about 4.8; each x is the same or different and is a whole number in the range of 0 to 5; the average number of all of the x's in the composition is in the range of about 3.00 to about 3.80; the weight percent of bromine as determined by XRF in the polymer is in the range of about 71 to about 75, said brominated composition having a thermal color stability value, $\Delta E$, in the range of about 2.42 to about 9.64 when treated at 250° C. for 15 minutes and a thermal color stability value, $\Delta E$, in the range of about 7.9 to about 28.1 when treated for 20 minutes at 300° C.

13. A brominated composition which comprises a brominated styrenic polymer distribution formed from bromination of a styrenic polymer distribution of claims 2 or 3, said brominated composition having the formula:

$$C_6H_{(5-x)}Br_xCH_2CH_2(C_6H_{(5-x)}Br_xCHCH_2—)_n$$
$$CH_2C_6H_{(5-x)}Br_x$$

wherein: n is an average number in the range of about 2.9 to about 3.9; each x is the same or different and is a whole number in the range of 0 to 5; the average number of all of the x's in the composition is in the range of 3.50 to 3.80; the weight percent of bromine as determined by XRF in the polymer is in the range of about 73.4 to about 74.5; said brominated composition having a thermal color stability value, $\Delta E$, in the range of about 2.42 to about 9.64 when treated at 250° C. for 15 minutes and a thermal color stability value, $\Delta E$, in the range of about 7.9 to about 28 when treated for 20 minutes at 300° C.

14. A brominated composition as in claim 12 further characterized in that the brominated aromatic polymer has a TGA weight loss of 5% occurring at a temperature greater than 350° C., a thermal HBr value at 300° C. below the detection limit of 50 ppm and no more than about 200 ppm, and a thermal HBr value at 320° C. in the range of about 100 ppm to about 900 ppm, an ASTM D 1925 Yellowness Index in the range of about 1 to about 6, a $\Delta E$ value in the Hunter Solution Color Value Test in the range of about 0.01 to about 4.0, and a glass transition temperature in the range of about 110° C. to about 135° C.

15. A process for producing a brominated styrenic polymer distribution, which process comprises:

I) feeding styrene at a feed velocity greater than 10 feet/second into an agitated reaction mixture formed from components comprising toluene, alkyllithium, and optionally Group IA or IIA co-catalyst and TMEDA, at rates of (i) moles of styrene/moles of toluene/hour in the range of about 0.3 to about 1.5 and (ii) moles of styrene/moles of alkyllithium/hour in the range of about 40 to about 110; with a molar ratio of styrene:toluene in the range of about 0.75 to about 4, a molar ratio of styrene:alkyllithium in the range of about 150 to about 350, and a molar ratio of TMEDA:alkyllithium in the range of about 2.2 to about 8; and maintaining the temperature of the reaction mixture in the range of about 70° C. to about 95° C.; the agitation being at least sufficient to maintain a substantially homogeneous concentration profile in the reaction mixture;

II) quenching the reaction mixture to destroy the catalyst species formed in (I)

A) water washing the quenched reaction mixture to remove metal-containing component(s) formed as a result of the quenching or water washing and making at least one phase cut to remove aqueous phase, separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %; or B) stripping anhydrous toluene and TMEDA thereby separating and recovering dry TMEDA and unreacted toluene from the reaction mixture, adding back at least an equal volume of toluene as was stripped and then adding wash water and making at least one phase cut to remove aqueous phase; (a) separating and recovering toluene used for washing, whereby water is also removed from the reaction mixture and continuing the separation such that the toluene content of the resultant product mixture is less than 0.1 wt % and the content of 1,3-diphenylpropane in the product mixture is less than 25 wt %;

and after conducting A) or B) of II), brominating the resultant product mixture formed in A) or B) of II).

16. A process for producing a brominated styrenic polymer distribution, which process comprises:

I) feeding styrene into an agitated reaction mixture formed from components comprising toluene, alkyllithium, and TMEDA, at rates of (i) moles of styrene/moles of toluene/hour in the range of about 0.3 to about 1.5 and (ii) moles of styrene/moles of alkyllithium/hour in the range of about 40 to about 110; with a molar ratio of styrene:toluene in the range of about 0.75 to about 4, a molar ratio of styrene:alkyllithium in the range of about 150 to about 350, and a molar ratio of TMEDA:alkyllithium in the range of about 2.2 to about 8; and maintaining the temperature of the reaction mixture in the range of about 70° C. to about 90° C.; the agitation being at least sufficient to maintain a substantially homogeneous concentration profile in the reaction mixture;

II) quenching the reaction mixture while at a temperature of below about 80° C. with a protic solvent which, (i) if water is the quenching solvent, making at least one phase cut, and (ii) if a quenching solvent other than water is used, adding wash water and making a phase cut; and III) separating and recovering TMEDA and unreacted toluene from the reaction mixture, whereby water is also removed from the reaction mixture, and continuing the separation such that the toluene content of the resultant product mixture is less than 0.1 wt % and the content of 1,3-diphenylpropane in the product mixture is less than 25 wt %;

IV) brominating the resultant product mixture formed in III), wherein at least substantially all the bromination occurs at a temperature within the range of from about −10° C. to about 0° C. to form a composition having a bromine content as determined by XRF in the range of about 73.4 to about 74.5 wt % bromine.

17. A process as in any of claims 15 or 16 wherein the bromination with a brominating agent is effected by separately but concurrently feeding (i) a combination of the brominating agent and a bromination catalyst, and (ii) said resultant product mixture formed in III) in admixture with bromination solvent into a reaction zone initially containing the solvent or a heel of a prior reaction mixture and thereafter containing a reaction mixture in the solvent, said feeding being further characterized in that the feeds of (i) and (ii) are disposed to provide impinging feed streams subsurface to a liquid phase in the bromination reaction mixture.

18. A process as in any of claims 15 or 16 wherein the bromination with a brominating agent is effected by separately but concurrently feeding (i) the brominating agent, and (ii) said resultant product mixture formed in III) in admixture with bromination solvent to a reaction zone, and wherein, said reaction zone initially containing the solvent and a bromination catalyst, and optionally a portion of a heel, said introduction of concurrent feeds occurring either above the surface or subsurface to a liquid phase in the bromination reaction mixture.

19. A process as in claim 18 wherein said bromination catalyst is aluminum tribromide or aluminum trichloride or a mixture of aluminum tribromide and aluminum trichloride, where the brominating agent is bromine, and optionally where the solvent is comprised predominately of bromochloromethane.

20. A process as in claim 18 wherein the process further comprises (1) quenching the reaction mixture in water containing hydrazine hydrate to deactivate the bromination catalyst, and to quench bromine, thereby forming an aqueous phase and an organic phase to which is optionally added and then separating the organic phase from the aqueous phase (2) subsequent to the quenching, washing the separated organic phase or with aqueous NaOH, optionally containing NaBH$_4$ in order to reduce the content of N-bromoamines that may be present, such washing(s) occurring at a temperature within the range of from about 20° to about 65° C.

21. A flame retarded polymer formulation comprising a polymer with which has been blended a brominated composition of claim 12.

22. A polymer formulation as in claim 21 wherein: (a) said polymer is an HIPS resin and wherein said formulation additionally contains a flame retardant synergist; or (b) said polymer is an ABS resin and wherein said formulation additionally contains a flame retardant synergist; or (c) said polymer is a polyolefin resin and wherein said formulation additionally contains a flame retardant synergist; or (d) said polymer is an engineering thermoplastic resin, and wherein said formulation additionally contains a flame retardant synergist.

23. A flame retarded thermoset resin composition which comprises a thermoset resin, in which has been included a flame retardant amount of a composition of claim 12.

24. A polymer formulation as in claim 22 wherein said engineering thermoplastic resin is a thermoplastic polyester.

25. A polymer formulation as in claim 22 wherein said engineering thermoplastic resin is a thermoplastic polyamide.

26. A thermoset resin composition as in claim 23 wherein said thermoset resin is a novolak resin.

* * * * *